(12) United States Patent
Anwar

(10) Patent No.: US 6,750,864 B1
(45) Date of Patent: Jun. 15, 2004

(54) PROGRAMS AND METHODS FOR THE DISPLAY, ANALYSIS AND MANIPULATION OF MULTI-DIMENSIONAL DATA IMPLEMENTED ON A COMPUTER

(75) Inventor: Mohammed S. Anwar, Houston, TX (US)

(73) Assignee: Polyvista, Inc., Houston, TX (US)

( * ) Notice: Subject to any disclaimer, the term of this patent is extended or adjusted under 35 U.S.C. 154(b) by 549 days.

(21) Appl. No.: 09/713,674

(22) Filed: Nov. 15, 2000

Related U.S. Application Data
(60) Provisional application No. 60/165,427, filed on Nov. 15, 1999, and provisional application No. 60/189,925, filed on Mar. 16, 2000.

(51) Int. Cl.$^7$ .............................. G06T 11/20; G06F 7/00
(52) U.S. Cl. ............................................ 345/440; 707/4
(58) Field of Search .................................. 345/440, 419, 345/848; 707/1–5, 503; 715/503, 504

(56) References Cited

U.S. PATENT DOCUMENTS

| | | | |
|---|---|---|---|
| 4,823,272 A | 4/1989 | Inselberg | 364/461 |
| 5,228,119 A | 7/1993 | Mihalisin et al. | 395/118 |
| 5,359,724 A | 10/1994 | Earle | 395/425 |
| 5,515,486 A | 5/1996 | Amro et al. | 395/137 |
| 5,546,516 A | 8/1996 | Austel et al. | 395/140 |
| 5,631,982 A | 5/1997 | Inselberg et al. | 382/281 |

FOREIGN PATENT DOCUMENTS

| | | | | |
|---|---|---|---|---|
| EP | 0 295 760 A2 | 1/1988 | | G06F/15/72 |
| EP | 0 694 878 A2 | 1/1996 | | G06T/11/20 |

*Primary Examiner*—Matthew C. Bella
*Assistant Examiner*—A Blackman
(74) *Attorney, Agent, or Firm*—Robert W. Strozier

(57) ABSTRACT

A GUI is disclosed including a set of visualization routines designed to improve display, visualization and manipulation of multi-dimensional data. Many of the routines combine 2D and 3D renderings with domain selecting criteria and stacking criteria with line segments connecting variable values between records in a given dataset or between corresponding variable values in records of related datasets. The GUI also employs active, persistent and slider variables to probe variable relationships, group relationships and dataset relationships.

6 Claims, 61 Drawing Sheets

B

A

|  | USA | OR |  | Drink | | Food | |
|---|---|---|---|---|---|---|---|
| | | | | Alcoholic Beverage | | Snack Foods | |
| S | F | | | Beer and Wine | | Snack Foods | |
| | | | | Beer | | Pretzels | |
| | | | Albany | 2.00 | | 3.00 | |
| | | | Beaverton | 6.00 | | 3.00 | |
| | | | Corvallis | 13.00 | | 12.00 | |
| | | | Lake Oswego | 6.00 | | 2.00 | |
| | | | Lebanon | 27.00 | | 11.00 | |
| | | | Milwaukie | 4.00 | | 12.00 | |
| | | | Oregon City | 3.00 | | 3.00 | |
| | | | Portland | 5.00 | | | |
| | | | Salem | 9.00 | | 6.00 | |
| | | | W. Linn | 3.00 | | 4.00 | |
| | | | Woodburn | 7.00 | | 3.00 | |

Figure 38

PROGRAMS AND METHODS FOR THE DISPLAY, ANALYSIS AND MANIPULATION OF MULTI-DIMENSIONAL DATA IMPLEMENTED ON A COMPUTER

RELATED APPLICATION

This application claims provisional priority to U.S. Provisional Patent Application Serial Nos. 60/165,427 filed Nov. 15, 1999 and No. 60/189,925 filed Mar. 16, 2000.

BACKGROUND OF THE INVENTION

1. Field of the Invention

This invention relates to a system, an interface to a multidimensional database, a front end to a multidimensional database, a user interface, programs and methods implemented on a digital processing unit for improving user utility of data in a multidimensional database and for integrating manipulation, mining and visualization functions of data in a multidimensional database in a unified environment.

More particularly, this invention relates to programs and methods implemented on a digital in processing unit that allow a user to display multi-dimensional data on a display device in a number of different formats to improve visualization of large amounts of data, a number of different techniques to improve data analysis and mining and a number of different techniques to improve data manipulation. These techniques provide the user with better methods for refining data selection, data categorization and/or data classification as well as providing improved visual understanding of possible relationships between variables or collections of variables in a multidimensional dataset or between multidimensional datasets. The present invention also relates to a system, an interface to a multidimensional database, a front end to a multidimensional database and a user interface to facilitate the extraction of information, interesting data relationships and meaningful data from which information can be readily derived from a multidimensional database or other similar structure containing multidimensional data.

2. Description of the Related Art

Most multidimensional database such as MicroSoft Analysis Services, store data in a structure format. These databases perform extensive classification of data and calculations various aspects of the data as it is being stored in the database. Thus, if the database is storing information on registered voters nationwide, the data will be broken down by state, county and town or city, by gender, location, education or other classification criteria. For each such criteria, certain cumulative data associated with the raw data is calculate and stored such as the sum of each class of voter, i.e., the total number of female voter in a given town or city of a given state. The exact structure for storage of the raw data and the associated cumulative data and the mechanisms for obtaining both raw and cumulative data is understood and controlled by the database manager. The manager allows programs to access these data through specialized programming languages that correspond to database queries or requests. The form of the request is generally a set of word, symbols or functions that represent a set of instructions that the manager can invoke to obtain specific data stored in the database and transfer the requested data to the requester.

Several patents are directed to interacting with multidimensional databases such as U.S. Pat. Nos. 5,631,015 and 6,094,651, incorporated herein by reference. However, these patents do not support robust and user-friendly graphical interfaces to display and manipulate the data in understandable ways.

Thus, there remains a need in the art for new and better multidimensional database interfaces, front-ends, user interfaces and systems which allow for improved data visualization, analysis, mining and manipulation.

SUMMARY OF THE INVENTION

The present invention provides a computer environment for integrating multidimensional data manipulation, mining and visualization using a set of novel multidimensional data manipulation, mining and graphics techniques.

The present invention also provides an interface (sometimes referred to herein as a middleware interface or a MWI) to a MDD including a query receiver, a results sender, a query parser, a clause translator, a command sender, a data receiver and an operational construct assembler, where both sender and receiver can be combined into an exchanger and the parser and translator can be combined into a disassembler. The query receiver receives a query from a data mining technique (DMT). The parser breaks the query into an ID and one or more clauses where a clause is a syntactically valid MDD command, a pre-defined term that corresponds to a pre-defined series or sequence of syntactically valid MDD commands or a operational construct and the ID comprises a DMT identifier used by the interface and a query identifier used by the DMT. The translator translates the non command clauses into either their corresponding series of sequence of MDD commands or into a set or sequence of MDD commands necessary to satisfy the operational construct parameters. The sender sends each command to the MDD manager creating a unique synchronous thread, channel or connection to the MDD, where the MDD manager performs the necessary internal MDD procedures need to extract the requested data corresponding to each command from the MDD and once available, the MDD manager send the requested data to the receiver which receives the extracted data corresponding to each command and once received terminates that unique synchronous thread to the MDD. If the query included an operational construct, then the operational construct assembler would performs the data operations necessary to satisfy the construct parameters. The result sender would sends the results to the DMT signified in the ID associated with that query.

The present invention also provides an MDD front end including at least one data mining technique (an DMT) and an MWI of this invention. The MDD front end can also include a GUI, preferably, a GUI of this invention.

The present invention also provides a MDD system including a MDD and a MDD front end of this invention.

The present invention also provides a graphics user interface (GUI) for improved visualization of multidimensional data which includes at least one of the following graphics techniques: a scoping graphics technique; a multidimensional decision tree graphics technique; a star graphics technique; a pivot tree graphics technique; a pixel graphics technique; and surfacing graphics technique.

The present invention provides a polyscope graphics technique including selecting a plurality of variables and a sequencing variable, generating all combinations of the plurality of variable taken either two at a time or three at a time, plotting all combinations in a 2D or 3D scatter plot and stacking the 2D or 3D scatter plots relative to the sequencing variable. Optionally, the technique can include connecting corresponding points in each stack 2D or 3D scatter plot with line segments or with a regression fit curve. Additionally, the technique allows for the stacked construct to be progressed through the entire range of the sequencing variable or through any sub-range. The automated progression option can include fade in fade out animation and other visualization techniques to highlight the change in the position of the points in the 2D or 3D scatter plots relative to the sequencing variable.

The present invention also provides data manipulation and analysis or mining techniques including at least one of the following techniques: a multidimensional decision tree generator; a cross-tab and cross-tab cell ranker (ACTG); a decision tree to cross-tab converter; a technique for identifying interesting nodes in a decision tree; a technique for constructing filters corresponding to the tree path leading to the interesting nodes; and a correlation technique.

The present invention also provides for methods utilizing all aspects of the present invention. Specifically, the present invention provides a method for extracting data from an MDD including the steps of sending a query to an MWI of the present invention from a DMT, parsing and translating the query into syntactically valid MDD commands, sending the commands to the MDD, receiving data corresponding to the command from the MDD and sending the results of the query back to the DMT.

The present invention also provides methods for visualizing, manipulating and/or analyzing or mining data implemented on a computer or digital processing unit including the step of performing at least one graphics technique of the present invention and/or at least one of the analysis technique of the present invention.

DESCRIPTION OF THE DRAWINGS

The invention can be better understood with reference to the following detailed description together with the appended illustrative drawings in which like elements are numbered the same:

FIG. 38 depicts a cross-tab of interest derived by selecting an correlation result from a list of results and dropping the result into a cross-tab graphics window;

DEFINITIONS

Figure 1:
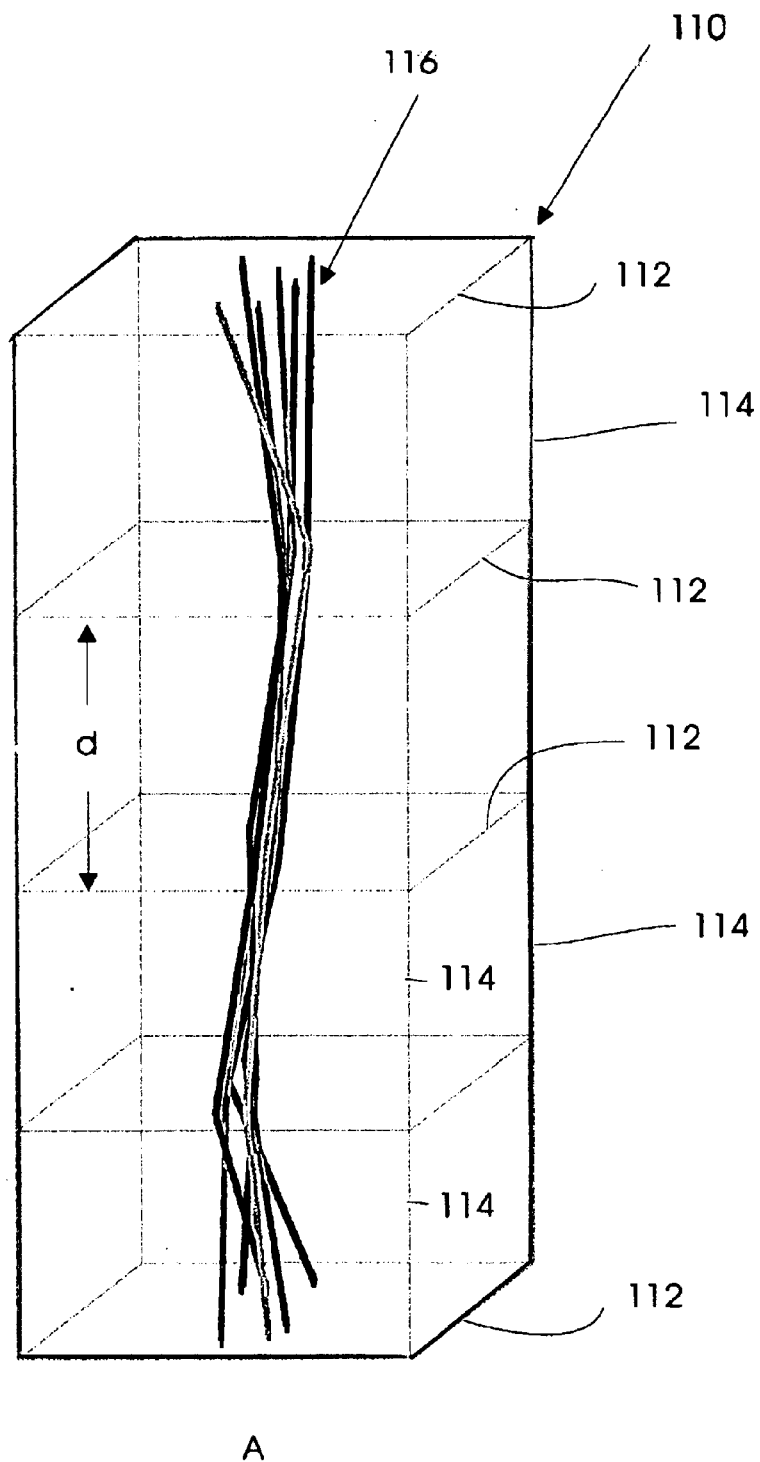
FIGS. 1A–D show views of a scoping construct of this invention derived from 2D scatter plots viewed along the x, y and z axes with shades of grey differentiating corresponding points and the lines connecting corresponding points.
Figure 1:
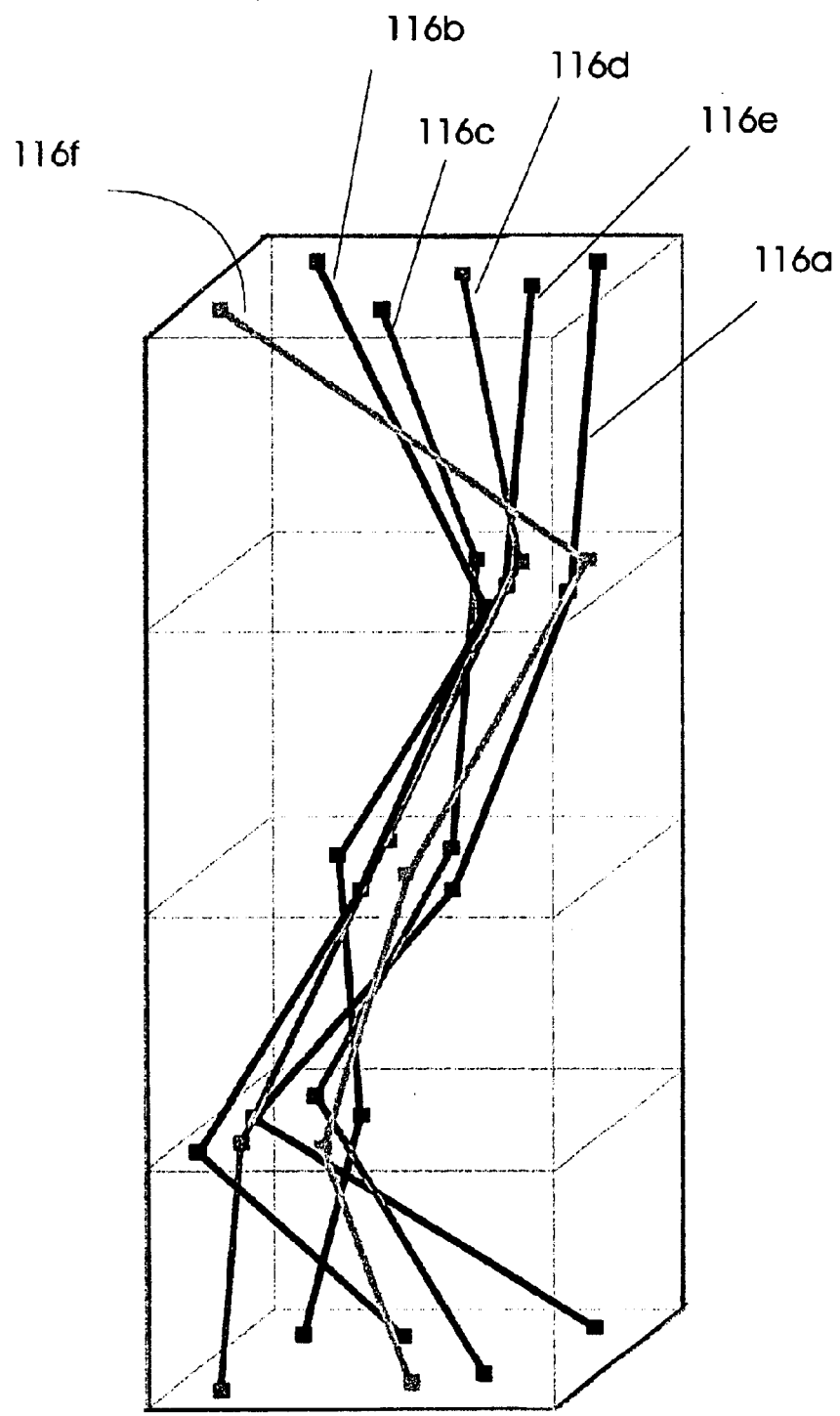
Figure 1:
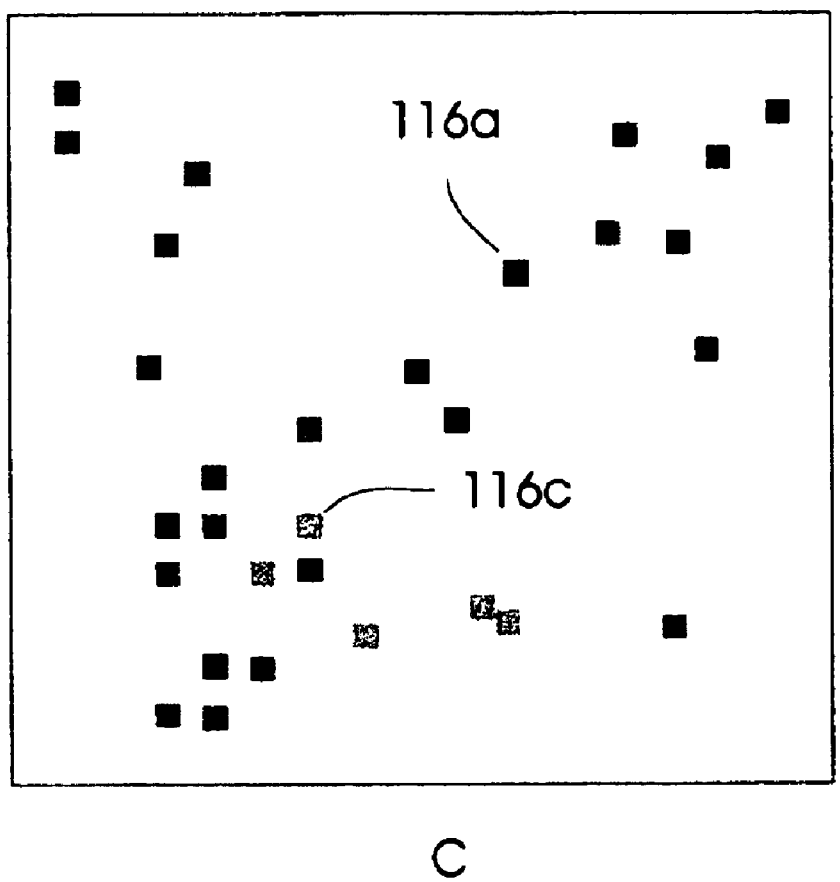
Figure 1:
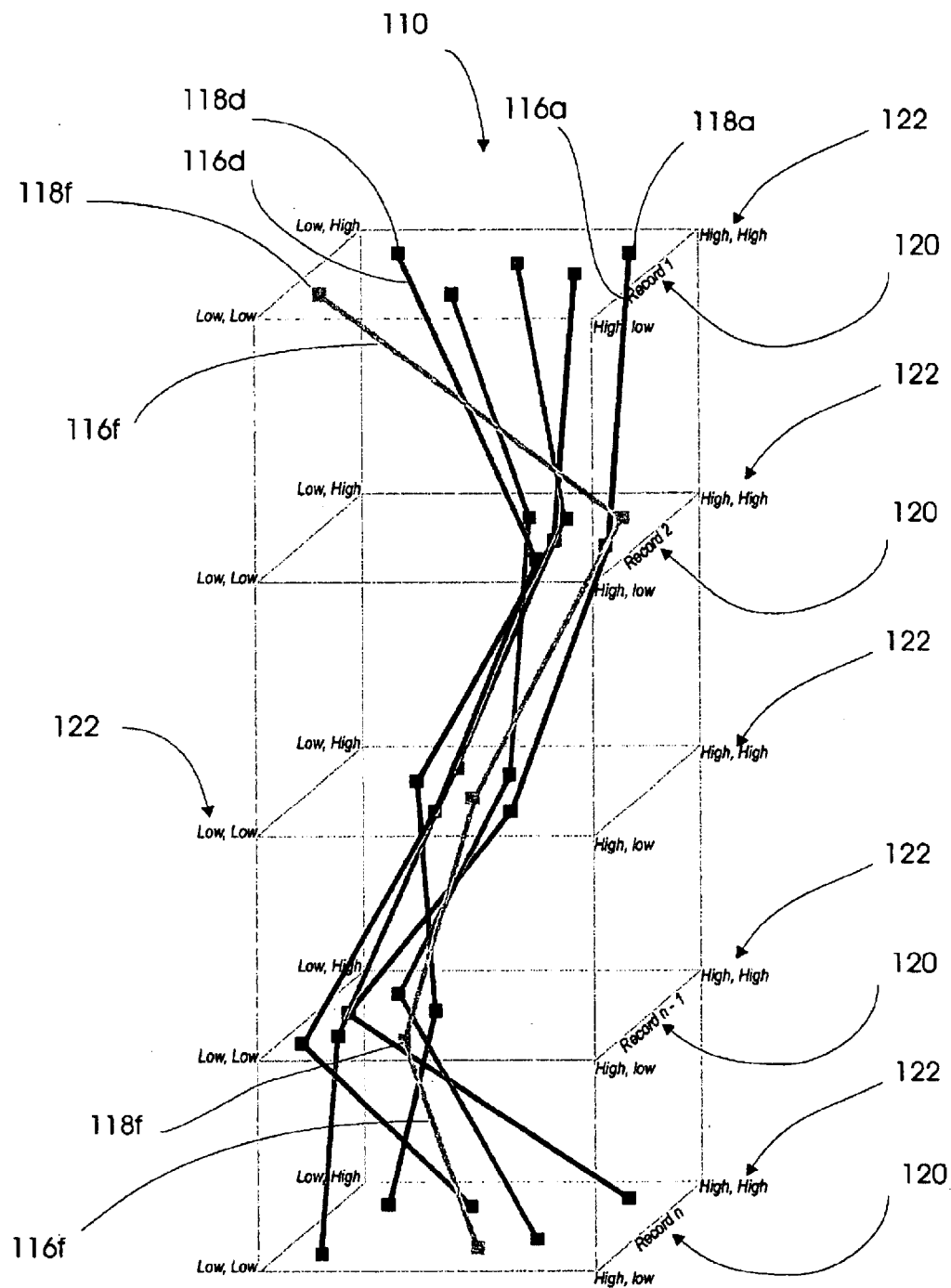

The term "MDD" means multidimensional databases such as MicroSoft Analysis Services, Hyperion Essbase, or the like.

The term "DMT" means data mining technique.

The term "Middleware" is a interface between a MDD and a DMT which queries to flow to the MDD from the DMT and results (data) to flow from the DMM to the DMT and handles all necessary transitions for efficient query and data exchange.

The term "data mining technique" means one or more mathematical operations that convert raw data into information or into meaningful data.

The term "meaningful data" mean data from which information is readily extractable, such as an average, std, variance, or like.

The term "middleware" means an interface between a MDD and any routine that requires data from the MDD.

The term "MWI" means middleware interface.

The term "cross-tab" is a 2D view of an n-dimensional matrix.

DETAILED DESCRIPTION OF THE INVENTION

The inventor has found that a system can be implemented on a digital processing unit to facilitate a more robust interaction with a multidimensional database (MDD), where the system includes an MDD and a front end including at least one data mining and a middleware interface (MWI) and optionally a graphics user interface (GUI). The MWI allows an dynamic asynchronous interface between query generating routines (a DMT), which are generally accessible using a GUI and a manager of an MDD. The asynchronous nature of the MWI is controlled by unique query identifiers created by each DMT when a query is sent to the MWI. The MWI then parses and translates the query into MDD commands which are forwarded the manager of the MDD via an MWI agent via establishing a unique synchronous communication channels or threads between the manager and the agent which exist until the manager send the requested data to the agent.

The inventor has also found that a GUI including a set of novel data visualization techniques associated graphics manipulation functions, methods and/or routines implemented on a computer can be constructed to allow enhanced display, manipulation, and visualization of multidimensional data and/or to identify, predict and determine possible relationships between variables or attributes within one dataset and/or relationships between variables or attributes of one dataset and variables or attributes of another dataset or any combination thereof. The GUI and associated routines can be used on any dataset and/or database or collection of datasets and/or database where the information or records includes a set of attributes or variable associated therewith. Such information could include sales figures regarding items sold by a set of stores; physical observables of systems such as chemical, mechanical or physical systems; or any other type of data which has either numerous records or numerous attributes or variables associated therewith.

The present invention relates broadly to a system implements on a digital processing unit including a multidimensional database (an MDD) and an MDD front end, where the front end includes a middleware interface (an MWI) and at least one query generator or data mining technique (a DMT) and optionally a GUI of this invention.

Although several unique query generators or data mining techniques are described herein, the MWI of this invention can work in conjunction with any query generating routine. The MWI of this invention includes a query receiver adapted to receive a query from a DMT where the query includes an identifier including a DMT identifier for use by the MWI and a query identifier for use with the DMT and result sender adapted to send the results of the query back to the identified DMT. The MWI also includes a parser which breaks the query into one or more elements, where the elements are a syntactically valid MDD command, a word, phrase or symbol representing a set or series of MDD commands and This invention allows the display, manipulation, analysis and visualization of data having multiple attributes or variables and interrelationships between such attributes and variables. To accomplish this display, manipulation and visualization, the invention uses at least one and preferably a plurality (more than one) of the following functions, routines, methods or functional aspects of this invention: (1) a scoping construct generator involving stacking 2D or 3D scatter plots to form a scope-like 3D construct to show the change in the data represented in the scatter plots relative to a sequencing variable; (2) a star construct generator involving stacking radially distributed data and connecting corresponding adjacent data pairs with surfaces; (3) a surfacing construct generator involving collection of data shown as patched surface segments in a rectangular solid; (4) a multidimensional decision tree construct generator involving displaying hierarchical value-based data as concentric rings surrounding a central; (5) a pivot tree construct generator involving the construction of a tree representation of data where the dependent variable is a multidimensional cross-tab; (6) cross-tab pixel construct generator; (7) a multidimensional decision tree generator; (8) a cross-tab and cross-tab cell ranking routine; (9) decision tree to cross-tab conversion routine; and (10) routines for identifying interesting nodes in a decision tree and for construction the filter corresponding to the tree path leading to the interesting nodes.

Suitable multidimensional data sources include, without limitation, data derived from datasbases or datasets with large numbers of records or many smaller databases or datasets or any mixture or combination of data derived from any source of interest.

Suitable digital processing units include, without limitation, any unit including a processor, memory, communication hardware and software and peripheral that can execute the routines of this invention and interact with multidimensional database via the middleware interface of this invention. Such units include Intel based systems, Motorola based systems, Sun Microsystem based systems, AMD based systems, IBM based systems, Compac based systems, or the like. The systems preferably include operating systems particularly windowing operating systems such as Windows, Mac OS, Linux, or the like.

GENERAL ATTRIBUTES

The models and routines of the present invention are designed to incorporate a set of attributes that are common and apply to all models. This set of common attributes include, a window having four active windows embedded therein a graphics window, a data variable selection menu window, a results window and a graphics summary window. Also common to all models and routines of the present invention are graphics attribute selection menus and manipulation selection menus.

GENERAL APPLICATION ATTRIBUTES

The models of the present invention and incorporated in the GUI of the present invention are preferably implemented on a computer having installed thereon a windowing operating system. However, the GUI and the models incorporated therein can be implemented on any operating system provided that GUI has associated with it software to display, manage, create and store windowing or menu display formats.

The operating systems or associated programs should also support the display of multiple windows and windows with tabs and/or sheets associated therewith as is well-known in the art. The operating system and associated software should allow the user to invoke procedures for saving display states of interest as single files or as part of a book having multiple windows/tabs/sheets that can be retrieved or restored to the GUI for further display and manipulation by the user. The operating system and the GUI and associated software of the present invention can be implemented on any type of computer system with sufficient resources to allow for the execution of the programs implementing the GUI and associated software of the present invention. Suitable computer systems include, without limitation, stand alone, networked, distributed or any other type of computer system well-known in the art. The operating system and/or environment should also support cut, copy and paste procedures so that a model or a give display format can be cut from, copied to or pasted into or onto one or more windows, window tabs and/or window sheets or stored for recall later.

The GUI of the present invention is designed so that all of the models/graphs are inter-linked with each other. Thus, when a user selects one or more points/objects in one model, the selected information can be high-lighted in other models or in related data display formats such as spreadsheet formats. Similarly, the models and other data display formats such as spreadsheets can be tied together allowing the user to be able to select a range of records in the spreadsheet and these points or records will be high-lighted in the models, and vice versa.

The GUI also provides the user with the procedures to select one or more points/objects in one model and cut them from the dataset. Likewise the user can cut one or more points/objects from an associated spreadsheet and the effect will be shown in the respective models. Additionally, the GUI and underlying software available either in the operating system or an associated software product will allow objects in a display window to be dragged, dropped, turned, moved, scaled or sized or any other standard window manipulation available using a keyboard, mouse, data tablet, touch screen, any other communication device or combinations thereof.

CONTROL PANEL

The GUI and associated software allows the user through the use of a control panel menu selections driver to assign variables to axes such as the x-axis, y-axis, and/or z-axis; assign one variable to size, one variable to color and/or one variable to geometry; and/or to assign variable to any other representational format displayable on a display device associated with a computer.

Besides the general and more specific attributes and capabilities of the GUI, associated software, operating system routine and routines from other applications for display control, IO control, database access, and other similar system capabilities, the GUI's of the present invention can include any one of the following routines for the display, manipulation, analysis and visualization of multi-dimensional data.

SLIDER

Many of the routines that comprise part of the GUI of the present invention use a technique called a slider to aid in the display and analyze of multi-dimensional data. A slider is a type of filter or constraint which allows a user to play what-if scenarios by presetting one or more variables to a given value and analyzing the values other variables assume at that preset value of the slider variable. The slider variable gets its name because the user can adjust the preset value by sliding a slide bar in a window between the slider variable's minimum and maximum values within the data. There is no practical limit to the number of sliders variable a user can define, provided that all variables are not slider variable.

Slider Mechanics

The dataset of Table 1 will illustrate how a slider works and the visual consequences of a slider variable constraint.

TABLE 1

| RecNo | A | B | C |
|-------|---|---|---|
| 1 | 2 | 2 | 3 |
| 2 | 5 | 5 | 5 |
| 3 | 2 | 1 | 2 |
| 4 | 1 | 4 | 2 |
| 5 | 4 | 2 | 3 |
| 6 | 2 | 2 | 5 |
| 7 | 3 | 3 | 4 |
| 8 | 2 | 2 | 1 |
| 9 | 5 | 1 | 1 |
| 10 | 4 | 4 | 4 |
| 11 | 1 | 5 | 5 |
| 12 | 2 | 5 | 2 |
| 13 | 5 | 2 | 5 |
| 14 | 4 | 1 | 3 |
| 15 | 1 | 4 | 3 |
| 16 | 2 | 2 | 2 |
| 17 | 3 | 3 | 4 |
| 18 | 5 | 5 | 2 |
| 19 | 4 | 1 | 3 |
| 20 | 2 | 1 | 4 |

Selecting variable A as the slider variable, the effect of changing the value of A (sliding through its data range) on variable C can be observed. Variable A ranges between 1 and 5, meaning that variable A can slide between 1 and 5. When variable A is 1, C is 2, 3, 5 for records 4, 11, 15, respectively; when variable A is 2, C is 1, 2, 3, 4, 5 for records 1, 3, 6, 8, 12, 16, 20, respectively; when variable A is 3, C is 4 for records 7, 17, respectively; when variable A is 4, C is 3, 4 for records 5, 10, 14, 19, respectively; and when variable A is 5, C is 1, 2, 5 for records 2, 9, 13, 18, respectively. Thus, when the slider representing variable A is set at its minimum value of 1, values 2, 3 and 5 for variable C would be displayed. Similar results occur as the slider is moved from the minimum value of variable A to its maximum value.

From this example we learn that there is a close relationship between A and C, especially when A is 3 because there is only one value of C (4), and a loose relationship when A is 2 because there are five values of C (1, 2, 3, 4, 5).

Next, both variables A and B can be selected as slider variables. Looking at the data in Table 1, the effect of these two sliders on variable C can be determined as follows:

| | |
|---|---|
| when A = 1 & B = 4, C = 2, 3 | (records 4, 15) |
| when A = 1 & B = 5, C = 5 | (record 11) |
| when A = 2 & B = 1, C = 2, 4 | (records 3, 20) |
| when A = 2 & B = 2, C = 1, 2, 3, 5 | (records 1, 6, 8, 16) |
| when A = 2 & B = 5, C = 2 | (record 12) |
| when A = 3 & B = 3, C = 4 | (records 7, 17) |
| when A = 4 & B = 1, C = 3 | (records 14, 19) |
| when A = 4 & B = 2, C = 3 | (record 5) |
| when A = 4 & B = 4, C = 4 | (record 10) |
| when A = 5 & B = 1, C = 1 | (record 9) |
| when A = 5 & B = 2, C = 2 | (record 13) |
| when A = 5 & B = 5, C = 2, 5 | (records 2, 18) |

Thus, when slider A is set to its minimum value of 1 and slider B is set to a value of 4, variable C has two values 2 and 3. Also, variable C has no value (there are no records) when A=1 and B=(1 or 2 or 3). From the data, variable C has the most number of values when A=2 and B=2, i.e., C=1, 2,3, and 5.

Slider Properties

1. Any variable or number of variables can be assigned to be a slider variable. Each slider will result in a slider window dedicated to it. Generally, each window will be labeled so that user can identify the active slider variables. The slider range (range of values over which the slider variable can range) can be automatically defined (full range—min to max) or manually defined. The slider slide can be manually moved through its range or the GUI can automatically move through the slider range. The GUI can also cycle through the slider range with respect to each non-slider variable or a set of non-slide variable at any speed limited only by the refresh rate of the display and memory capability of the operation system and video drivers.
2. A slider can be enabled or disabled. Enabling generally involves either a keystroke or menu command followed by variable selection; while disabling generally involves a simple keystroke or menu command.
3. The user can also stack different ranges for a given slider variable to simultaneously view the slider variable effects on other variables in different ranges of the slider variable. Thus, if a variable is related in a periodic fashion to a slider variable, then using multiple ranges for the slider variable allows visual determination of the period.
4. Using more than one slider variable, produces an intersection set of variable values where the filter constraint of each slider variable is true, e.g. the set of all data entries having variable A=x and variable B=y.
5. Sliders can aid the user in visually discern relationships between variable such as direct, inverse, periodic or random.
6. The user can specify an XOR condition, meaning the range other than what is selected is desired. The user can also combine slider variable ranges in standard Boolean operations.

How a Slider Works

The minimum value of the slider variable is set at the beginning—left-hand side—of the horizontal bar of the carousel, and the maximum value is set at the end—right-hand side—of the horizontal bar. As a range is selected on the slider, the points—if any—in this range are considered active and all other points are considered inactive.

SCOPING GENERATOR

The present invention is also directed to a graphics technique for showing data trends over three or more variables in a scoping type format. The scoping generator provides a mechanism by which a user can view the interactions and/or relationships between two or more variables, two at a time (pair-wise)—2D scatter plots, or three at a time (triple-wise)—3D scatter plots, relative to a sequence variable or over a desired sequence of records in a dataset.

A scatter plot is a useful summary of a set of bivariate data (two variables). It gives a good visual picture of the relationship between the two variables, and aids in the interpretation of correlation coefficients and/or data regressions fitting parameters. Each combination contributes one point to the scatter plot, on which points are plotted but not joined. The resulting pattern indicates the type and strength of the relationship between the two variables. If the points tend to cluster along a straight line, then the variables tend to be linearly related. If the line along which the points tends to cluster runs from the lower left (low, low) to the upper right (high, high) of the quadrilateral, then the relationship between the variables tends to be a direct or positive relation or direct proportionality. If the line along which the points tends to cluster runs from the upper left (low, high) to the lower right (high, low) of the quadrilateral, then the variables tend to be inversely related or proportional. If there exists a random scatter of points throughout the quadrilateral, then there is no relationship between the two variables and the variable may represent independent variables for the data being displayed. Very low or zero correlation could result from a non-linear relationship between the variables. If the relationship is in fact non-linear (points clustering around a curve, not a straight line), the correlation coefficient will not be a good measure of the strength. Besides a non-linear relationship between the variables, a scatter plot can be used to identify outliers in the data.

The scoping generator generates these scoping constructs by connecting data points in one record with corresponding data points in an adjacent record, where the term record represents the selected variables relative to the sequence variable or relative to a data sequence inherent in the database from which the data is being extracted. The data for each record can either appear as points in a 2D form (square or rectangular planar surface) or in a 3D form (a cube or rectangular solid). As the generator stacks the 2D or 3D forms one on top of the other or side by side, the generator connects corresponding data points with a line or a smoothed curve. If construct includes more than one point, then several lines are generated. Unless all lines are coincident, the lines will be oriented in three dimensional space in accord with the change in value from one record to the next. When a three dimensional object moves in space, it defines a four dimensional space; thus, allowing the user to see how triplets are changing values from one record to the next. The scoping generator facilitates the study of these lines, objects and spaces.

Stacked 2D Scoped Constructs—Data Values Taken Two at a Time

The user begins by selecting a desired number of variables and a sequencing variable from a list. If no sequence variable is selected, the generator assumes that the sequence variable is the database record storage sequence. Once the user has selected the variables, the scoping generator computes all pair-wise combinations of the selected variables using the formula for defining combinations (n!)/(m!×(n−m)!). For example, if the user selects four variables A, B, C, and D, then n equals 4 and m equals 2 giving rise to six combinations: AB, AC, AD, BC, BD, and CD. Preferably, the scoping generator normalizes the extracted data. Next, for each record, the scoping generator computes each point and plots the six points on a single xy plot. This overlaying process can be understood by first making a xy plot for each combination showing the xy point in the plot corresponding to the value of the two variables and then making the axis coincident. Now, the xy plot has points representing AB, AC, AD, BC, BD and CD. Each point can be separately color coded for visualization and recognition or the identity of each point can appear by touching a point with a pointer.

Next, to display multiple records, the generator stacks the scatter plots one on top of the other or side by side, giving the construct 3D character and a sense of change relative to the sequence variable or database sequence. Of course, if the data is time sensitive, the sequence variable may be time and the 3D stack scoping construct will show the feature of the data in time. In the prior art, scatter plots lack the concept of change relative to an sequence variable such as time, but stacking reintroduces the concept of change.

Next, the generator connects corresponding points in adjacent scatter plots with a line, i.e., the generator connect the points AB in two adjacent scatter plots with a straight line. Repeating this process for all combinations and all records, will complete the construct which will now comprise lines connecting corresponding values in the 3D scoping construct. By studying these lines, the user can discover the relationship amongst variables.

This mechanism has an advantage over a classical two dimensional scatter plot, because of the addition of a third dimension so that a concept of change can be visualized. In the traditional two dimensional scatter plot there is only one 2D view. However, in the 3D scoping constructs produced by the scoping generator there are six 2D view and one 3D view. Although there are six 2D views, only three views will be truly unique because the view from the negative direction and positive direction of a given axis will appear identical. Moreover, the 2D views are only special view of the 3D construct which can be rotated along all three axis to suit the user's discretion and viewing preferences. Hence, because a concept of change is introduced by stacking and the interconnection of corresponding points, it is possible for the user to better recognize data relationships or potential relationships which might otherwise be hidden in viewing separate two-dimensional-scatter-plots.

Stacked 3D Scoped Constructs—Data Values Taken Three at a Time

As in the 2D case, the user begins by selecting a number of variables—three or more—from a list and an sequence variable. Again, if the user does not select an sequence variable, then the generator uses a record sequence inherent in the database from which the data is extracted. Once the user has selected the variable, the scoping generator computes all triple-wise combinations of the variables using the combination formula (n!)/(m!×(n−m)!). For example, if the user selected five variables A, B, C, D, and E, the combinatorial triplets are ABC, ABD, ABE, ACD, ACE, ADE, BCD, BCE, BDE and CDE. Again, the generator preferably normalizes the extracted data. As in the case of the 2D scoping constructs described above, the generator plots all of the points in a single 3D form, which is a unit cube if the data is normalized and a rectangular solid if the data in un-normalized. Thus, for the six variable selected above, the unit cube will contain ten points representing the combinations of five variables taken three at a time. Of course, the cube represents a standard three dimensional scatter plot and the cube will be contain points equal to the combinations of n things taken 3 at a time.

Now, each record comprises a unit cube containing the ten points corresponding to the five variable taken three at a time. As in the 2D scoping construct, the generator next stacks the cubes one on top of the other or side by side giving rise to a change in 3D relative to the sequence variable, a visualization of a four dimensional data or the concept of the change in 3D relative to an sequence variable which can be time or a time equivalent. The cubes can be placed to form a variety of configuration such as a Rubik™ Cube configuration, a linear configuration, a helical configuration, a circular configuration of the like.

Next, the generator joins or connects corresponding points from one cube to the next, i.e., the generator connects the points ABC in two adjacent cubes with a straight line. Repeating this process for all corresponding points for all records, generates a scoping construct showing data trends in four dimensions. By studying these connecting lines between corresponding points in adjacent cubes, the user can better visualize and identify data relationships or potential relationships among the selected variables relative to the sequence variable. In some instances there maybe too many records to plot, in this case, the user can specify a sliding range. Of course, as it true with most if not all of the constructs of this invention, the user can animate the presentation so that the lines can be shown progressing from start to finish. Additionally, the user can as for statistical information about each level or over the entire set of records and statistical values can also be displayed in the constructs.

The generator also provides line fitting capabilities such as spline smoothing, least squares analysis or the like. The user can also plot statistics lines represent in the mean, median, or the like. The generator can perform shape and size statistics on the distribution of points in each scatter plot. The user can interactively select (turn on and off) one or more variable combinations or any set of variable combinations. The user can also turn on and off the connecting lines, planes outlines, cubes outlines, etc.

Since this data stacking technique generates three dimensional constructs, the user can view the construct in any spatial orientation; six of which are views down one of the major axes, i.e., views along the x, y or z axes. If the stacking is occurring along the z-axis (the sequence variable), then looking down the z axis, with the connecting lines feature turned off, the user sees a scatter plot similar to a standard two dimensional scatter plot. Looking at the construct along either the x or y axis, with the connecting line feature turned off, the user sees a unique and novel view of the construct which shows the points distributed in the construct relative to the variable of change.

Detecting Trends Among Variable in a Scoping Construct

A connecting line can be a jagged line or a straight line. If the connecting line is a jagged line, then it maybe a straight line when viewed from another viewing direction. However, a connecting line will remain straight regardless of the viewing direction. If in any perspective there are more than one straight line, then these straight lines represent variable whose values are proportional. If in any perspective there are more than one symmetrical line, then these symmetrical lines represent variables whose values are proportional.

A two-dimensional scatter plot represents data as points in plane, with the plane being represented by a pair of perpendicular axes sized to accommodate the range of the data being displayed. If the data is normalized, then the range is 0 to 1 in both the x and y directions. Each point signifies two values and their relationship to one another. The overall plot shows the relationship between all the data pairs. A property varying over time is a good example of a possible two-dimensional scatter plot.

Interaction Between a Scoping Construct and a Scatter Plot Matrix

If the user is dealing with many variables in a dataset, a way of presenting all possible scatter plots of two variables at a time is in a scatter plot matrix. A scatter plot matrix is simply all possible 2D scatter plots presented in a matrix format where the columns and rows are the selected variable to be combined into pairs.

In the scatter plot matrix, there is an option by which the user can turn on or off the triangle below the diagonal without loss of information because each plot is repeated twice in the matrix and the diagonals scatter plots are meaningless. When the lower triangle is turned off, the scatter plot matrix will contain only combinations, no permutations.

The user will be able to click on a scatter plot and the corresponding scoping construct point is highlighted. Conversely a click on a scoping construct line, then a corresponding scatter plot in the matrix is highlighted. Alternatively, when a label is selected/highlighted in the scatter plot, then the corresponding line in the scoping construct is also highlighted. In other words the user will be able to select a line by selecting a label and vice versa.

Point and Line Recognition in Scoping Constructs

Each point and line in a scoping construct are active. When a user places the cursor on point of interest, that point is highlighted, but not the entire line. Similarly, if the user places the cursor on a line, then the line and all points associated with line are highlighted (made thicker, made brighter, or augmented in some way that is visually perceivable by the user).

The user will be able to enlarge any one cell to fill the entire scatter plot matrix window. When this happens appropriate scaling factors will appear on the axes and the name of the variables can also be displayed. Of course, the user can always go back to the un-enlarged state.

The user can also color coordinate the scatter plots in the matrix with the color of lines or curves in the scoping construct connecting the corresponding points. The user can also change the background color to any color including black.

Additionally, the user can have the system generate dual axes line graphs for each scatter plot and display these graphs in the scatter plot matrix or in a separate matrix. A single point in the scatter plot will be 2 points in the dual line graphs. The user can also include one type of plot in the upper half diagonal and include a second type of plots in the other or lower diagonal.

Animation of Data in a Scoping Construct

Suppose the user has selected combinational data to be sequenced relative to a sequencing variable having 100,000 values or combinational data from 100,000 records. The user decides to see only 1000 records in scoping construct. So the user sets up a slider that is 1000 records wide. Now the user can slide this 1000 record portal to any place within the sequencing data range.

The user can have the generator animate this process by automatically moving the portal from the beginning to the end by adding 1 record to one end (top or bottom) and by removing 1 record from the other end.

Scoping Construct Manipulation

The scoping generator has GUI icons, active axes and/or pull down menus for manipulating a given scoping construct. The construct can be rotated about any coordinate axis (x, y or z). The construct can be simultaneously view along the three major axis or construction axes. The connecting lines can be turned on and off using a toggle icon. The connecting lines can be smoothed to produce a curved linear function that can be approximated by a polynomial expression or other mathematical expression using a smoothing icon. The construct can be scaled independently in all three directions, e.g., the stacking distance can be reduced or expanded, the quadrilateral defined by the x and y dimensions can be increased or decreased in size or distorted in space (a transformation expanding or contracting x differently from y), etc. Groups of points or lines can be selected using a mouse produced selection box.

Additionally, the user can manipulate points while keeping the quadrilateral size constant. For example, out of total 5 points, the user may only want to see 3 of the 5 point. Thus, (while keeping the quadrilateral size constant), the user will be able to reduce the number of points from 5 to 3. When the user does this, he has in essence changed the y-axis (while keeping the x-axis constant) hence the user has accomplished a zoom along y-axis.

The following figures illustrate the scoping construct of this invention and are not meant to be limitations to the versatility of the construct.

Referring now to FIGS. 1A–D, three different views are shown of a scoping construct 110 of this invention of n variable taken two at a time where only six of the pair-wise combinations are shown. Of course, the user can choose to display all combinations or any subset thereof. The construct 110 includes a plurality of 2D scatter plots 112 representing the combination overlaid data as described above. Each plot 112 is separated by a separation distance d represented by line segments 114. Corresponding data in each plot 112 is shown connected by connecting lines 116a–f. The six connecting lines 116a–f and their corresponding points 118a–f are shown as different shades of grey in the figures. Looking at FIG. 1A, a x-directional view of the construct 110 is shown. Looking at FIG. 1B, a y-directional view of the construct 110 is shown. Looking at FIG. 1A, a z-directional view of the construct 110 is shown. From the x and y views, the user can obtain an idea of the manner in which the data in the 2D scatter plots is changing relative to the another variable, while from the z view, the user can obtain an idea of data clustering of the 2D points over the entire range of the other variable. Looking at FIGS. 1D, the construct 110 of FIG. 1B is shown with record labels 120 showing the value of the sequencing variable and vertex labels 122 showing the meaning of the vertices, i.e., low, low means that this point represents the minimum value for all the data in the corresponding 2D scatter plot, etc.

Figure 2A:
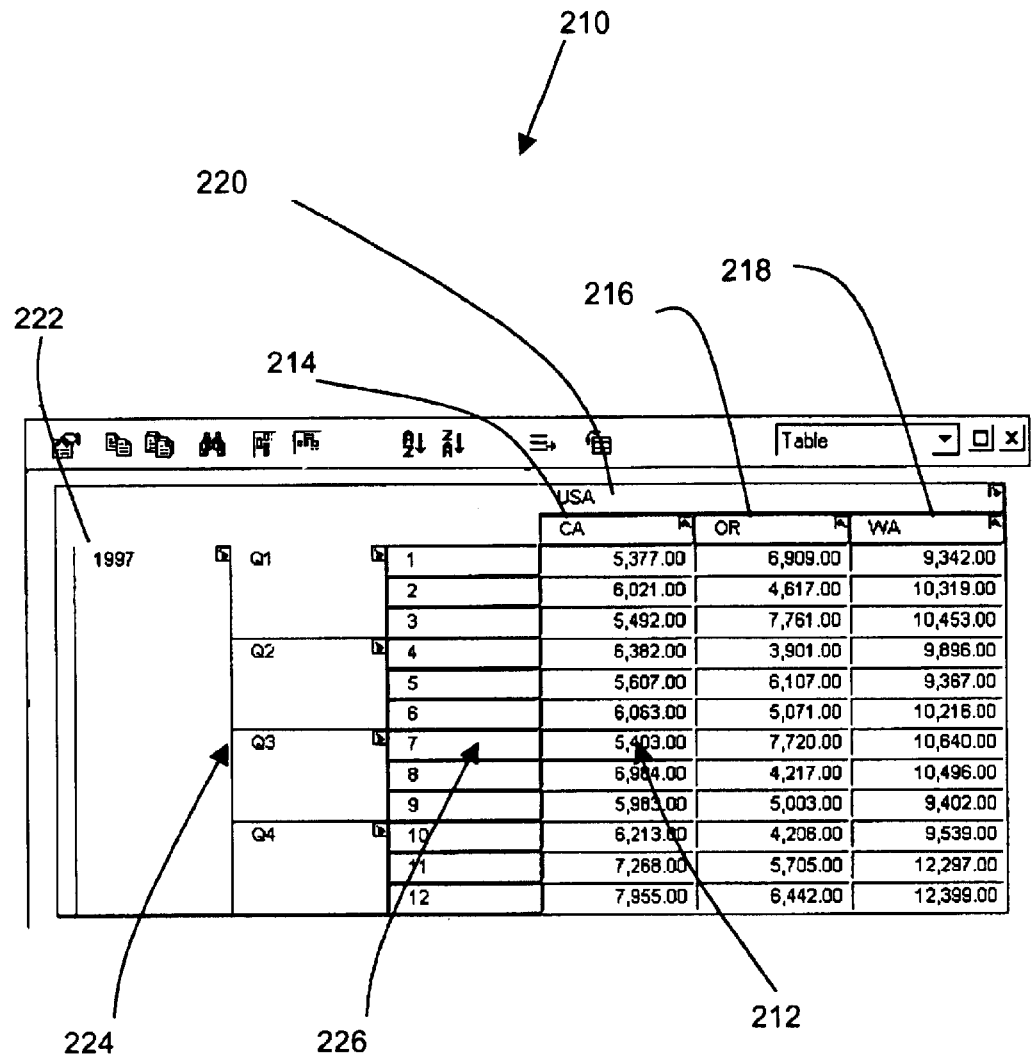
FIGS. 2A–G show a cross-tab data table and two set of perspective views of a scoping construct derived from 2D scatter plots of two variables taken two at a time viewed along the x, y and z axes, in a point only configuration and in a fitting curve configuration.
Figure 2:
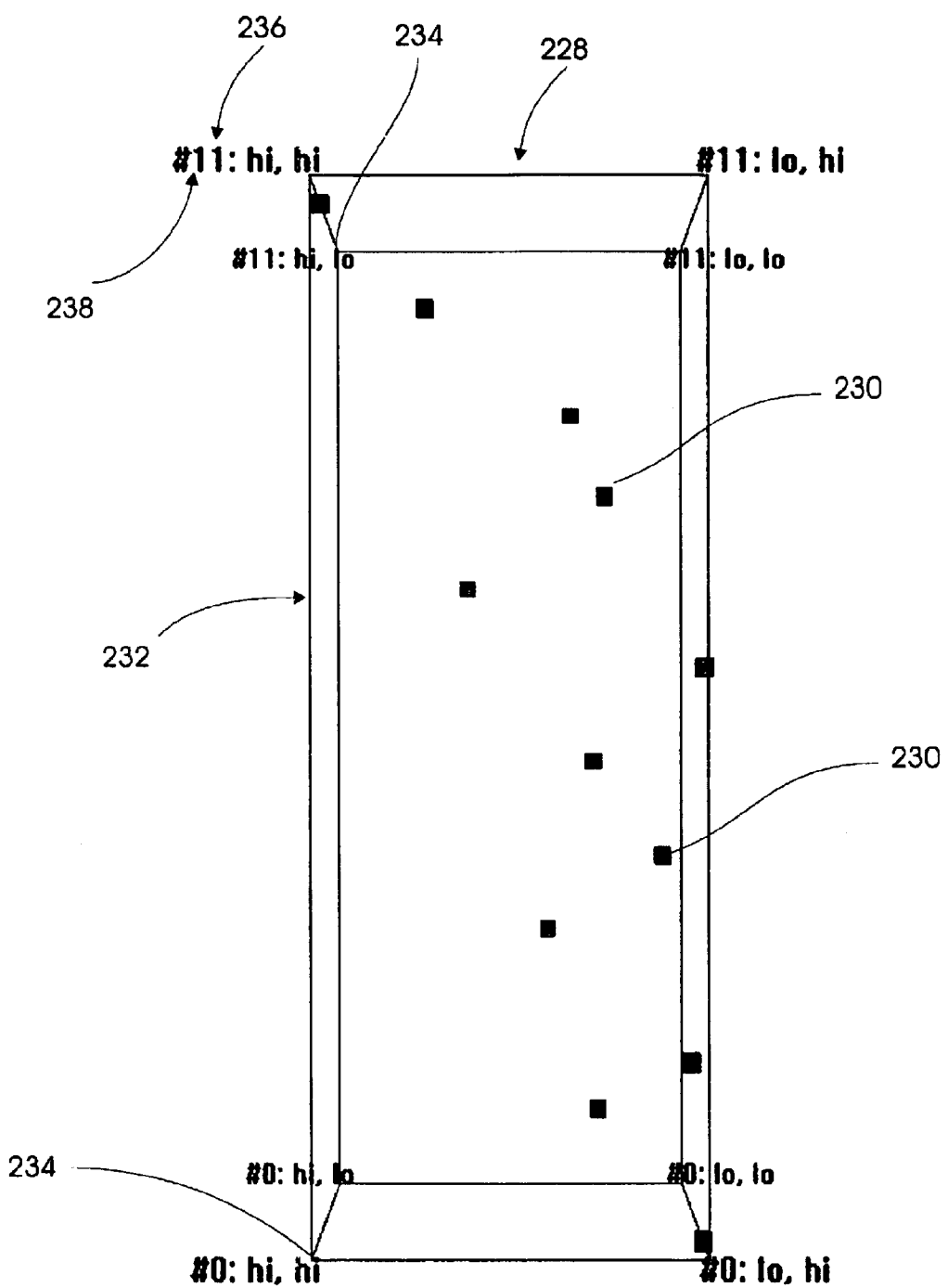
Figure 2:
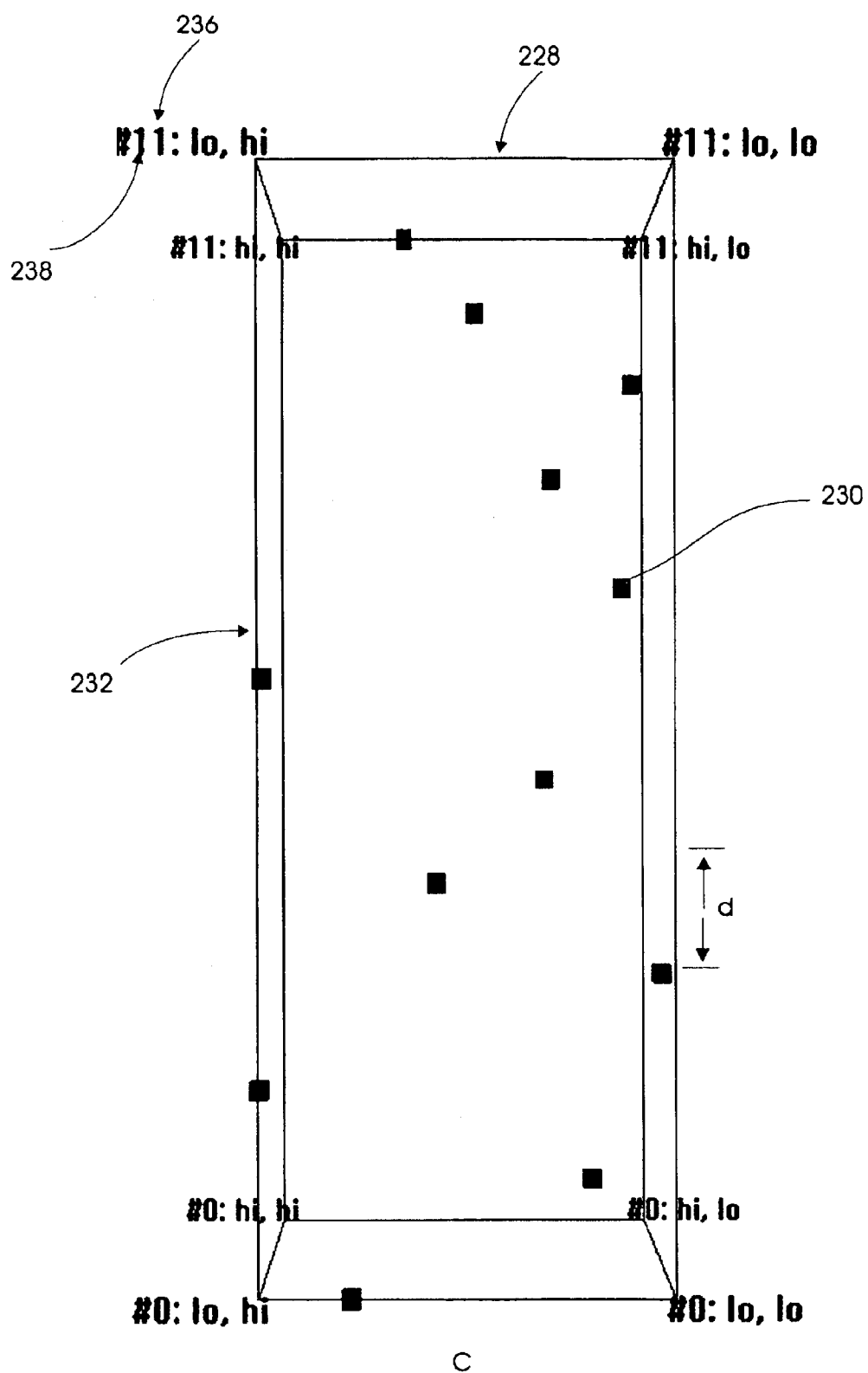
Figure 2:
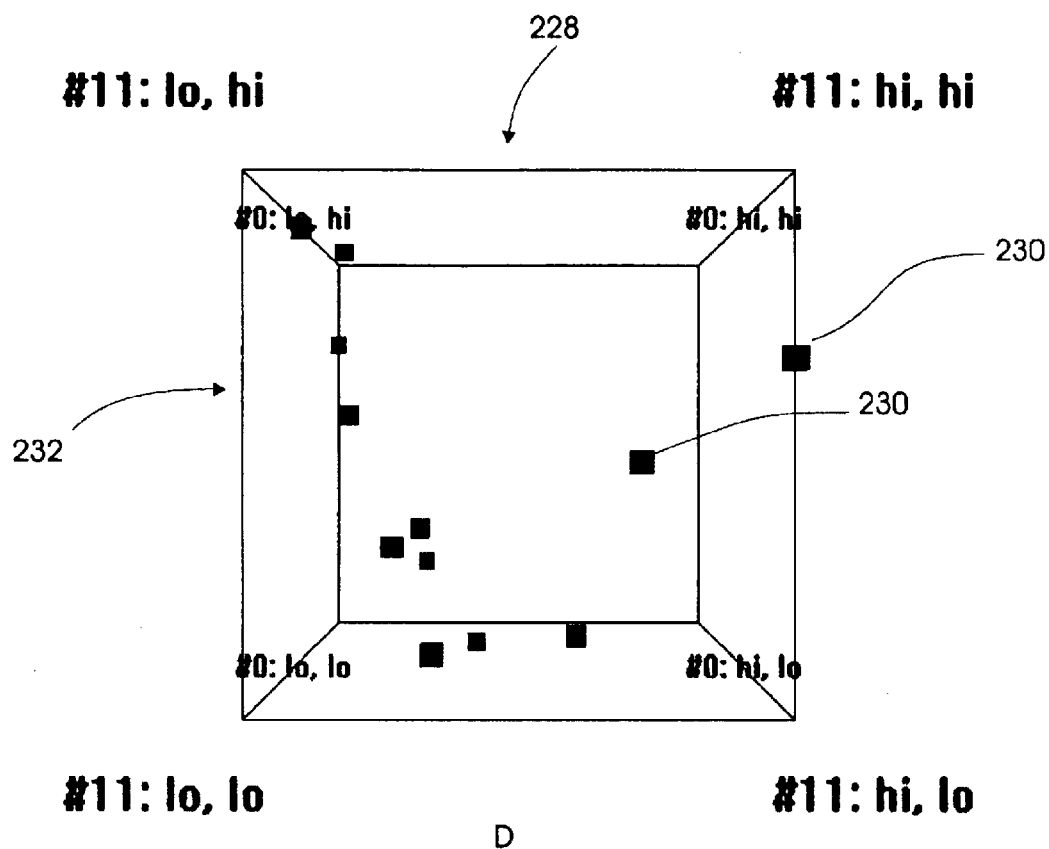
Figure 2:
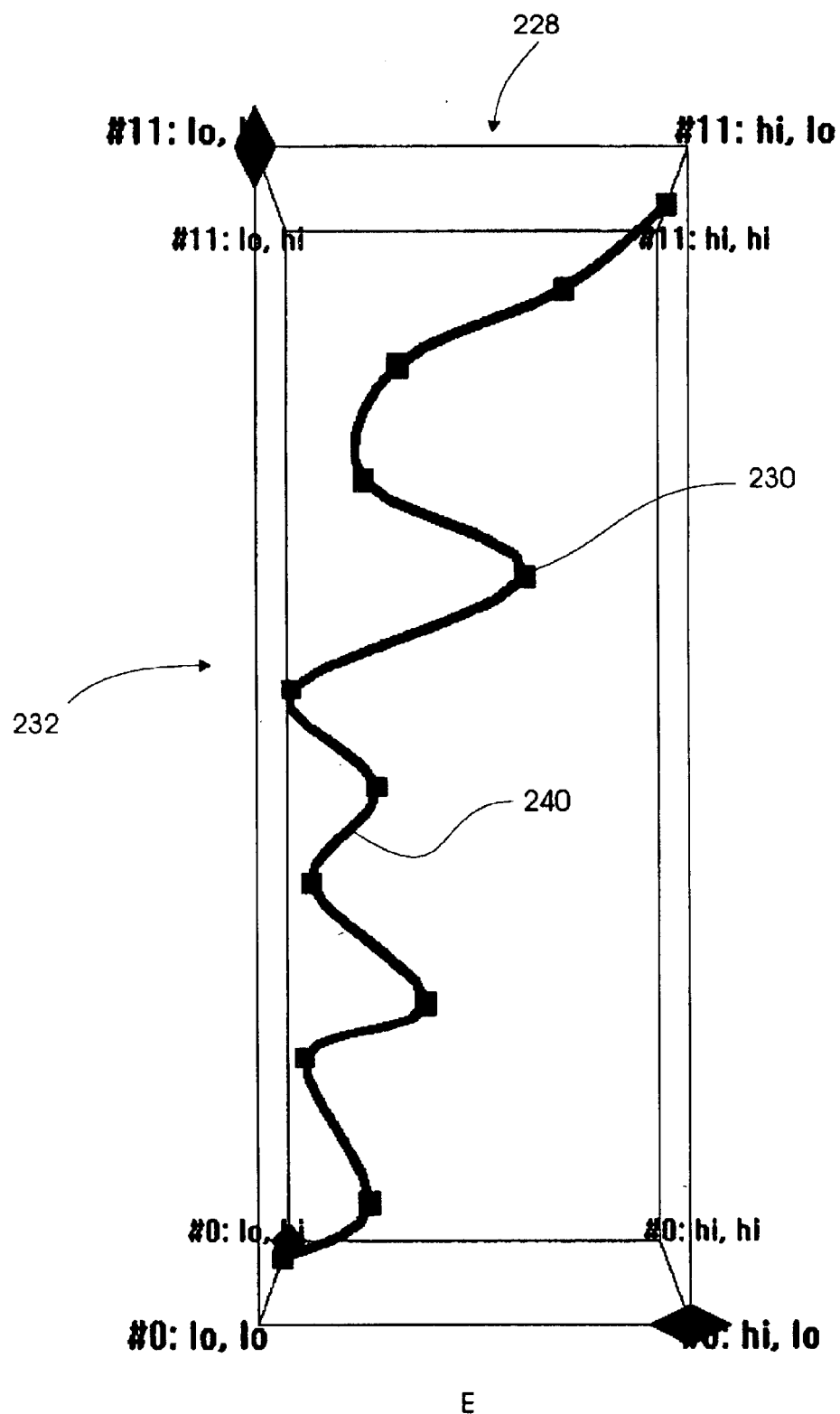
Figure 2:
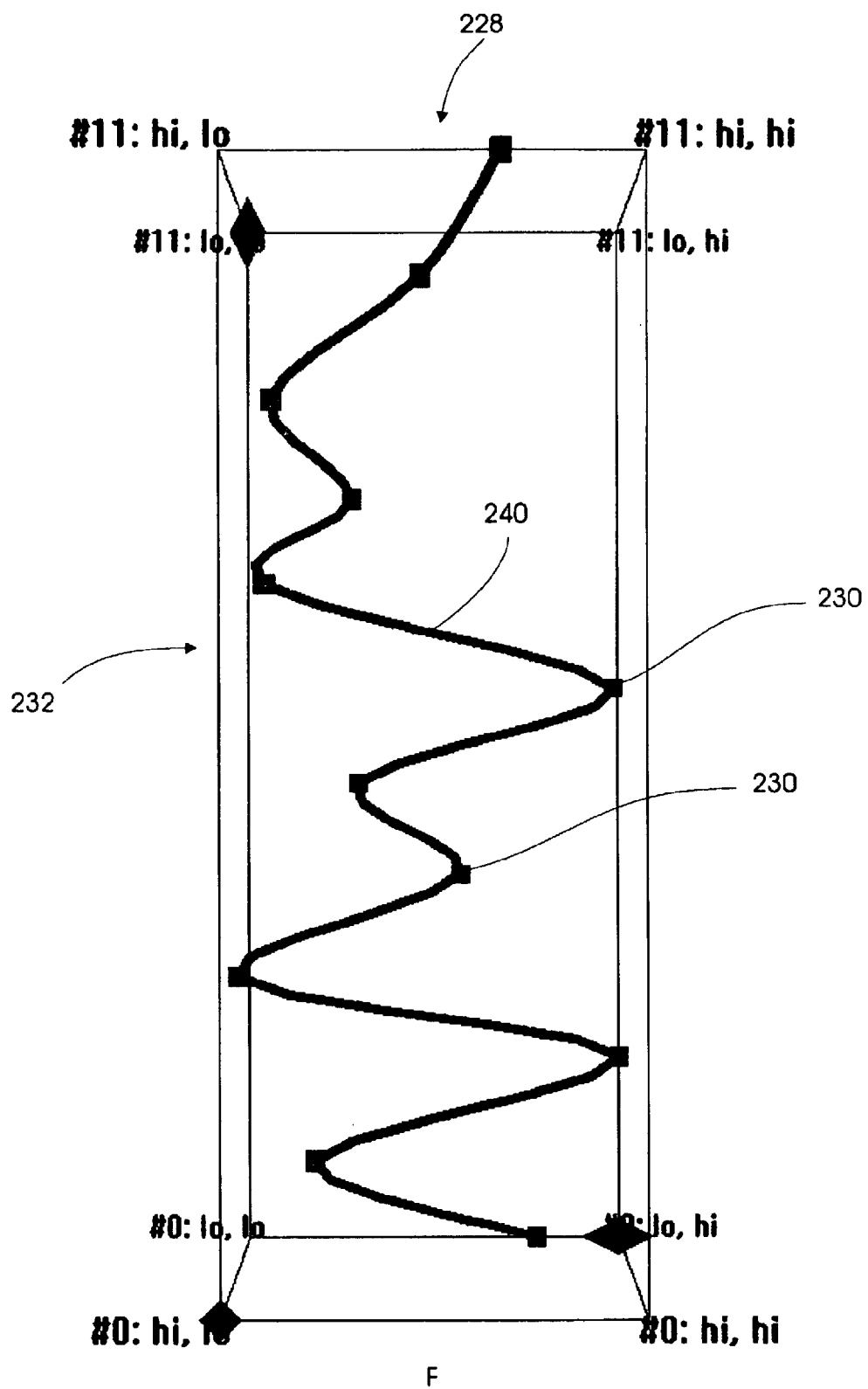
Figure 2:
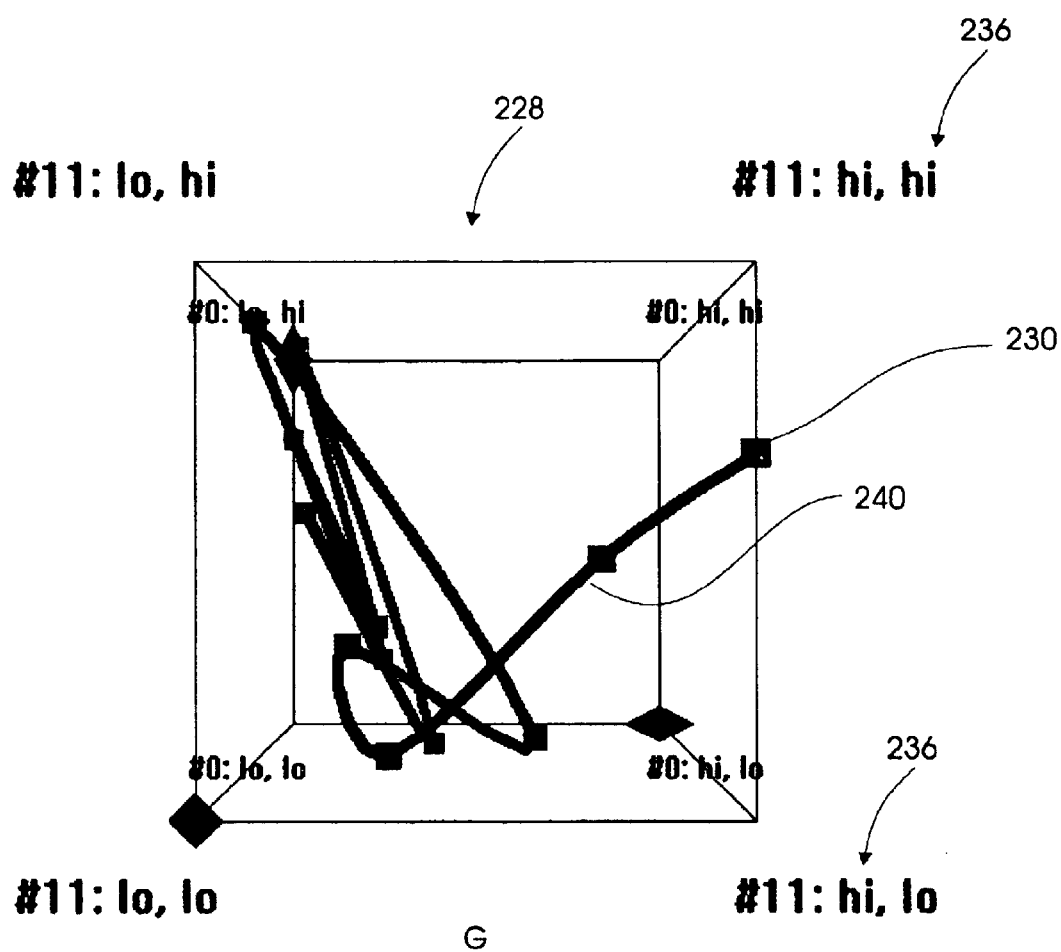

Referring now to FIGS. 2A–G, a scoping construct of this invention is constructed from the data shown in a cross-tab 210 of FIG. 2A. The cross-tab 210 shows profit (the measure) values 212 for the states California (CA) 214, Oregon (OR) 216 and Washington (WA) 218 in the USA 220 for the year 1997 222 in quarters 224 or months 226. FIGS. 2B–G show different view of the pair-wise combination of the data values for CA and OR in a construct 228. Looking at FIGS. 2B–D, the pair-wise 2D points 230 shown in a perspective rectangular solid shape 232 where each point 230 is separated from the next point 230 by a distance d. The corners 234 of the solid 232 are labeled with their appropriate combinational labels 236, i.e., low,low, hi,low, low,hi and hi,hi. Additionally, the labels include the starting and ending record numbers 238 for the sequencing variable. These three views are perspective x, y and z views of the data in the solid 232. Looking at FIGS. 2E–G, the same views as shown in corresponding FIGS. 2B–D are shown with a smoothed connecting curve 240 passing through the pair-wise points. It should be apparent in comparing the construct shown in FIGS. 1A–F to the construct shown in FIG. 2 that the planar surfaces representing the 2D scatter plot can be turned on and off.

Figure 3:
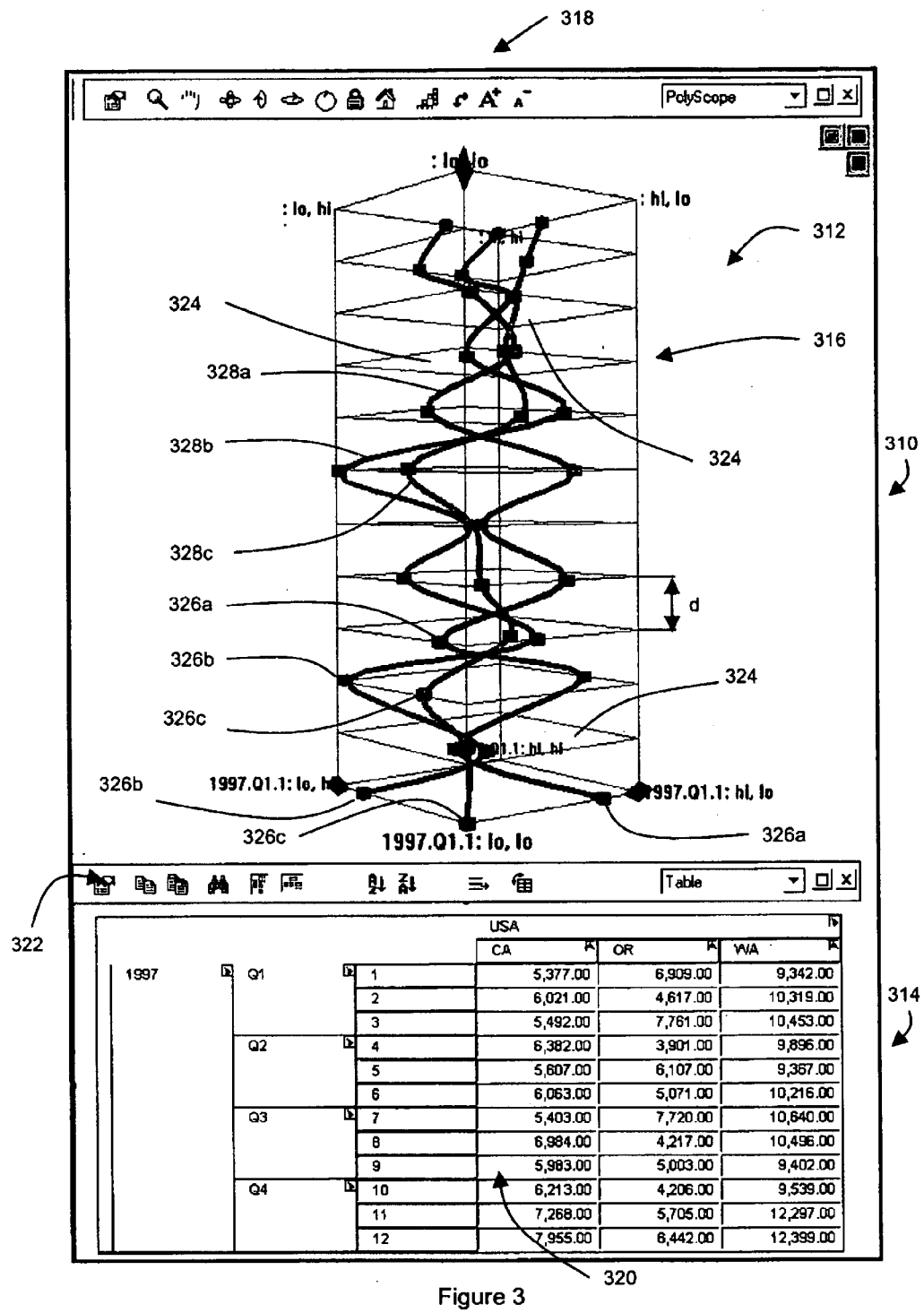
FIG. 3 shows a graphics window including a scoping construct derived from 2D scatter plots of three variable taken to and a tii FIG. 4 depict a scoping construct composed of stacked 3D scatter plots.

Referring now to FIG. 3, a screen image 310 including a first window 312 and a second window 314. In the first window 312, a scoping construct 316 of this invention and control buttons 318 for manipulating the construct 316 are shown. In the second window 314, a cross-tab 320 of the data from which the construct 316 is constructed and control buttons 322 for manipulating the cross-tab 320 are shown. The cross-tab 320 is the same cross-tab shown in FIG. 2A. The construct 316 includes twelve stacked 2D scatter plots 324 representing the all combinational data of the state members CA, OR and WA taken two at a time stacked month by month. Each plot 324 is separated by a separation distance d, which is of course scalable. Corresponding points 326a–c in each plot 324 are connected by a smoothed curves 328a–c. The points and curves are differentiated by color in the actual program, but by shaped of grey in the figure. Using this type of stacked and scoped 3D scatter plot construction, the user see the manner in which the triplet combinational data changes relative to the sequencing variable.

Figure 4:
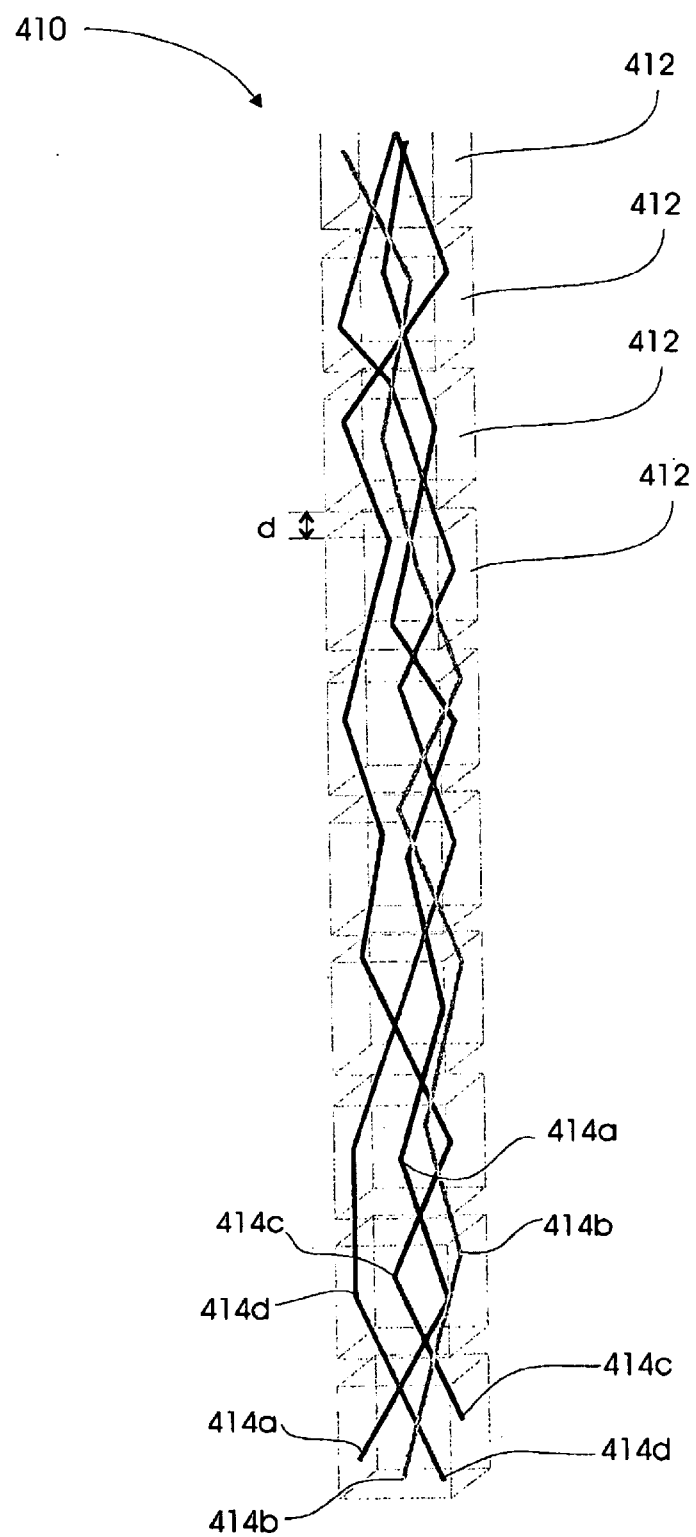

Referring now to FIG. 4, a scoping construct 410 of this invention of n variable taken three at a time where only four of the triplet combinations are shown. Of course, the user can choose to display all combinations or any subset thereof. The construct 410 includes a plurality of 3D scatter plots 412 representing the combination overlaid data as describe above. Each plot 412 is separated by a separation distance d, which is of course scalable. Corresponding data in each plot 412 is shown connected by connecting lines 414a–d. The four sets of connecting lines 414a–d and their corresponding points 416a–d are shown as different shades of grey in the figures. Using this type of stacked and scoped 3D scatter plot construction, the user see the manner in which the triplet combinational data changes relative to the sequencing variable.

Figure 5:
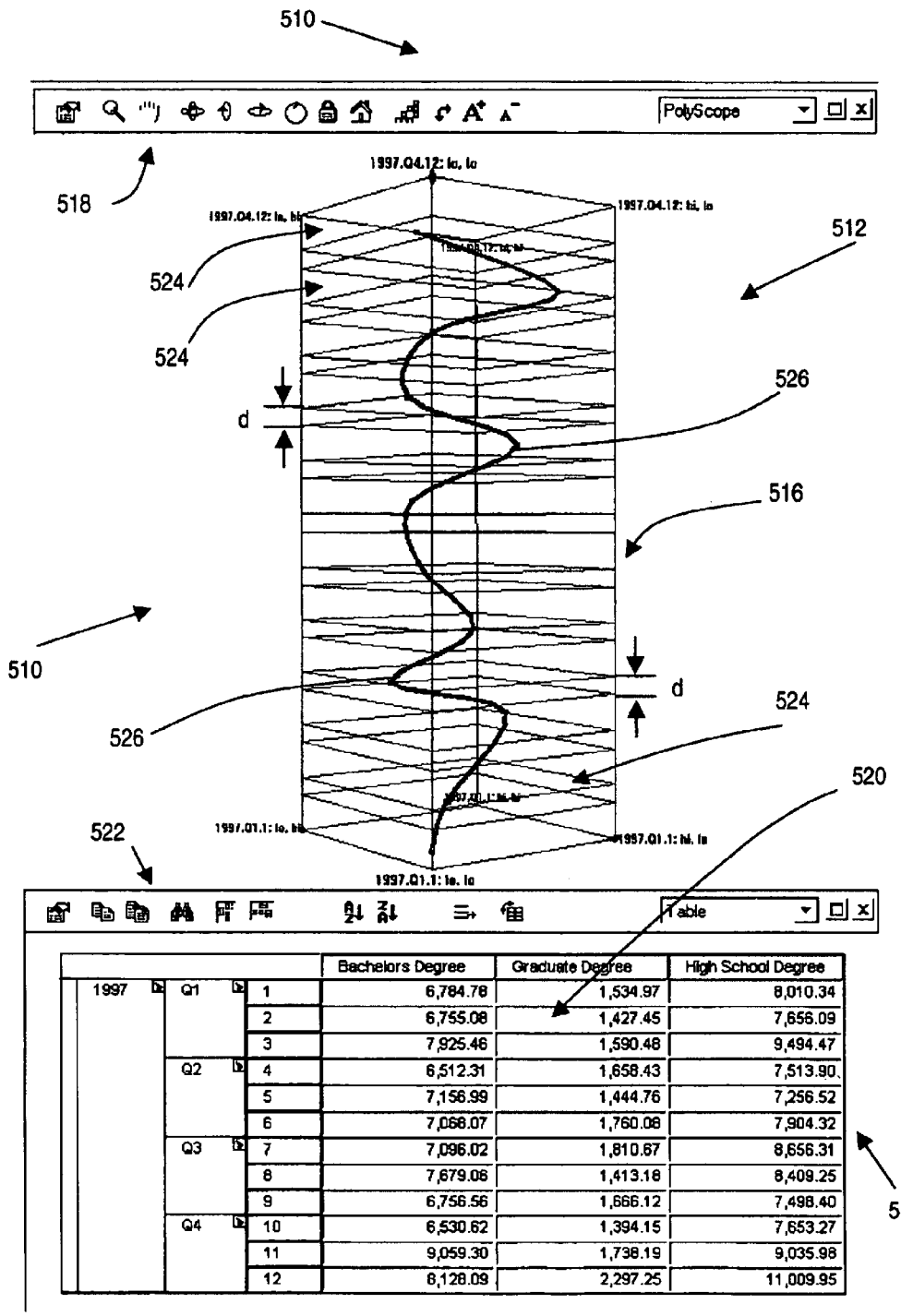
FIG. 5 depicts another scoping construct composed of stacked 3D scatter plots with its associated cross-tab.

Referring now to FIG. 5, a screen image 510 including a first window 512 and a second window 514. In the first window 512, a scoping construct 516 of this invention and control buttons 518 for manipulating the construct 516 are shown. In the second window 514, a cross-tab 520 of the data from which the construct 516 is constructed and control buttons 522 for manipulating the cross-tab 520 are shown. The cross-tab 520 is the same cross-tab shown in FIGS. 2A and 4. The construct 516 includes a plurality of 3D scatter plots 524 representing the combination of the three state members taken three at a time. Each plot 524 is separated by a separation distance d, which is of course scalable. The single point 526 in each plot 524 are connected by a smoothed curve 528. Using this type of stacked and scoped 3D scatter plot construction, the user see the manner in which the triplet combinational data changes relative to the sequencing variable.

STAR GRAPHICS CONSTRUCTS

This graphics technique involves selecting two or more dimensions (a dimension is a top level element of a hierarchical tree) having at least one member, where each dimension and each member has one or more corresponding and selectable numeric values or measures associated therewith. For improved viewability and understanding, the data is preferably normalized prior to the generation of the graphics constructs.

For example, suppose the data being analyzed relates to people and buying habits. The data is classified in a number of ways such as martial status, educational status, or the like. In addition, the data is classified in relevant time slices such as months. These classification variables are referred to as dimensions and there associated subclassifications are referred to as members. Thus, the dimension martial status has two members married and single; while the dimension educational status may have many members such as high school, college, bachelors degree, masters degree and doctorate degree, etc. Associated with each dimension and member is one or more numeric values or measures that represent different numeric data, e.g., profits, gross sales, expenses, gross revenues, etc. The star construct generator can represent data in either two or three dimensions.

2D Star Constructs

A 2D star graphical representation technique of this invention involves either a simple line plot or a polar plot of a given measure associated with each member of a selected dimension of a given dataset. The line plot simply shows the magnitude of the measure on a first axis and the members on a second axis.

Alternatively, the line graphic can be converted to a polar graph by distributing the members at equally spaced angles around a circle and representing the magnitude of the measure by the length of a ray extending out from the circle center and connecting each ray end point to form a closed 2D polygon. For a normalized dataset, all of the numeric values associated with the members will lie within the unit circle so that the polygon will lie entirely within the unit circle. The minimum value of the measure is at the center of the circle or at the origin and the maximum value is on the unit circle. Of course, if the dataset is not normalized, then the closed polygon will lie entirely within the circle having a radius equal to the member having the largest measure value.

From either the line plot or the polar plot, an area associated with the data can be determined. This area can be used to compare separate line plots or polar plots of the selected dimension relative to another dimension. Some possible operations that can be performed on these separate plots include, without limitation, find the plot having the smallest or the largest area, finding a magnitude of a change of the area between plots, finding all plots having the same or similar area; finding all plots having similarly shaped polygons or line plots, etc.

3D Star Constructs

One key feature of the star graphics technique of this invention is the inclusion of a second and/or third dimension to produce 3D star constructs. These construction include polyhedral constructs, stacked line plot constructs and stacked polar plot constructs.

Polyhedral Constructs

In this three dimensional construct, the data is displayed as a polyhedral construct enclosed within the unit sphere or the sphere of radius equal to largest measure value being displayed and where the center of the sphere represents the minimum value for all members. Each member of the two dimensions is associated with a given solid angle (given value of θ and φ) and the length of the ray in that direction corresponds to the magnitude of the selected measure. This construct is similar to the sun at the center and the rays emerging in all directions where the length of the ray represents the intensity of the light in that direction. The number of rays corresponds with the total number of members associated with the dimensions. The construct is closed to produce a closed polyhedral solid by forming surface polygons from three or more surface points until the construct is closed with triangles, quadrilaterals or higher order polygonal surface covering shapes.

In a manner similar to the 2D polar plots, a volume of the polyhedral constructs can be calculated as well as its overall shape. Similar to the 2D case, separate 3D constructs can be generated relative to another dimension and the separate polyhedral constructs can be compared in the following ways: find the construct with the smallest or the largest volume; find the magnitude of volume change between constructs; find constructs of the same or similar volume; find constructs of similar shape, etc.

Front-face Back-face

Even though transparency functions can be used to show objects behind other objects, in the case of a polyhedral construct centered within a sphere, front and back views of the construct can be displayed side-by-side. Thus, the views shown by the two spheres are 180 degrees opposite—two equal halves of a sphere. This method is similar to showing two views of earth as seen from the moon. In one view, the earth there is daylight, in the other view there is night.

User Interaction

The user has the choice to either display the polyhedral construct as a solid-filled construct or as a wireframe construct. Because a set of separate constructs can be generated relative to a third dimension, the user can choose to animation the display process over the permitted members of the third dimension so that the user can view the changes in the polyhedral construct over these permitted members.

The user can view n number of constructs representing earlier members of the third dimension, where the earlier constructs can be shown with a different shade of the same color, or a different color altogether. This feature is called persistence. The user has the option to turn on or off the persistence of the polyhedron. The user also has the option to plot lines (polyhedron) to show statistics such as mean, median, etc. When these lines (polyhedra) are drawn, they are unaffected by animation or change in measure value. The position of the mean and median of the. given measure yields information about outliers as follows: (1) when the mean and median are equal, then the variable does not have any outliers; (2) when the mean is less than the median, then the variable has possible low value outliers; (3) when the mean is greater than the median, then the variable has possible high value outliers; Etc.

Data Pereprocessing for 2D Star Constructs

Once the user selects a dimentional variable and a 2D polar plot representing the members of the dimension and their corresponding measures, the user can selected a second dimensional data and ask the technique to overlay a given statistical value so that the present polar plot can be compared to the statistical polar plot such as the mean polar plot. For example, from a given member relative to another dimension, statistics values can be calculated from the numeric value of the measure for each member, e.g., mean, median, standard deviation, etc. Once determined, a closed polygon can be constructed that represents the mean or other statistical value for members where each vertex is the mean for that particular measure of that particular member. Analogously, a closed polygon for the median points can be overlayed on each base polar plot. With visual analysis techniques such as this technique, the user can determine the following variable characteristics: (1) does the mean and/or median lie at the midpoint of the radius; (2) how does each base polar plot compare to the mean or median plot; (3) where do the statistical values appear relative to the origin; and (4) Etc.

When a mean value is less than or greater than either the midpoint value, median value, etc., then information regarding outliers can be obtained, because the outliers tend to pull or push the mean polygon from the midpoint. Now the user can either ignore or delete the outliers from the dataset by clicking and dragging—in one direction or another along the radius—on one of the vertex of the polygon. This will cause a dialog box to popup. The dialog box will contain a list of values—possible outliers—that either need to be ignored, deleted, estimated, etc. in order to carryout the user's request. The user can accept or override any or all of the suggested values.

In a more automated configuration of preprocessing, the user selects one or more variables by clicking on either the radius or the variable name and instructs the system to automatically fix the outliers.

3D Stacked Constructs

The stacked constructs are obtained from 2D constructs by placing 2D constructs relative to a second dimension side-by-side or layering 2D constructs one on top of the next at some fixed spacing. The user selects two dimensions. The stacking generator generates a 2D line plot or polar plot corresponding to the members of the dimension and their numeric measure where the height of the point or the length of the radial line represents the magnitude of the measure for that member for each value of the second dimension.

3D Line Plot Stacked Constructs

In the case of data represented by line plots, the generator places each line plot side-by-side or one on top of the other, provided that the line plot is in a plane perpendicular to the stacking dimension, in the order of the members of the second dimension. Of course, the user can change this order if desired. The generator then forms polygon surface elements by connecting adjacent pairs of line points on one line plot with corresponding points on adjacent line plots creating a surface composed of quadrilaterals.

Now that a 3D patched surface construct has been generated for two dimensions, the user can select another dimension and the generator will overlay n patched surface constructs, where n represents a dimensionality of the third dimension. Each patched surface construct can have a different color or patterning for identification with a legend identifying the color or pattern associated with each construct. The resulting construct will comprise patched surfaces including constructs lying above, below or interpenetrating other constructs. The generator can apply smoothing algorithms to smooth the visual appearance of the surfaces. Upon inspection, some constructs will be smaller than others and some will be interpenetrating.

3D Polar Plot Stacked Constructs

In the case of data represented by polar plots, the generator places each polar plot either side-by-side or one on top of the other, provided that the polar plot is in a plane perpendicular to the stacking dimension, in the order of the members of the second dimension. Of course, the user can change this order if desired. The generator then forms polygon surface elements by connecting adjacent pairs of points on one polar plot with corresponding points on adjacent polar plots creating an extended solid construct composed of quadrilateral surfaces connecting adjacent polar plots.

Now that a patched surface extended 3D construct has been generated for two dimensions, the user can select another dimension and the generator will overlay n patched surface extended 3D constructs, where n represents a dimensionality of the third dimension. Each construct can have a different color or patterning for identification with a legend identifying the color or pattern associated with each construct. The resulting construct will comprise patched surface extended 3D constructs including constructs lying inside, outside or interpenetrating other constructs. The generator can apply smoothing algorithm to smooth the visual appearance of the surfaces. Upon inspection, some constructs will be smaller than others.

General Uses and Examples

Using these 3D constructs, the user can geometrically determine the cumulative effect of multiple variables and how a given measure is affected by the variables and their values. There is no theoretical limit to the number of members that can be handled in this manner, because the generator simply produces more line plot placed side-by-side. However, the constructs are currently limited to three dimension displayable at a time, because of display and conceptual limitation.

The following figures illustrate the scoping construct of this invention and are not meant to be limitations to the versatility of the construct.

Figure 6:
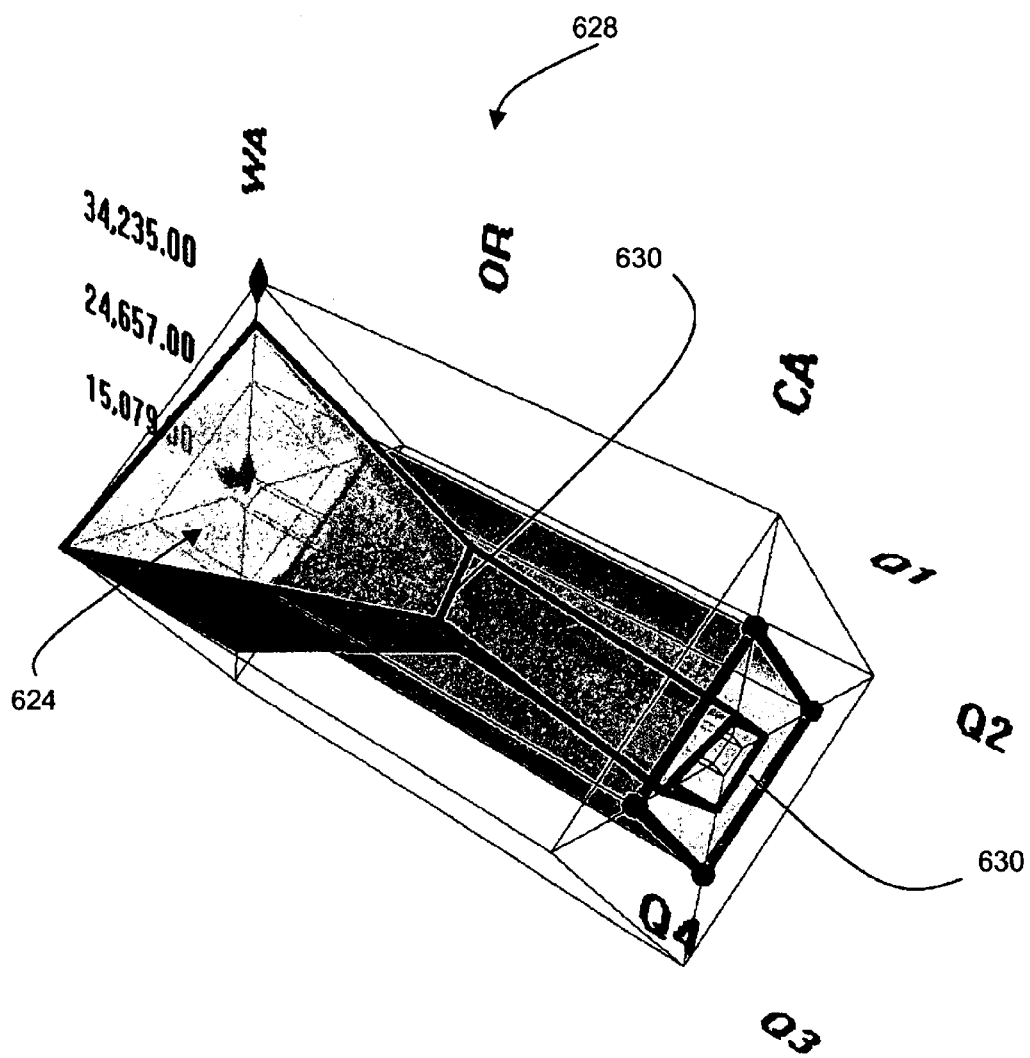
FIGS. 6 & 6A depict a star construct of the present invention in connected line plot format and its corresponding rolled up connected polygon format.
Figure 6A:
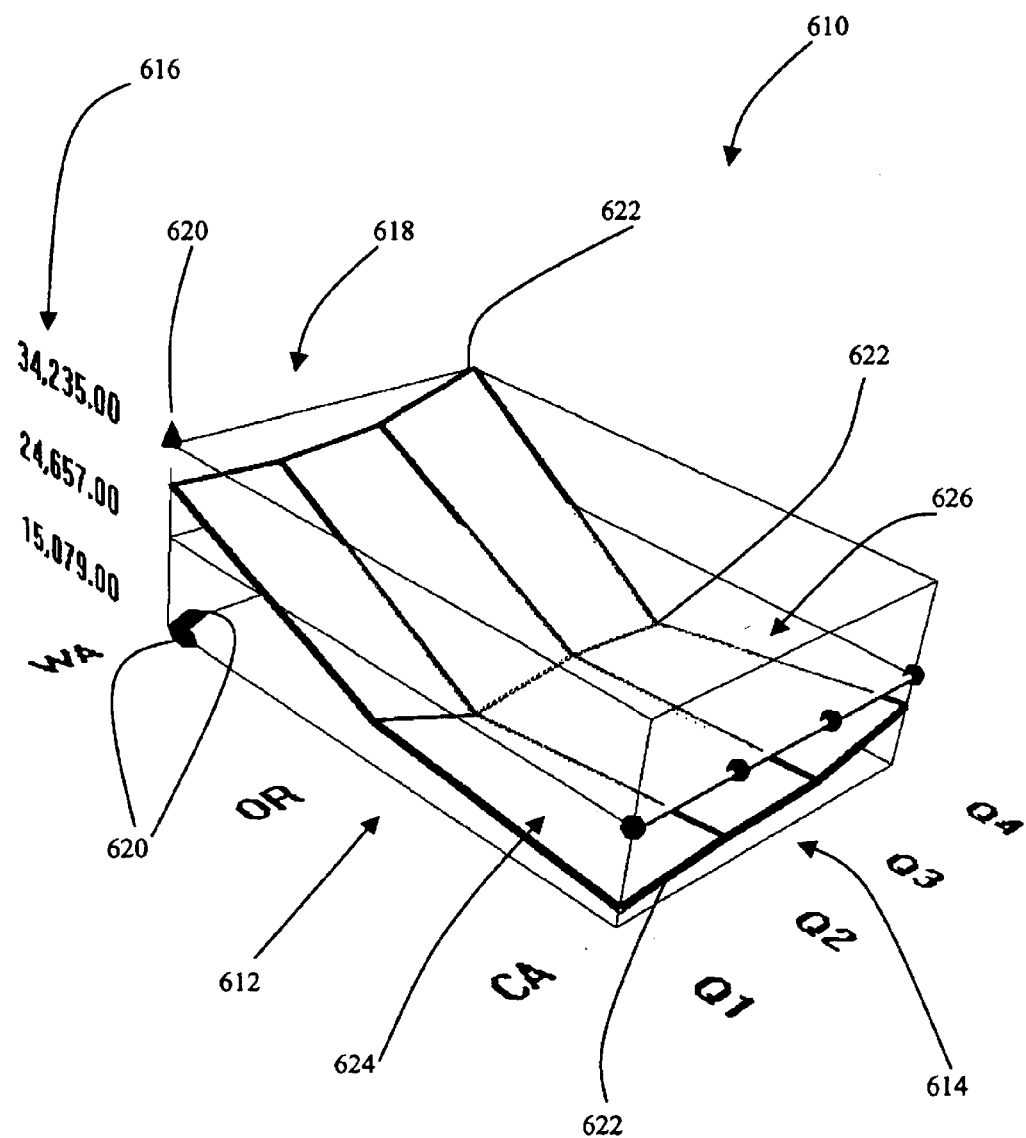

Referring now to FIGS. 6A–B, a stacked line plot construct 610 of this invention is shown to include two dimensions: Country having three selected members WA, OR and CA and Year having the quarters as members and the measure is profits. The construct 610 shows the Country dimension along the a first axis 612 with the members designated, the Year dimension along a second axis 614 with the member designated and the measure along a third axis 616 marks with magnitude designations enclosed within a wire mesh box 618. The wire mesh 618 includes three resizing handles 620 associated with each axis. Within the wire mesh 618, points 622 representing a value of the measure corresponding to a member from the Country axis and a member from the Year axis and shown as vertices of quadrilaterals 624 formed by joining adjacent points. The wire mesh 618 also includes a cutting plane 626 for showing values of the measure above and below the cutting plane 626. Looking at FIG. 6B, an equivalent star construct 628 is shown where the members of the Year axis are joined together to form a closed polygon 630 and the quadrilaterals 624 show how the polygon 630 changes relative to the members of the Country axis. The constructs 610 is converted into the construct 628 by folding, while the construct 628 is converted into the construct 610 by unfolding.

Figure 7:
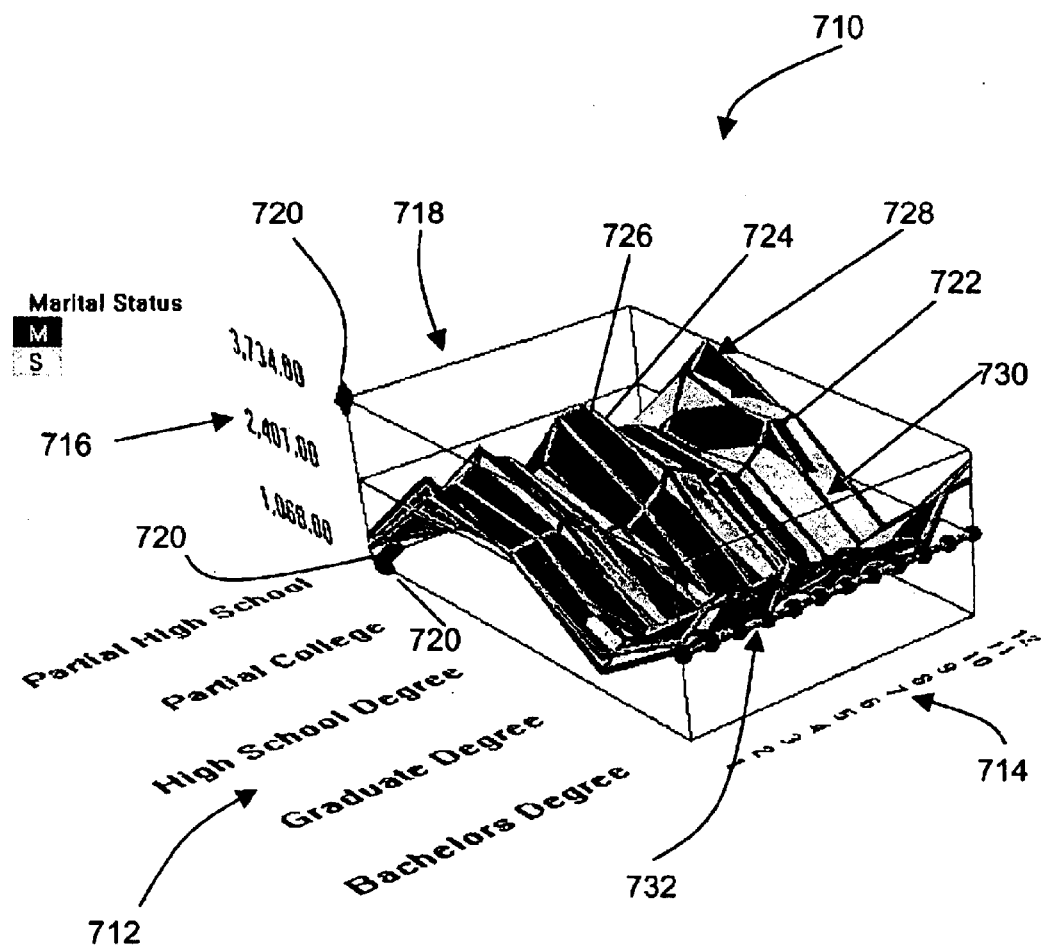
FIGS. 7A&B depict a star construct relative to another dimensional variable in connected line plot format and its corresponding rolled up connected polygon format.
Figure 7:
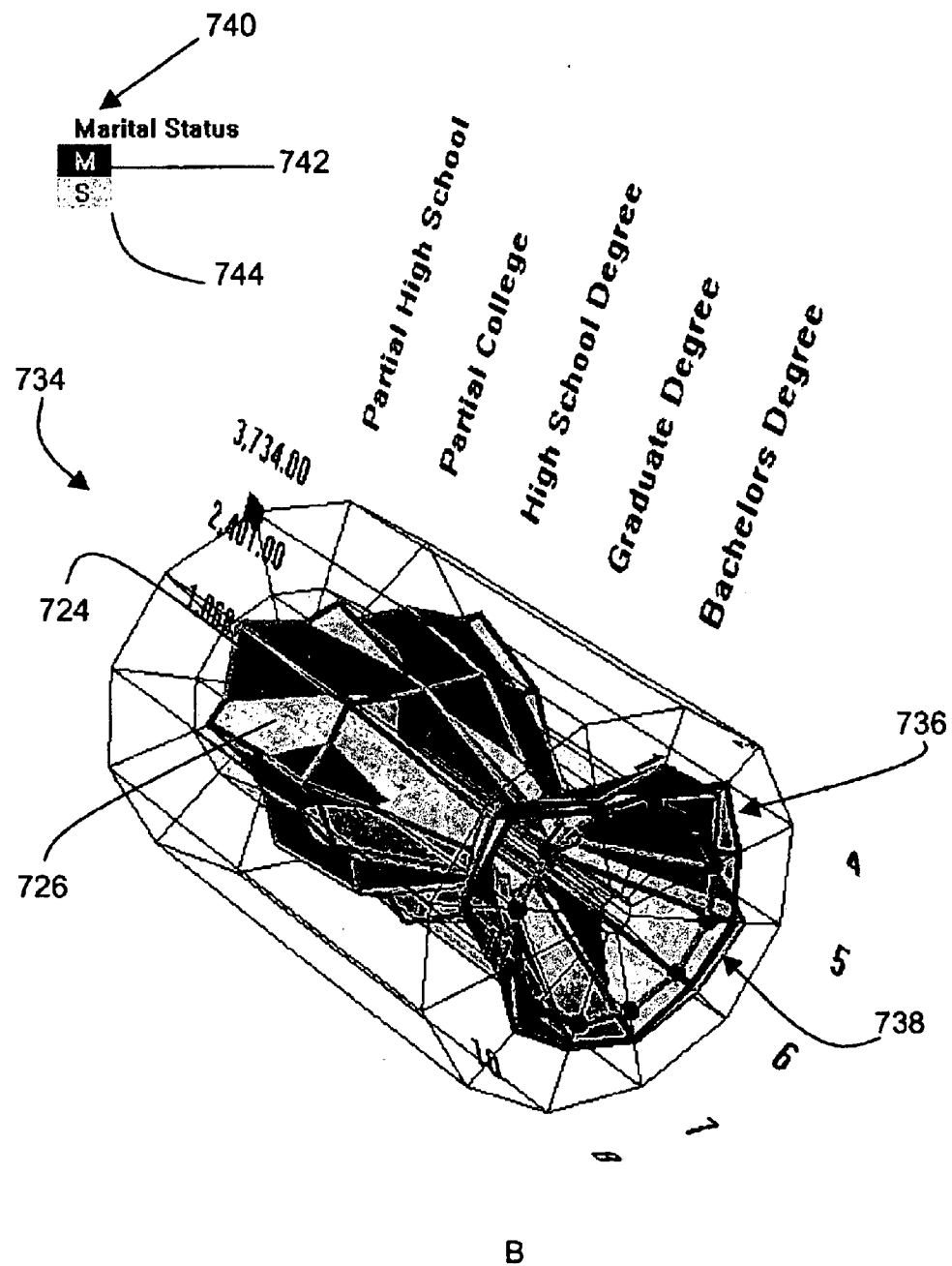

Referring now to FIGS. 7A–B, a stacked line plot construct 710 of this invention is shown to include two dimensions: Educational Status having five members—Partial High School, Partial College, High School Degree, Graduate Degree and Bachelors Degree and Year having the 12 months as members and the measure is profits. The construct also includes a third dimension, Marital Status, having two members: M (married) and S (single). The construct 710 shows the Educationsl dimension along the a first axis 712 with the members designated, the Year dimension along a second axis 714 with the member designated and the measure along a third axis 716 marks with magnitude designations enclosed within a wire mesh box 718. The wire mesh 18 includes three resizing handles 720 associated with each axis. Within the wire mesh 718, points 722 representing a value of the measure corresponding to a member from the Educational axis and a member from the Year axis and shown as vertices of quadrilaterals 724 and 726 formed by joining adjacent points for each Martial Status member. Thus, two different patched surfaces 728 and 730 are shown representing member M and member S of the Martial Status dimension, respectively. The wire mesh 718 also includes a cutting plane 732 for showing values of the measure above and below the cutting plane 732. Looking at FIG. 7B, an equivalent star construct 734 is shown where the points corresponding to the measure value for the members of the Year axis are joined together to form two closed, 12 sided polygons 736 and 738 and the quadrilaterals 724 and 726 show how the polygon 736 and 738 change relative to the members of the Educational axis. The constructs 710 is converted into the construct 734 by folding, while the construct 734 is converted into the construct 710 by unfolding. The color coding for the two Martial Status member is shown in a legent 740 including a dimensional label 742 and a member box 744 for each member colored with the user or system defined member color (shown as a different shade of grey in the figure).

MULTIDIMENSIONAL DECISION TREE VISUALIZER (MDTV)

The present invention includes a graphics technique for displaying details of a hierarchical tree in a new and unique manner solving the problem of unrestrained growth in the width of the tree as more variable splits are added. This graphical representation is equivalent to a tree constructed as a set of concentric rings surrounding a root nodal circle as opposed to a rectangular coordinate representation.

As a hierarchy tree grows, the width of the tree generally grow faster than the height of the tree. Thus, using the traditional rectangular coordinate representation, the tree becomes hard to effectively display on a display device such as a CRT, which forces the user to scroll, decreasing the visualization of the tree and decreasing effective interaction with the tree due to the inherent inefficiencies associated with scrolling. To overcome these problems, a new circular representation of a tree is created, referred to as the MDTV construct or technique. In this representation or construct, the root node of the tree and its corresponding value or values are graphically displayed in a central circle of the construct. The nodes and their corresponding value or values associated with each independent variable or each split are graphically displayed in concentrical rings surrounding the central circles or root node. As the tree generations increase, so does the concentric rings of the tree also. The size of each concentric ring is adjusted to provide room for all of the nodes associated with the independent variable associated with each ring. Thus, the tree does not grow linearly, but grows non-linearly. In addition to this circular construct, the tree can be converted into an equivalent rectangular construct. Alternatively, but less preferred, the construct can place the root node on the outer mode ring and grow the tree inwardly to a central circle which would represent in the last independent variable and its associated values.

Mechanics of MDTV Construct Generator

The root node and its associated data are represented by a central circle of the construct. The statistics and/or values associated with the dependent variables making up the root node are shown in pie chart form on the central circle of the construct which is the root node. The first split of the decision tree, i.e., the first generation, and its associated nodes and node statistics and/or values, are represented as a first concentric ring surrounding the central circle or root node. In this first ring, the nodes are shown as arcuate blocks distributed around the first ring. For each node situated on the first ring, the statistics and/or values are represented by members of an arc-histogram for each arcuate block representing a node—an arcuate equivalent of a circular pie chart. The next split is graphically displayed on a second concentric ring with the nodes represented by arcuate blocks distributed about the ring. Again the statistics and/or values associated with each node is shown as a arc-histogram on each node block. For each additional split, i.e., for each additional generation, a new concentric ring is added to the construct with nodes represented as arcuate blocks distributed around the ring and statistics and/or values represented by a arc-histogram associated with each block. As more concentric rings are added to the construct, a family tree begins to emerge.

As the number of nodes displayed in each ring increases, more space may be required to effectively display them which is easily handled by increasing the circumference of concentric rings. The larger circumference provides additional space in which to display the nodes represented by the arcuate blocks.

The arc length of each arcuate block node is scaled to or determined by the count represented by that node. The sum of all sibling block counts on a given ring will be equal to the count for its parent ring. The sum of the block count for the first split is equal to the total count for this tree which is the count of the root node. Because of the nature of the construct, sometimes a child node might seem wider than its parent, i.e., there may be a distortion of proportional size of the child blocks relative to the parent This phenomenon occurs because the child ring is larger than the parent ring.

Alternatively, the decision tree can be visualized as rectilinear construct instead of a cylindrical construct. In the rectilinear construct, the base node is represented by a rectangle or rectangular solid depending on the viewing direction, i.e., if the viewing direction is straight down on the construct from above, then all the solids appear as rectangles. The rectangle or rectangular solid has a length proportional to its count and its children are shown as rectangles or rectangular solids next to the root node.

In a 2D representation, it is convenient to show the tree on an xy plot, where the x-axis represents a magnitude of the count and the y-axis represents the number of level splits or parent child levels. For optimal tree structure presentation, total extent of the tree in the x and y directions is permanently assigned to the total count and the total number of level splits or to the depth of the tree, respectively. This value (total xy axial extents) are preferably fixed so that the relationships between parent and child are preversed, because changing these assigned value will complicate tree structure viewing.

Once the xy dimension have been assigned, a length of each rectangular node in the x direction or its width represents the count value for that node; while a length of each rectangular node in the y direction or its depth is user definable because the depth does not relate to the measure. Of course, the depth preferably should not exceed 1, so that parent-child bars do not intersect or overlap. The user also can assign any color scheme to the rectangular node or assign each node independently for color palettes. For example, colors assigned to each node could represent statistical features by which nodes are split. In the case of a 3D construct (rectangular solids), a base of each rectangular solid or bar should preferably lie in the xy-plane. The addition of the third dimension, the z dimension, provides a mechanism for displaying a value of another quantity associated with each node as a height of each bar in the z-direction. The definitions of the bar or block attributes are summarize as follows: (1) the X-axis represents the total count; (2) the width ($\Delta x$) of each bar is proportional to the count for that node; (3) the Y-axis represent the level split; (4) the depth ($\Delta y$) is customizable for visualization purposes; (5) the Z-axis represents a value of another measure associated with tree; and (6) the height ($\Delta z$) of each bar is proportional to the magnitude of the other measure for that node.

Thus, each bar or block has two assigned quantities (depth of node or level split and count) and two parameters, which can be arbitrarily assigned color and height. Color can be split into three parameters: Hue; Saturation; and Brightness. Decision tree have certain statistical parameters having a value for each node of the decision tree. These parameters include confidence, support, impurity, etc. Thus, the user or system can assign to the hue, saturation and brightness one of these statistical parameters. For example, the user or system can associate hue with confidence, saturation with impurity and brightness with support. The user can select the parameters from a list of parameter associated with an icon where the additional parameters are displayed in its associated ToolTip.

Thus, the system can construct blocks with as many as 5 different quantities being simultaneously displayed in addition to depth of node and number of records. Although additional objects like sliders, pies, etc. can also be incorporated into this construct, these other objects tend to complicate visualization and are not the preferred manner of construct presentation.

The system also allows the user to show divisions of a tree with boundary lines. Boundary lines separate the tree into family units. For example, if the base node has two children, then a boundary line extending in the y-direction between the two children will divide the entire tree into decedents from each sibling. These boundary lines help to show the boundary between different sibling branches of the trees and to distinguish between neighboring nodes from different sibling if the nodes appear next to each other in the tree.

In the cylindrical construct, it is sometimes difficult to keep track of the generations of a particular node. One way to minimize the problem is to draw concentric circles or bands under the tree generations so that the generation level can be determined by looking at the space between the node arcuate blocks. The system can generate these generational identification bands at every generation or according to one of the following schemes: (1) every even numbered generation gets a band; (2) every odd numbered gets a band; (3) every even numbered gets a band of a given color and every odd numbered gets a band of a different color; (4) etc. Although the user can specify a color for the ring(s), the default colors are preferred where the colors are soft/subtle colors. The user can turn the rings on or off. The user can specify the frequency of the rings. Preferably, the rings are drawn from the outside to the inside of the construct. In this way, there will always be a ring at the leaf level, because visualization at the leaf level is more important. Closer to the root it is less confusing to distinguish between the nodes of the same generation. When seen from the top, only the portions of the bands between the nodes will be visible, except more ring will be seen at the extremities where there are less nodes. Instead of a filled ring, a variant could be a wire-framed band.

The root node by itself is not interesting. Therefore, instead of showing it as a tall cylindrical object, the system preferably shows it as a 2D pie chart or as a small 3D pie chart (so that it does not hide any of the children).

The following figures illustrate the MDTV construct of this invention and are not meant to be limitations to the versatility of the construct.

Figure 8A:
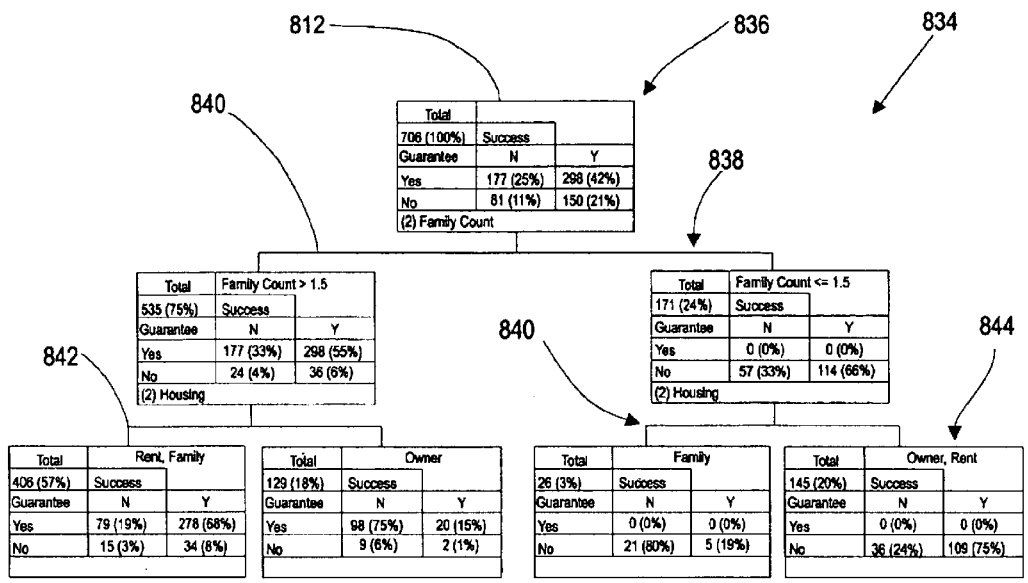
FIGS. 8A–C depict an MDTV construct of the present invention with its corresponding cross-tab representation at two split levels with a slider selection dialog and resulting filtered construction and its corresponding rectilinear configuration.
Figure 8A:
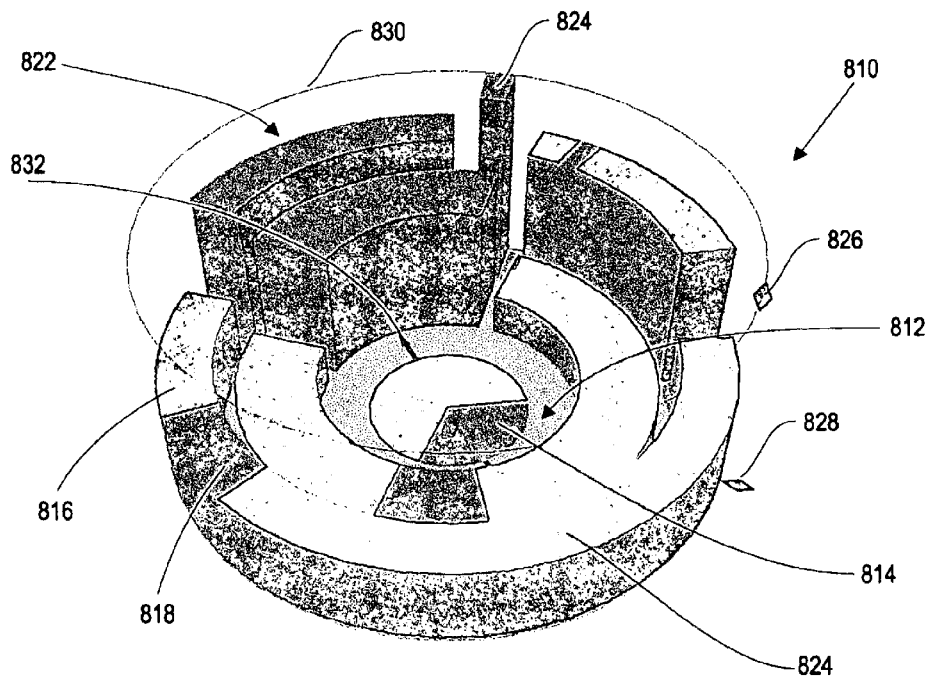

Referring now to FIG. 8A, a three generational cylindrical MDTV construct 810 of this invention is shown. The construct 810 includes a root node 812 represented as a 2D circular pie chart having split into four pieces 814. The first split is shown at an inner most ring 816 having a first child arcuate block 818 and a second arcuate block 820. The measure value for each first generational node block 818 and 820 show as a arc-histogram associated with the block. In a second ring 822, a second generation of node arcuate blocks 824 are shown; again with their associated measure value histogram. The construct 810 also includes two control handles 826 and 828. The control handle 826 has a circle 830 associated therewith and is used to change a height of the construction; while the control handle 828 is used to change a radius or a radial dimension of the construct. The construct 810 also include arrows 832 showing parent-child relationships. Of course, these arrow 832 are obscured unless view in a more z-directional view. In addition to the MDTV construct 810, FIG. 8 also shows an equivalent pivot tree construct 834 including the base node 812 represented in its cross-tab form 836. The first generation is shown at a first level 838 below the root node 812 and the second generation is shown at a second level 840 below the root. The parent-child relationship are shown as connecting lines 842. Each node in both generations are represented by their corresponding cross-tabs 844.

Figure 8B:
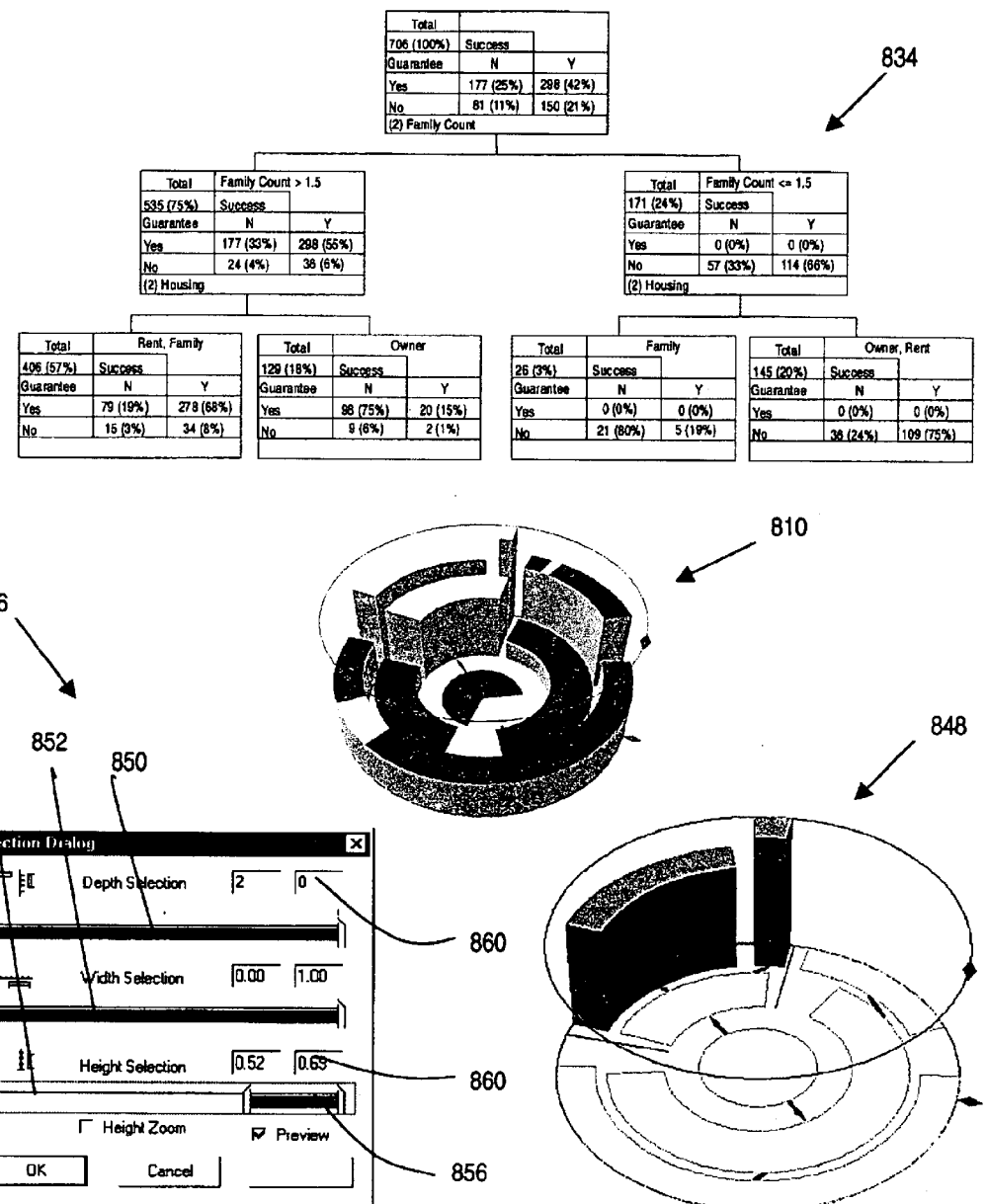

Referring now to FIG. 8B, the MDTV construct 810 and the pivot tree construct 834 of FIG. 8B are shown along with a selection dialog box 846 and a selection modified MDTV construct 848. The selection dialog box 846 includes three slider selectors 850,852, and 854. Slider selector 850 allows the user to select a depth filter; slider selector 852 allows the user to select a width filter, and slider selector 854 allows the user to select a height filter. The box 846 also includes a slider control 856 which allows the user to move the slider filters through the full range of depth, width, and height. The filter construct 848 shows the construct 810 at the indicated slider control setting 858 with indicated filter values 860. The removed blocks are shown in phantom.

Figure 8C:
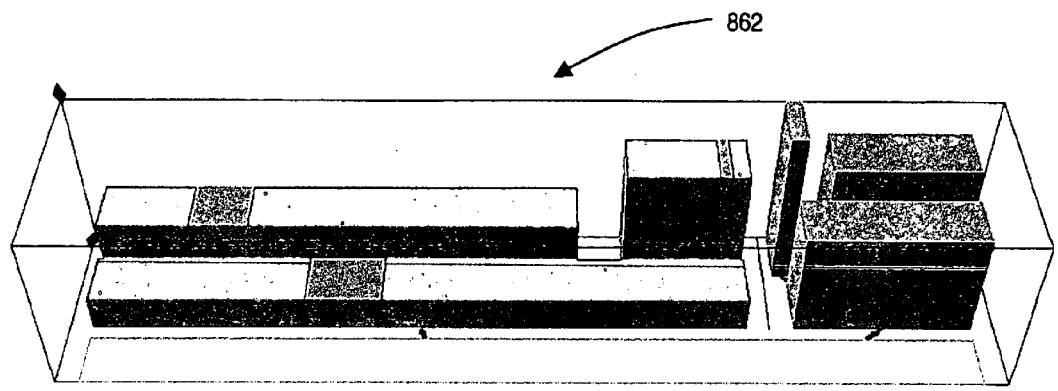
Figure 8C:
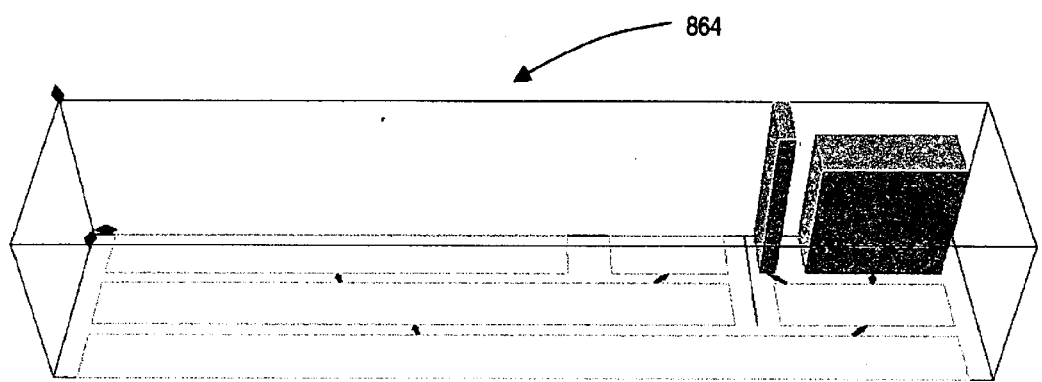
Figure 8C:
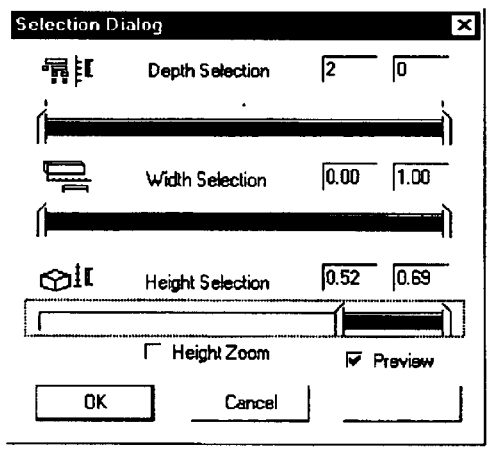

Referring now to FIG. 8C, the base construct 810 and filter construct 848 of FIG. 8B are shown in the alternate rectilinear constructs 862 and 864.

Figure 9:
FIG. 9 depict the MDTV construct of FIGS. 8A–C with one more split along with its corresponding cross-tab representation.
Figure 9:
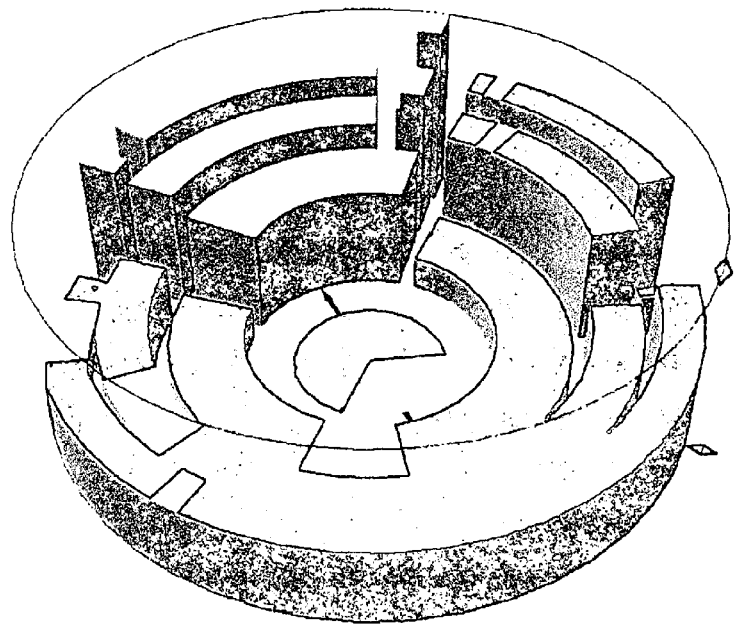

Referring now to FIG. 9, a cylindrical MDTV construct 910 of this invention is shown along with its corresponding pivot tree construct 912. The construct 910 is the same construct as the construct 810 with the addition of another level split.

Figure 10:
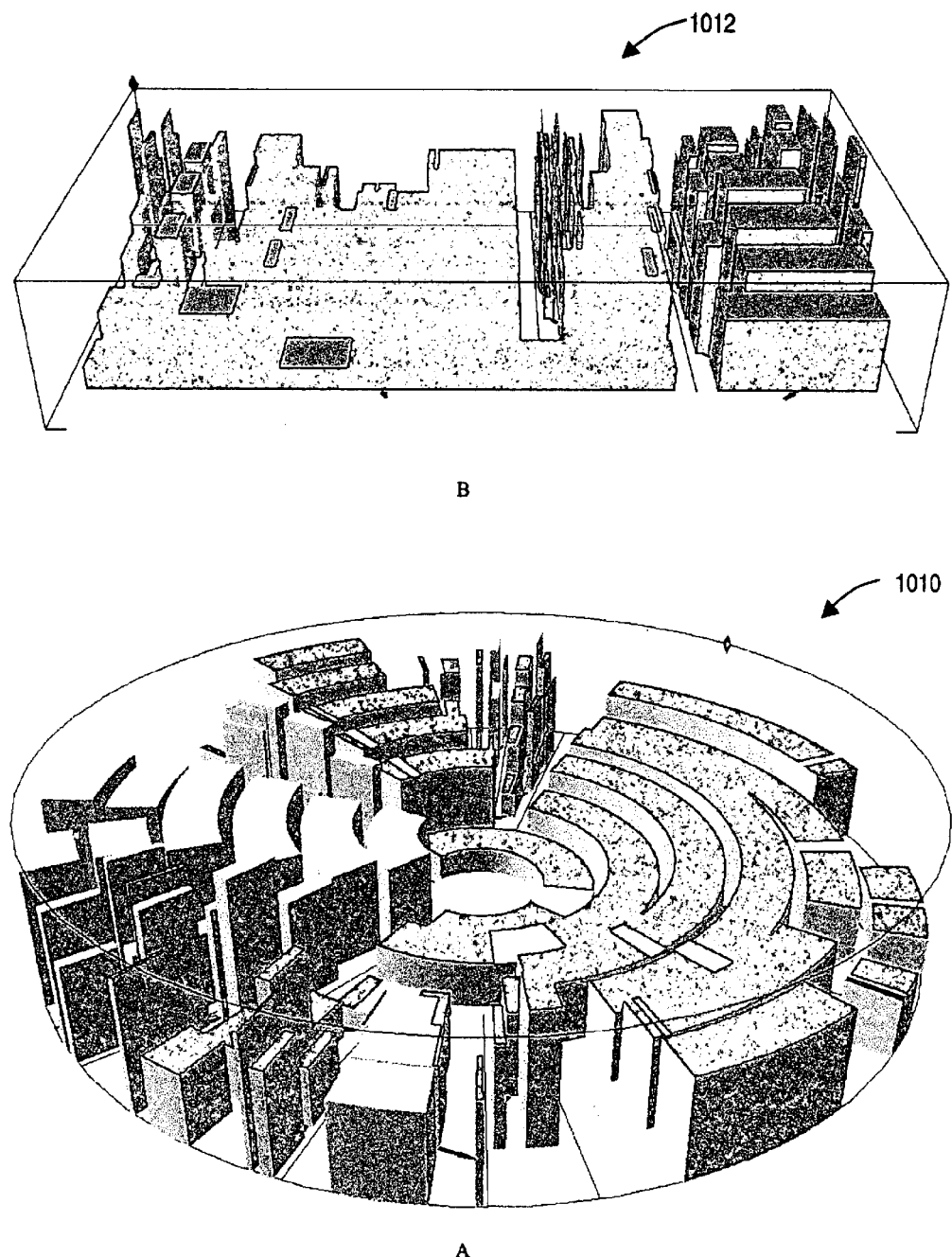
FIGS. 10A&B depicts the MDTV construct of FIGS. 8 and 9 at seven split levels in a cylindrical and its corresponding rectilinear configuration.

Referring now to FIGS. 10A&B, a cylindrical MDTV construct 1010 of this invention is shown along with its corresponding rectilinear MDTV construct 1012. The two constructs are the same constructs as constructs 810 and 910 and 862, except with seven split levels of growth.

Figure 11:
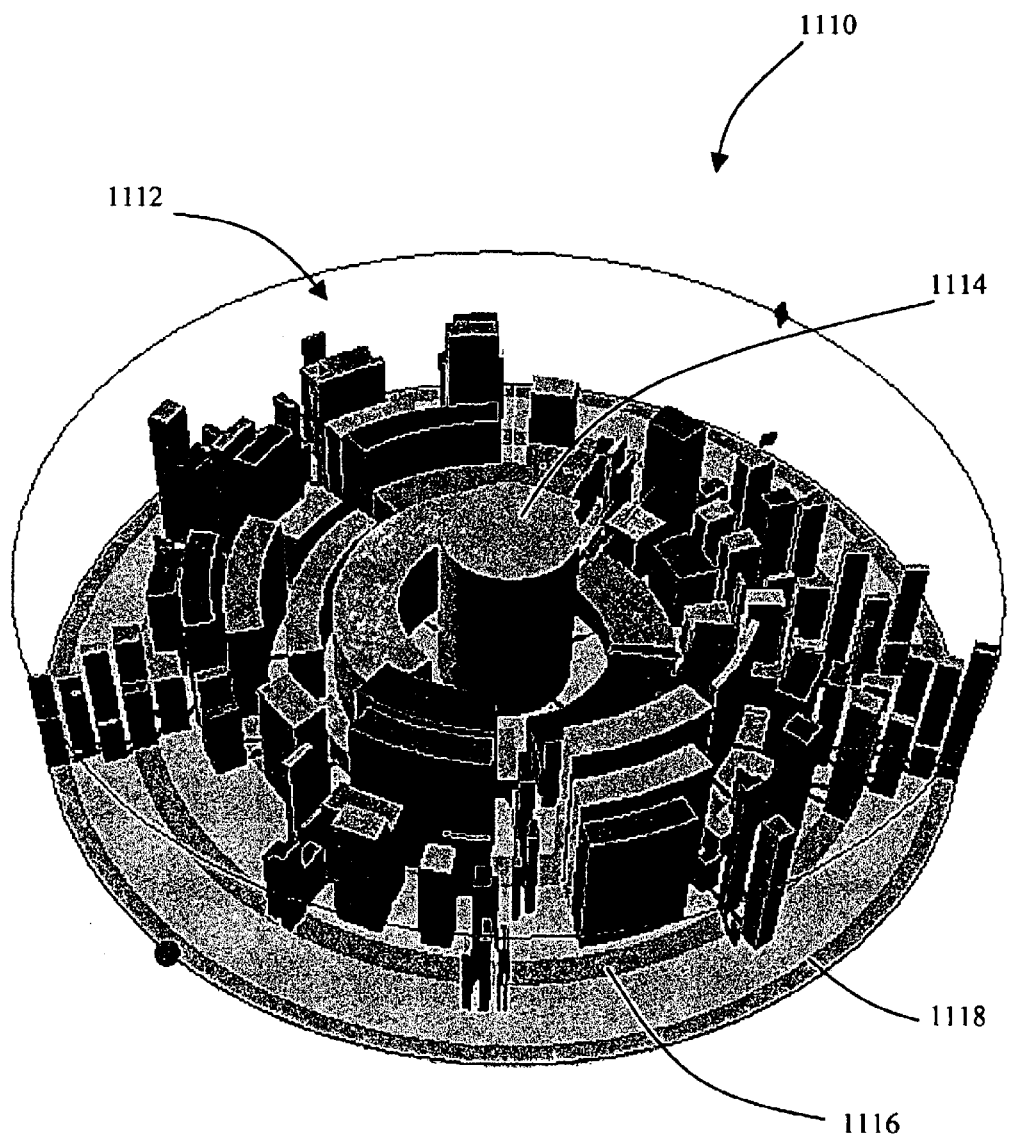
FIG. 11 depicts another MDTV construct where the base node is a tall cylinder and the split levels are signified by counter bands.

Referring now to FIG. 11, another cylindrical MDTV construct 1110 of this invention is shown to include nine level splits 1112. The central node 1114 is shown as a tall cylinder proportional to its count. The construct 1110 includes level band markers 1116 spaced at every third level from the outer most level 1118.

Figure 12:
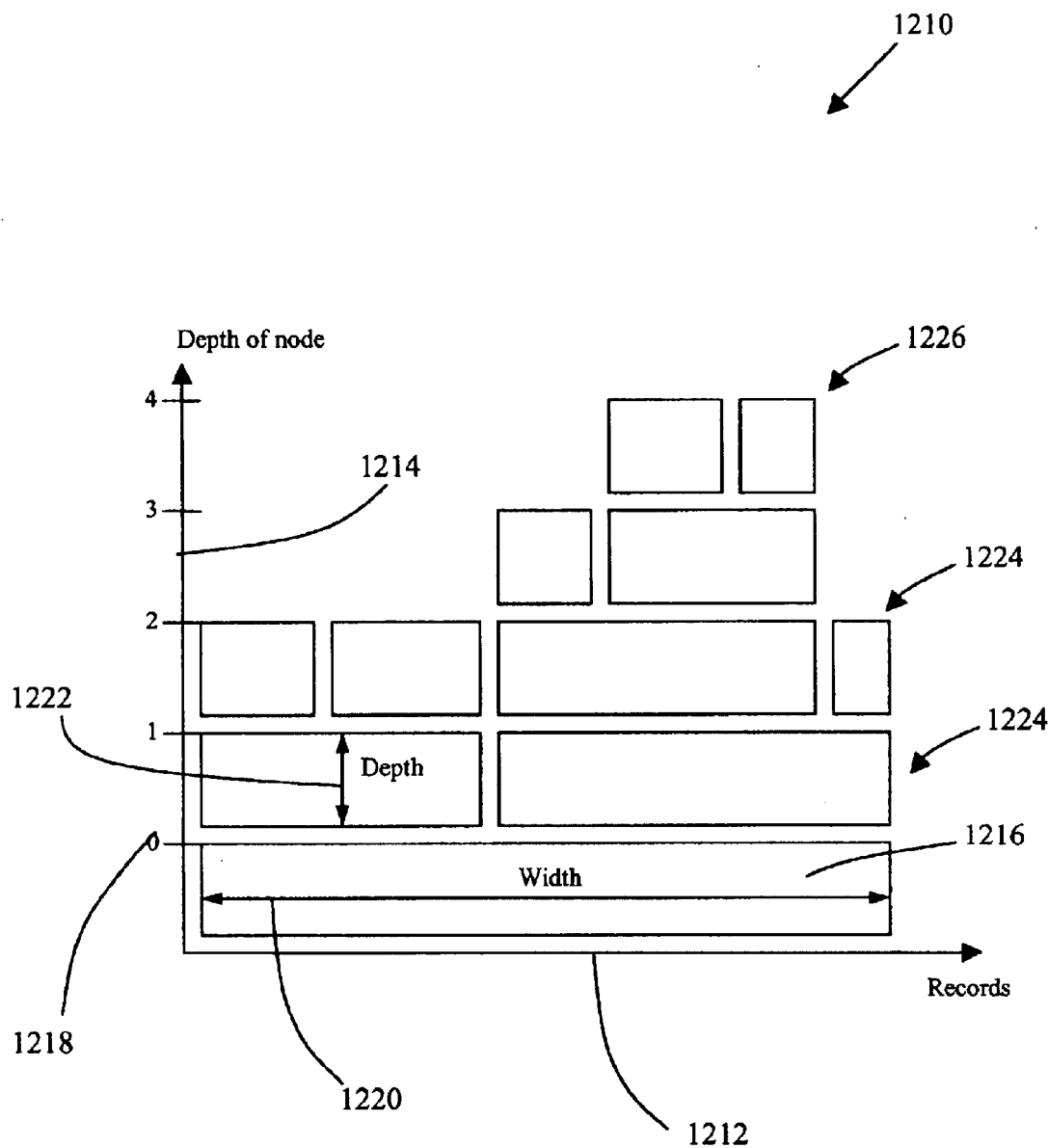
FIG. 12 depicts another MDTV construct in a 2D stacked format.

Referring now to FIG. 12, a flat 2D MDTV construct 1210 of this invention is shown to include a record axis 1212 and a level or depth of node axis 1214. A base node 1216 occupies a zero level 1218 on the depth of node axis 1214 having a width 1220 equal to its count and having a depth 1222 adjustable by the user. Each generational level split 1224 appear stack on top of the base node 1216. Each generation node 1226 has a width to its count. The node coloring can represent any of the parameters described herein.

Figure 13:
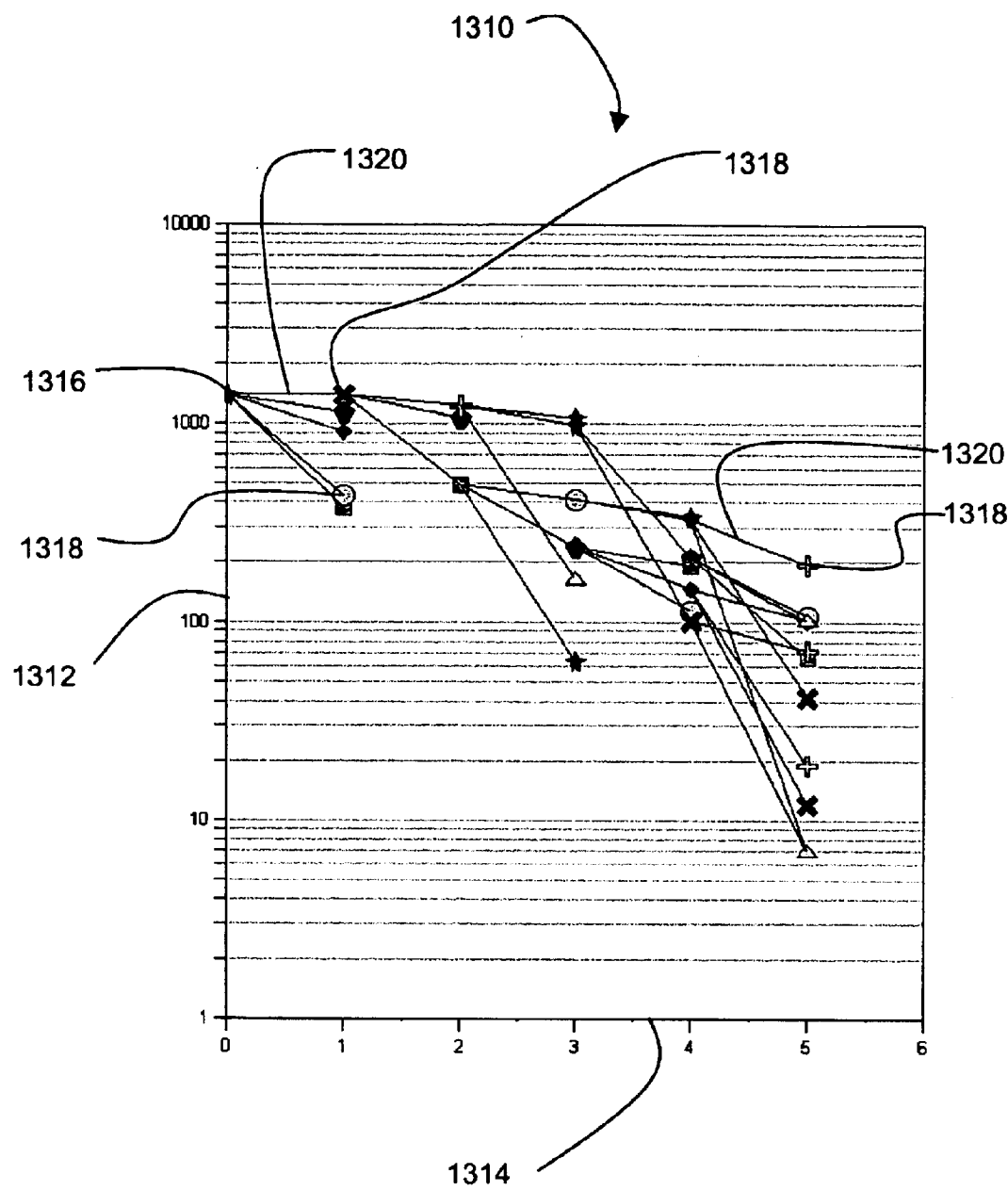
FIG. 13 depicts another MDTV construct in a tree type format.

Referring now to FIG. 13, a count tree MDTV construct 1310 of this invention is shown to include a log axis 1312 and a level or depth of node axis 1314. The tree construct 1310 includes a base node 1316 and descendant nodes 1318 connected by lines 1320. The nodes 1318 are position on the graph with respect to their count value. This construct allows the user to visualize the value gradation occurring in the splitting process.

Figure 14:
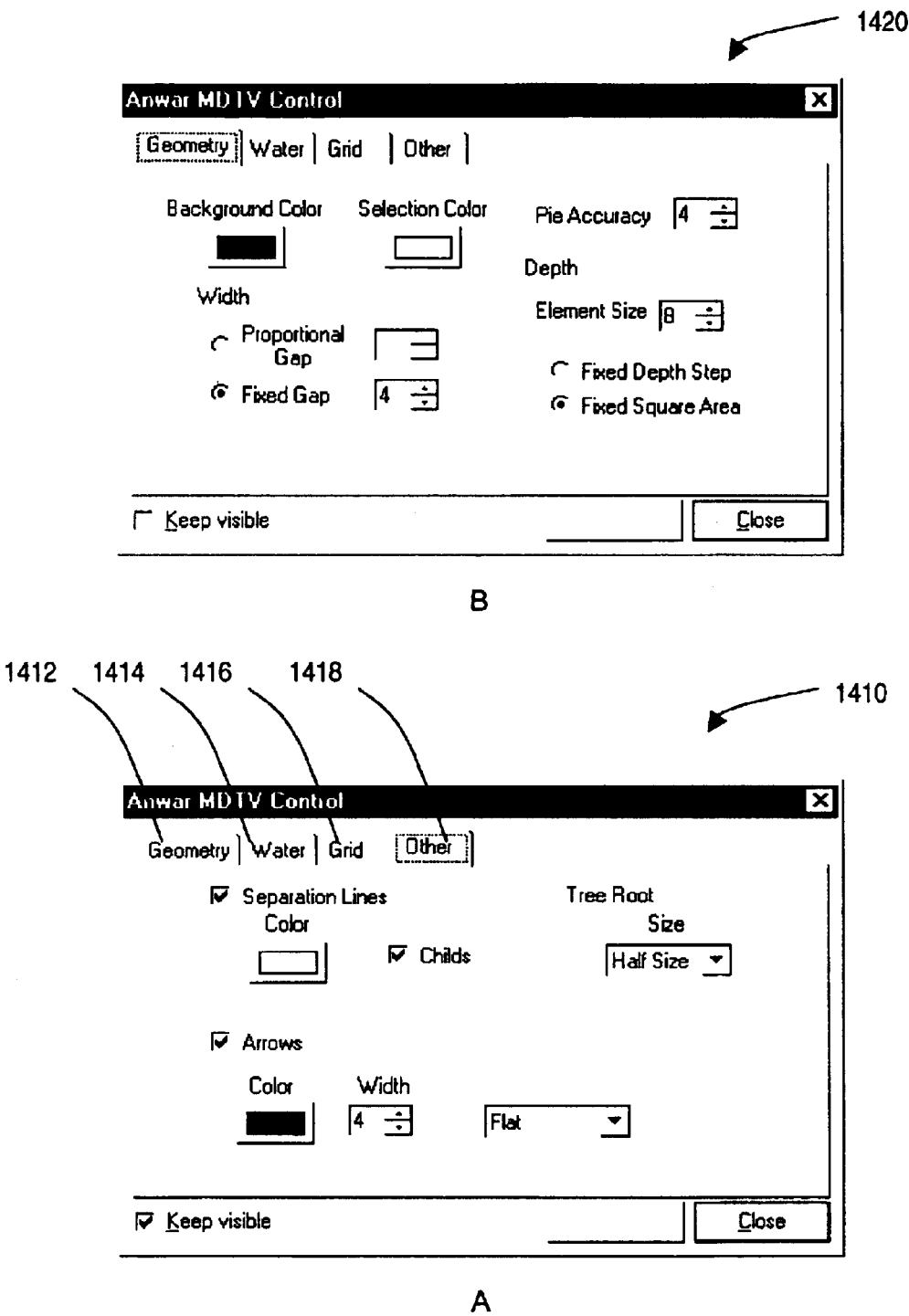
FIGS. 14A and B depict two tab windows of the MDTV control dialog box.

Referring now to FIGS. 14A–B, two tab widows associated with a control box 1410 associated with MDTV generator are shown. The control box 1410 includes a geometry tab 1412, a water tab 1414, a grid tab 1416 and an other tab 1418. The geometry tab 1412 has a corresponding window 1420 having controls associated with color feature or attributes of the construct. The water tab 1414 has an associated window not shown and deals with controls associated with cutting plane or surface"water" leveling. The grid tab 1416 has an associated window not shown and deals with grid controls. The other tab 1420 has an associated window 1422 including controls dealing with separation lines, root size, and the parent-child relationship arrows.

Figure 15:
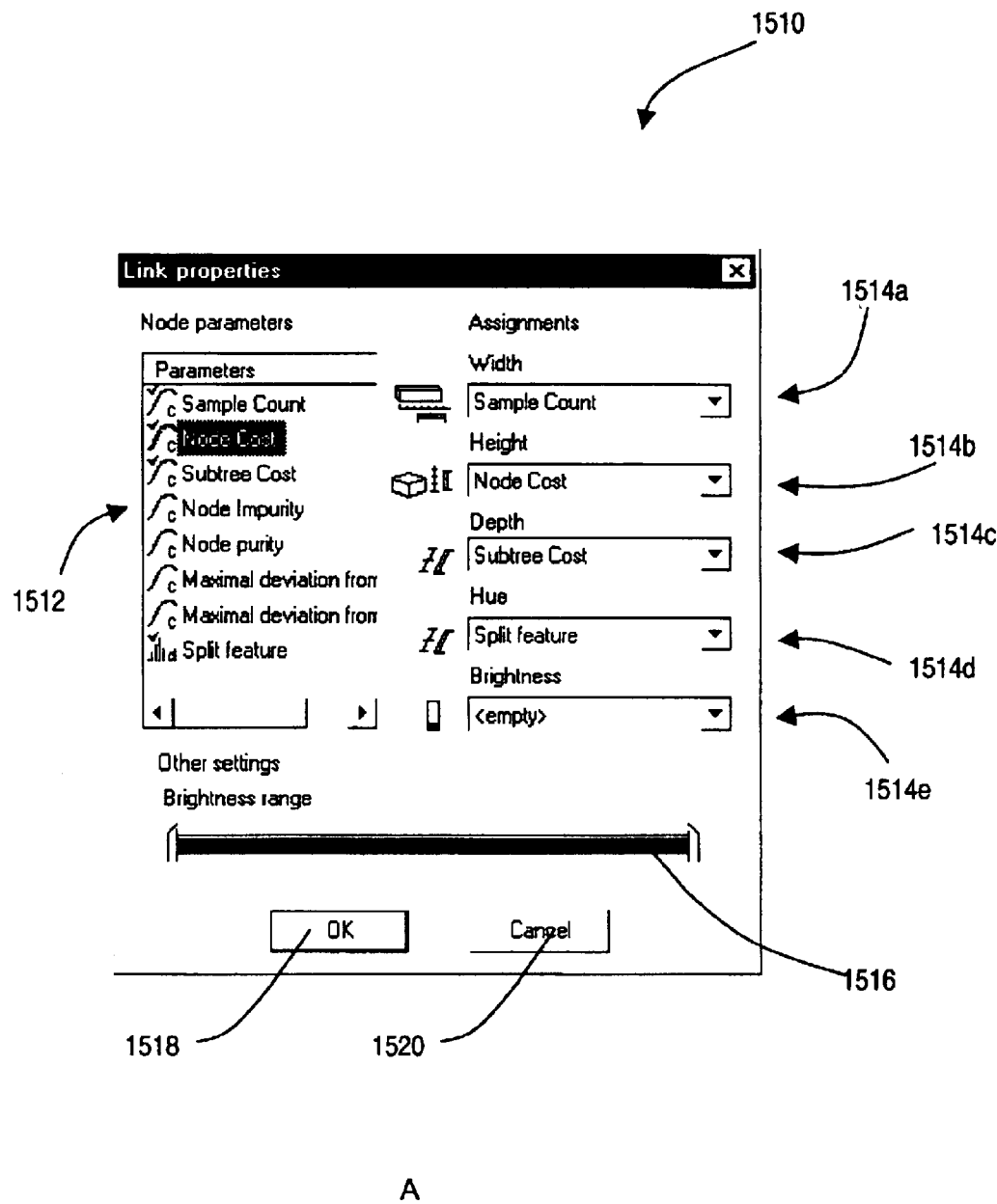
FIG. 15A depicts a link properties control dialog box for MDTV.

Referring now to FIG. 15A, a link properties control box 1510 associated with MDTV generator is shown. The control box 1510 includes a node parameter list 1512 and a set of assignment fields 1514*a–e*. The assignment field 1514*a* is used by the user to associate one of the node parameters with the width of the node; preferably, the width is given the node count parameter as shown in the figure. The assignment field 1514*b* is used by the user to associate one of the node parameters with the height of the node, shown as node cost in the figure. The assignment field 1514*c* is used by the user to associate one of the node parameters with the depth of the node, shown as subtree cost in the figure. The assignment field 1514*d* is used by the user to associate one of the node parameters with the hue of the node, shown as split feature in the figure. The assignment field 1514*e* is used by the user to associate one of the node parameters with the brightness of the node, shown as empty in the figure. The box 1510 also includes a brightness range indicator 1516 and an OK button 1518 and a Cancel button 1520.

AUTOMATIC CROSS-TABS GENERATOR (ACTG)

The present invention also provides an automated cross-tab generator for generator for locating interesting by calculating a deviation value for each cell in any given cross-tabulated form of the data in the database. The generator then presents the cross-tabs of interest to the user. The user can restrict the number of cross-tabs presented by defining deviation value cut-off values.

Ranking Cross-Tabs

In a multidimensional database, the user can view the data in the database a number of cross-tabulated forms. The probability of finding an interesting cross-tab within a given form by happenstance is very, very low. One aspect of this invention is a process designed to find "interesting" cross-tabs automatically, and present them to the user. The process of this invention determines interesting cross-tabs using the following formula:

for q dimensions (a q-dimensional cross-tab):

$$e(i\_1, \ldots, i\_q) = n\_1(i\_1) * n\_2(i\_2) * \ldots * n\_q(i\_q)/n^{(q-1)}$$

where $n\_k(i\_k)$=sum (all $i\_1, i\_2, \ldots i\_\{k-1\}, i\_\{k+1\}, \ldots, i\_q$)

$$n(i\_1, i\_2, \ldots, i\_\{k-1\}, i\_k, i\_\{k+1\}, \ldots, i\_q)$$

$$d(i\_1, i\_2, \ldots, i\_q) = (n(i\_1, \ldots, i\_q) - e(i\_1, \ldots, i\_q))/\text{sqrt}(e(i\_1, \ldots, i\_q))$$

The numeric result $d(i\_1, i\_2, \ldots, i\_q)$ from the above calculation will either be positive or negative. A positive number will indicate a strong relationship, and a negative number will indicate a weak relationship. The result will be ranked before it is shown to the user.

Another derivation of the chi-squared method follows:

Considering n discrete variables:

Let $N_{ijk\ldots z}$ represent the number of events that occurs when the first variable taking on its $i^{th}$ value, the second variable taking on its $j^{th}$ value and so on.

Let $N_i$ denote the number of events for which the first variable takes on its ith value regardless of the value of the rest, $N_j$ denote the number of events for which the second variable takes on its jth value regardless of the value of the rest, and so on. N denotes the total number of events. Mathematically:

$$N_i = \sum_j \sum_k \cdots \sum_z N_{ijk\ldots z}$$

$$N_j = \sum_i \sum_k \cdots \sum_z N_{ijk\ldots z}$$

$$N = \sum_i N_i = \sum_j N_j = \cdots = \sum_z N_z$$

Let $E_{ijk\ldots z}$ denote the "expected" number of instances in the i,j,k, . . . z cell. This value can be estimated in the following way:

$$E_{i,j,k,\ldots,z} = N(N_i/N)(N_j/N)(N_k/N) \ldots (N_z/N) = (N_i N_j N_k \ldots N_z)/N$$

The deviation of the (i,j,k, . . . ,z) cell can be defined as:

$$d_{i,j,k,\ldots,z} = (N_{i,j,k,\ldots,z} - E_{i,j,k,\ldots,z})\sqrt{E_{i,j,k,\ldots,z}}$$

Values of $$|d_{i,j,k,\ldots,z}| > 2$$

are statistically significant.

Yet, another mathematical derivation of this formula follows:

$$d(i_1, \cdots, i_d) = \frac{(n(i_1, \cdots, i_d) - e(i_1, \cdots, i_d))}{\sqrt{e(i_1, \cdots, i_d)}} \quad (1)$$

where:

$n(i_1, \ldots, i_d)$ is the actual value of the cell at location $(i_1, \ldots, i_d)$;

$$s_k(i_k) = \sum_{j=1}^{D_k} n(i_1, \cdots, i_j, \cdots, i_d)$$

d is the sum of all cell values along the kth dimension;

$$S = \sum_{j_1=1}^{D_1} \cdots \sum_{j_k=1}^{D_k} \cdots \sum_{j_d=1}^{D_d} n(j_1, \cdots, j_d)$$

is the total sum of all cell values in the cross-tab;

$$e(i_1, \cdots, i_d) = \frac{\prod_{j=1}^{d} s_j(i_j)}{S^{d-1}}$$

is the estimated value for the cell at location $(i_1, \ldots, i_d)$;

d is the dimension of the cross-tab; and $D_k$ is the number of cells in the kth dimension; and These derivation are all thought to be equivalent.

ACTG Architecture, Operations and Controls

The user can set the positive cutoff value with a slider or a spin control, which allows the user to control the number of positive cross-tabs displayed. The user can also set a negative cut-off value to limit the number of negative cross-tabs being displayed by the system.

Because a multidimensional database can contain a large number of dimensions, members and values, the number of cross-tabs in any given cross-tabulated construction can potentially be in the millions, billions, or even trillions. Thus, the ACTG of this invention provides mechanisms for the user to view the cross-tabs as follows: (1) specify a total number for the positive cross-tabs to be viewed; (2) specify a total number for the negative cross-tabs; (3) specify a minimum threshold value (deviation) for the positive cross-tabs; and (4) specify a minimum threshold value (deviation) for the negative cross-tabs.

The Automated Cross-Tab Generator (ACTG) of this invention is designed to run either on the same digital processing unit as the on-line analytical processing (OLAP) software which is normally the same digital processing unit on which the database resides or the ACTG can reside on a different digital processing unit in communication with the OLAP server.

If the user does not select a set of dimensions in the database from which a cross-tab construct can be generated, ACTG select all dimensions unless the user gives ACTG some instruction on what information is of interest to the user. Next, ACTG will evaluate all valid combinations automatically to determine the best cross-tab construct to present to the user. The instructions can be any set of instructions that can limit the dimensions of the resulting cross-tab.

Interface

The part of the GUI of the present invention that support ACTG has the look and feel of a grid or a table. The interesting cross-tabs that are discovered will have either negative values, positive values or near zero values which are generally of little interest. Once ACTG has calculated the chi squared deviation as set forth above, ACTG ranks the cross-tabs bases on their deviations in either descending (most positive to most negative) or ascending (most negative to most positive) order, and displays the cross-tabs in a list. If the ranking was in descending, then ACTG will present the list in three parts: (a) a top part listing cross-tabs with positive deviations; (b) a middle part including all non-interesting cross-tabs or neutral cross-tabs represented by an ellipsis ( . . . ); and (c) a bottom part listing cross-tabs with negative deviations. The list will be ranked by deviation value, most positive value will be at the top, and the most negative value will be at the bottom. The deviation value for each cross-tab will be shown in a "Score" column next to a cross-tab description column displaying a description of the members comprising the cross-tab.

Main View

Figure 16:
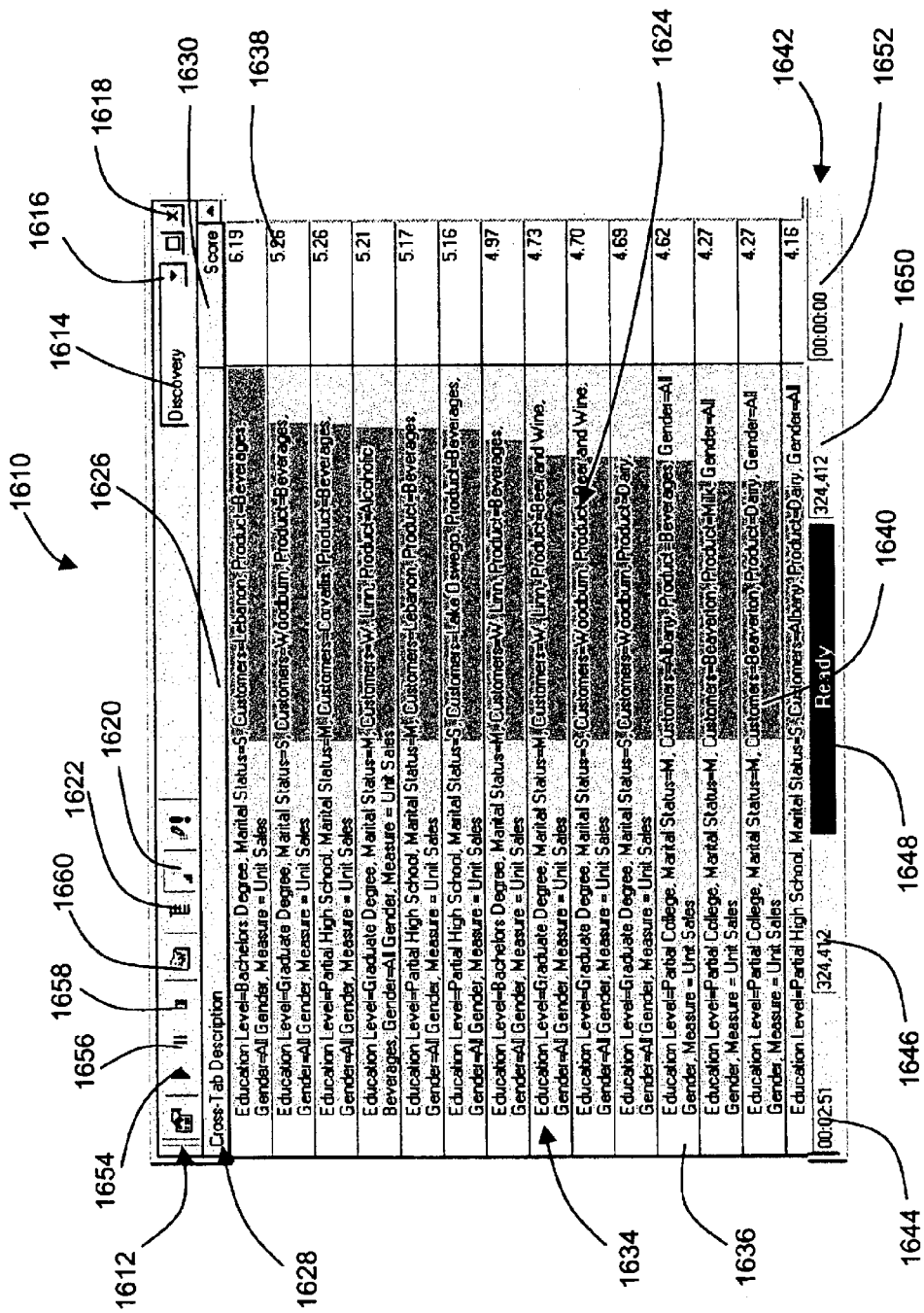
FIG. 16 depicts a result window including a result list for the ACTG DMT.
Figure 17:
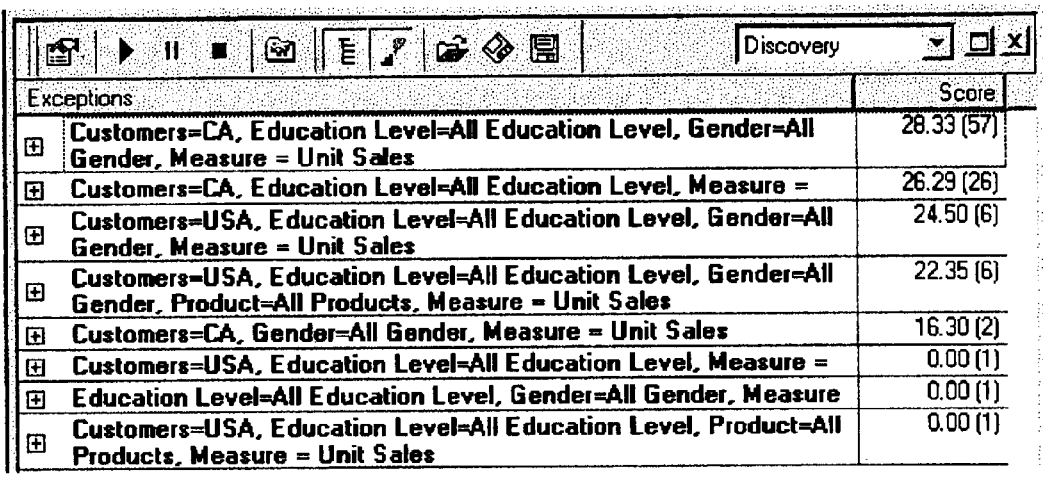
FIG. 17 depicts a collapsed list of the result list of FIG. 16.

In the main view, an ACTG generated list as a table in a window. Referring now to FIG. 16, a main view window 1610 of this invention is shown to includes a tool bar 1612, an algorithm indicator box 1614 with a drop down button 1616 and a close window box 1618. The tool bar 1612 includes a histogram on/off button 1620 and a expand/collapse button 1622 as well as other tools. The results from the ACTG generator are tabulated in a table 1624 within the window 1610. The table 1624 has a cross-table description column 1626 and a header 1628 and a score column 1630. The results are shown in the subsequent table entries 1634 including a cross-tab description 1636 in the description column 1626 and a score 1638 in the score column 1630. Superimposed on the table is a histogram 1640 corresponding to the scores 1638. The window also includes a status bar 1642 which includes an elapsed time field 1644, a number of cross-tabs currently processed field 1646, a progress bar 1648, a total number of cross-tabs field 1650 and an estimated time to completion field 1652. The tool bar 1612 also includes a start button 1654, a pause button 1656, and a stop button 1658 and a settings button 1660. If the user clicks on the expand/collapse button 1622 for result table 1624, the table will collapse to the table shown in FIG. 17, where the collapse operation has reduce the entries to the top level for the selected variable. The score 1638 of the collapsed table includes the spread of deviation values and the number of cross-tabs in the collapsed entry.

Settings

Figure 18A:
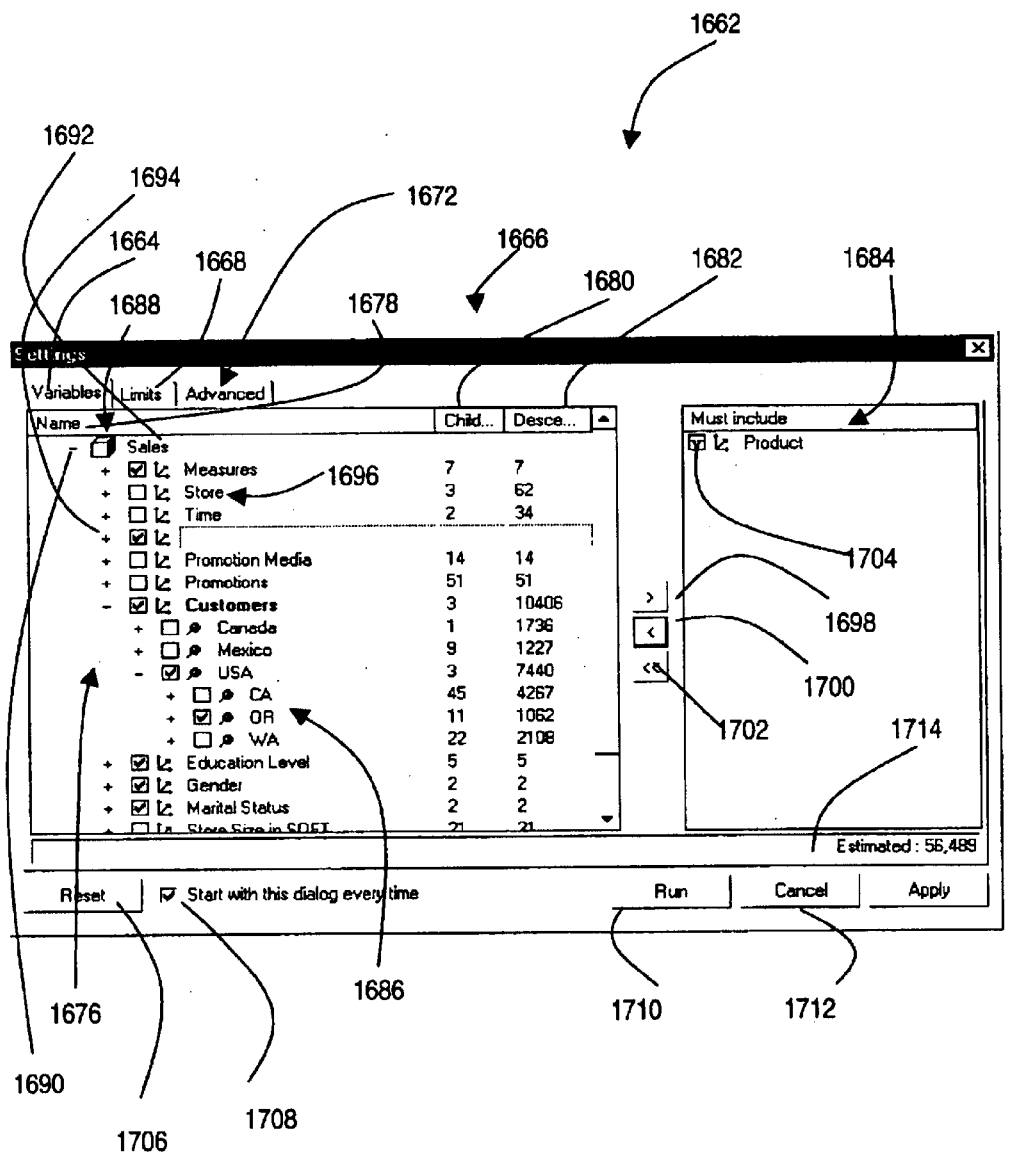
FIGS. 18A–C depicts the setting window used to control aspects of the ACTG DMT.
Figure 18B:
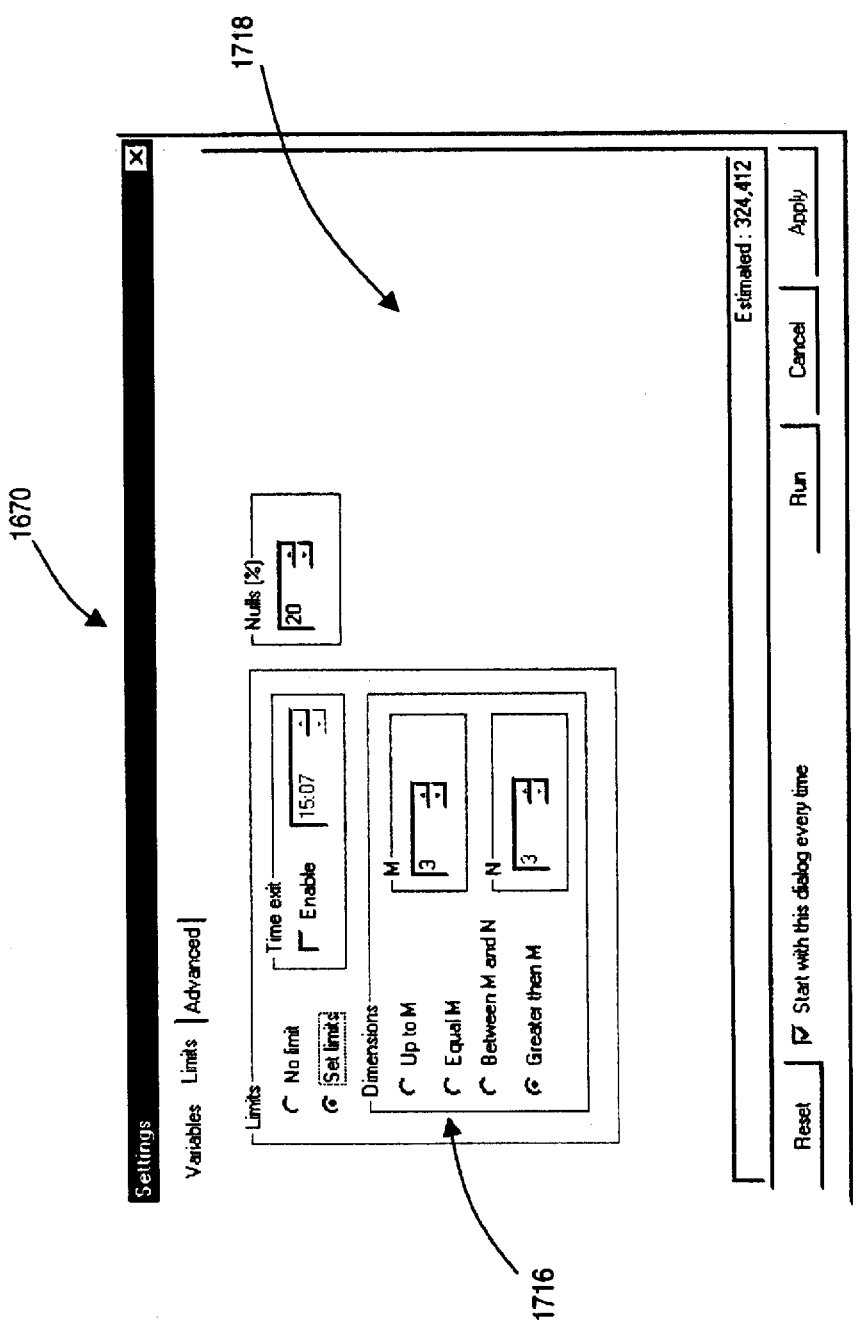
Figure 18C:
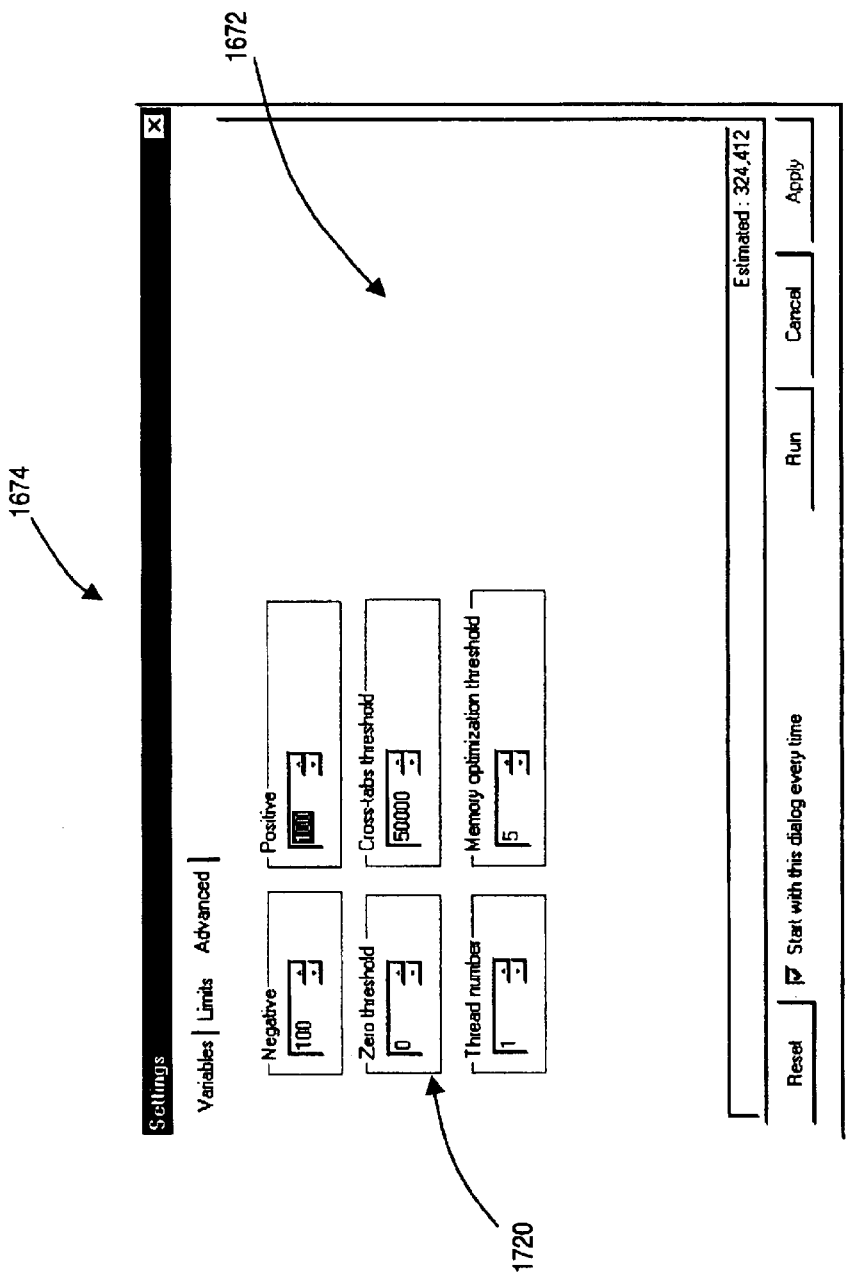

When a user clicks on the setting button 1660 of FIG. 16, a setting window is generated. Referring now to FIGS. 18A–C, a resulting settings widow 1662 is displayed which includes a variables tab 1664 and associated window 1666 as shown in FIG. 18A, a limits tab 1668 and associated window 1670 as shown in FIG. 18B, and an advanced tab 1672 and associated window 1674 as shown in FIG. 18C.

Looking at FIG. 18A, the variables window 1666 includes a database structure window 1676 having a name column 1678, a child column 1680 and a descendant column 1682 and a must include window 1684. The name column 1678 of the structure window 1676 includes entries 1686 corresponding to levels in the database. The first entry 1688 is the database itself and has an expand/collapse button 1690 to roll up of the structure. Because these database are generally hypercubes, the next entry will be the selected cube 1692 on which ACTG will operate. The cube 1692 also has an associated expand/collapse button 1694. Each subsequent entry 1696 is a dimension of the cube 1692. The window 1662 also includes an add button 1698, a remove button 1700 and a remove all button 1702. These buttons control the addition of must variables into and out of the must variable window 1684. Each variable added to the must include window 1684 will appear with a tree state property box 1704. The property box 1704 tells ACTG whether the variable itself, its children or its descendants are to be included in the analysis. The window 1662 also includes a reset button 1706, a retain settings button 1708, a run button 1710, a cancel button 1712 and an estimated cross-tab indicator field 1714. The user can select as a variable a dimension, a member of a dimension, the children or a dimension or a member or all the descendants of dimension or a member. If the user selects a dimension or a member, then a "v" labels is associated with the selection to indicate that the selected dimension or member is a variable. If the user selects the children of a dimension or member, then the selected dimension or member is shown with a "c" label. If the user selects all descendants (the full hierarchy), then the selected dimension or member is shown with an "h" label.

Looking at FIG. 18B, the limits window 1670 includes a set of limit definition toggles 1716 and a nulls (%) level selection box 1718. The null level spin selection box 1718 tells ACTG how to handle sparely populated cross-tabs. The process involves calculating the percentage of null cells per row, column, and overall. The user can specify the percentage of sparsity from 0% to 100%. A 0% sparsity would mean that the cross-tab has sparsity and only cross-tabs with no sparsity would be analyzed; while a 100% sparsity would mean all cross-tabs are analyzed regardless of its sparsity. The row percent sparsity is calculated by dividing the total number of sparse cells in a row by total of cells int the row. The column percent sparsity is calculated by dividing the total sparse cells in a column by the total number of cells in the column. The overall percent sparsity will be calculated by dividing the total sparse cells in a cross-tab by total number of cells in a cross-tab.

When the user set a given null % level in the selection box 1718, all cross-tabs with a any one of the sparsity measures greater than the limit are not analyzed. That is, if a cross-tab an overall sparsity greater than the cutoff, it is not analyzed; if the cross-tab has a row sparsity for any row that is greater than cutoff, it is not analyzed, and finally if the cross-tab has a columns sparsity for any column greater than the cutoff, it is not analyzed. In other words, for a cross-tab to be analyzed every sparsity measure, overall, row-by-row and column-by-column must be less than or equal to the cutoff.

Looking at FIG. 18C, the advanced window 1672 a set of advanced control buttons 1720 allow the user to further control the analysis.

The setting controls allow a user to spin control limit values, edit control the number of high cross-tabs to be shown, check control low limits (a user may not be interested in the low cross-tabs), spin edit control a low limit, edit box control the number of low cross-tabs to be shown; and to designate the site for running the analysis: run local or remote.

As stated above, the user can define/specify the variables to be included in or excluded from an analysis. To make any variable a part of the analysis, the user can simply click to check the box associated with that variable and its descendants will be included in the analysis. Conversely, the user can click inside a checked box to uncheck it. Any unchecked variable will not be considered to be a part of the cross-tab. The count of the variables in a dimension is also shown so that the user has an idea of how many variable have been selected.

The user can also force ACTG to include one or more variables in each cross-tab, i.e., each cross-tab has to contain the "must include" variable. As the user selects variables to be included in the analysis, the estimated number of cross-tab is calculated and displayed.

A "Reset" button is provided so that a user may abandon what s/he has done thus far and start selection from scratch. A "Start with this dialog every time" choice is provided to assist a new user. When this choice is checked, the dialog is displayed automatically whenever this module is invoked. The user has the choice to turn off this option.

When no selection has been made the "Run" button is disabled. When the user has made the appropriate number of selections, the "Run" button is enabled.

The user can also specify the number of top positive and bottom negative cross-tabs that should be saved in the ranked list. The user can also specify the dimensional makeup of a cross-tab using the following conditions: (1) specify up to a maximum number of dimensions to be included in cross-tabs; (2) specify an exact number of dimensions to be included in cross-tabs; (3) specify a range between two number of dimensions to be included in cross-tabs; and (4) specify a minimum number of dimensions to be included in cross-tabs.

Figure 19:
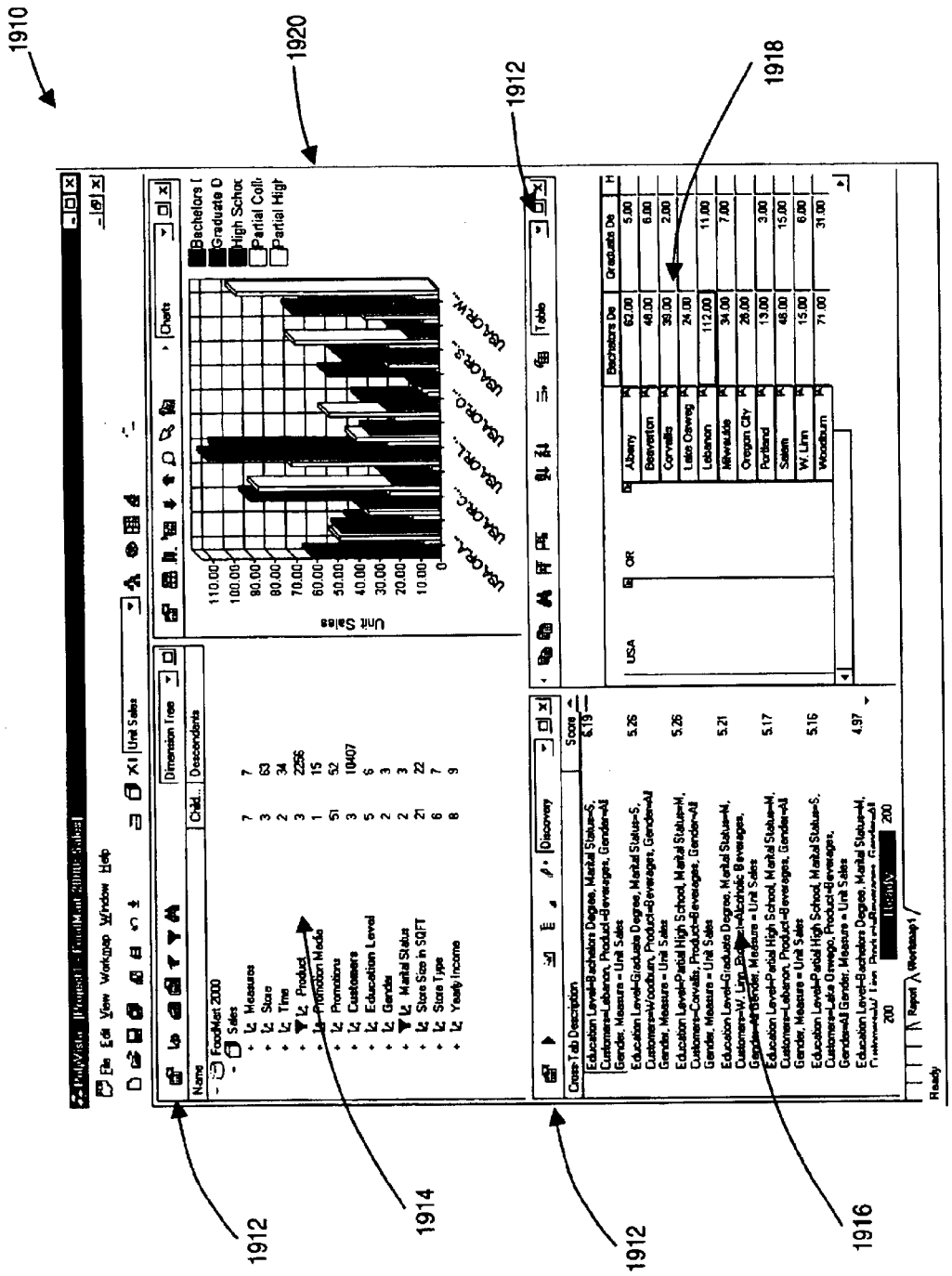
FIG. 19 depicts an application window of this invention including the ACTG control window, the ACTG results window, a cross-tab window with an interesting cross-tab result and a graphics window graphically depicting the data in the interesting cross-tab.

Referring now to FIG. 19, an application window 1910 of this invention is shown to includes a tool bar 1912, a database structure window 1914 equivalent to the variables window associated with the variables tab of the settings window, a ACTG results window 1916, a cross-tab display window 1918 and a cross-tab graphics visualization window 1920. Once the results of an ACTG analysis are complete, the user can look at the interesting cross-tabs and their corresponding values. The user selects an entry of this list of interesting cross-tabs and drags and drops the selected entry into the cross-tab window 1918. The cross-tab is then constructed or retrieved from its entry description. In the figure, the top most entry has been dragged and dropped into the window. The user can then select to view the cross-tab data visually using any visualization technique in the main application program. In the figure, the user choose a histogram.

Include-exclude Variables

Suppose the user asks ACTG to find all interesting cross-tabs with gender=male. ACTG can handle this request in two different ways:

First, ACTG can use a local processing option. In this case, before the processing takes place on the local digital processing unit, only those cross-tabs are considered that have gender=male as one of their elements. Second, ACTG can use aserver or remotely processing option. In this case, from the generated list, only those cross-tabs are retrieved that have gender=male in them. The user can also select more than one variable of interest. Once a variable has been selected from a dimension, the dimension should be highlighted.

Likewise the user can exclude one or more variables to be considered by ACTG. For example, the user can say: do not include country=Canada or country=Mexico as a variable when analyzing the data.

Ignore Variables:

We should use the data tree view filter interface (no check mark) as the ignore condition. In this example all measure values are turned off except the profit. This means when generating cross-tabs, ignore all measure values except the profit.

By default, all variables except the default measure are ignored, the user will have to explicitly turn on one or more variables as he desires.

As the user makes the selection, the estimated cross-tabs will be calculated and show how many cross-tabs will be generated.

ACTG service is started on any NT computer (even if there is no OLAP server) and configured for Cross Tabs calculation.

Besides, it is possible to implement such algorithm that the computing was distributed.

That is depending on a configuration and loading of the network, it is possible to distribute ACTG processes along some computers automatically (for example it is possible to capture greater amount of resources for computing in night time).

There is no sense to start this process each time, when service will start.

We mean that after processing the calculated data were saved. And the recalculation (refresh) would be performed only if the administrator starts cube re-calculation. To facilitate administration of ACTG service, it is probably possible to write some "Add-Ins" script for OLAP Manager. Then the administrator could operate ACTG service directly from OLAP Manager.

The user will have the option to set the positive and negative thresholds separately. For example s/he might set the positive threshold (i.e. deviations greater than) to be +20, and set the negative threshold (i.e. deviations less than) to be −15.

There should be an option for the ACTG server administrator to specify how many cross-tabs to save. ACTG will generate billions of cross-tabs, we do not have to save all of them. Perhaps it makes sense to save some minimum amount by the variable. In other words there should be at least x cross-tabs that contain product=beer.

In the result list of ACTG, the user will have the option to either view a long name, or a short name. Here is an example:

Long name: "[Customers].[All Customers].[USA]"

Short name: "USA"

When cross-tab starts for the first time, it should determine the default measure. The default measure will be checked and all other measures will be unchecked. However, the user will be able to override this default.

Additionally, when a user connects to the server component, the information regarding which database/cube the user is connected to should be passed to the server component, so that the right dataset is sent back to the user.

The process of generating a cross-tab and calculating the deviation is a self-contained method, i.e. it does not require any user intervention. This process can run on a server, create a ranked (by deviation) list of cross-tabs. A user can login to the server, and view the cross-tab list that have been generated by the server so far. If he is interested in a particular cross-tab listing, then he can drag-n-drop it upon the cross-tab control in the analysis pane. Once the cross-tab control is populated the user is free to do whatever he pleases.

Regardless of where the cross-tabs were generated (local or server), the client user-interface (the user-interface within PolyVista) should be the same. The only difference will be, the user will have to specify:

Run ACTG on local machine

Connect with server and import the generated list (if available) by the server ACTG It is possible, that in a given environment, there is only one of the two options (local or server) available. In this case the non-available option should either be grayed out, or not shown at all.

We will make use of sparsity of a dimension to our advantage. When a sparse dimension (i.e. a dimension with no or missing data) is encountered, it will be ignored (i.e. not processed).

As a dimension hierarchy is traversed, once a node with no data is encountered, there is no point in further traversing this hierarchy. This is based on the rationale, that it parent has missing or no values then the children have missing or no values, since children are aggregated up to a parent. For example in Foodmart, Canada is zero because BC is zero. BC is zero because Vancouver and Victoria are zero. Vancouver is zero because "Store 19" is zero. Once, it is established that Canada is zero, that hierarchy will not be traversed anymore.

Estimating the Number of Possible Cross-tabs

The best mathematical formulation for estimating the number of possible cross-tabs from a given number of selected variables uses the following recursive function:

$$T_1^m = \sum_{i=m}^{N} Di$$

where:

$$T_n^m = \sum_{i=m}^{N-n+1} Di T_{n-1}^{i+1}$$

and:

Tn represents the total number of possible n-dimensional cross-tabs; Di represents the number of members of dimension i and N represent the total number of dimensions.

The "C++" source code for such a formulation can be implemented as follows:

```
// Recursive routine unsigned long T (unsigned long _m, unsigned
long _n, vector<unsigned long>&_D)
{
    unsigned long total =0;
    if(_n = 1)
        for (unsigned long i = _m; i <_D.size(); i++)
            total += _D[i];
    else
        for(unsigned long i = _m; i <_D.size() -_n + 1; i++)
            total +=_D[i]*T(i+1, _n - 1,_D);
    return total;
}
```

Implementation Architecture:

There are four pieces to the ACTG architecture: the complete application of this invention, the ACTG Client, the ACTG DLL, and the ACTG Service. These pieces work together. The complete application works exclusively with the ACTG Client component. The ACTG Client component is an in-process COM Server.

The ACTG DLL is where the main data mining algorithms and data management coding resides. This DLL can request data directly from the OLAP Database and performs its analysis or preferably, this DLL request data indirectly through the middleware interface of this invention. The OLAP database may be local or remote. Also note, that the ACTG DLL is an ordinary Win32 DLL rather than a COM server. Functions exported from the DLL are used to connect to the database, and calculate the cross tabs.

There are two possible configurations with regard to how the ACTG Client makes use of the ACTG DLL. On the one hand, the ACTG DLL is loaded directly by the ACTG Client component. This configuration will be used typically when the OLAP data source is on the same machine. This could be a Windows NT Workstation running SQL Server with DSS, or a Windows 95/98 machine accessing a cube file via the pivot table services.

For higher performance and scalability, it may be desirable to place the ACTG DLL code on a remote machine with the OLAP Database. In this case, it is desirable that the calculations and data mining activities occur on another machine, and that results may be stored for access by multiple application clients. In this scenario, the database server is host to the ACTG Service. The ACTG Service loads the ACTG DLL directly and makes use of it for data mining and determining a list of interesting cross tabs. This service (which is started when NT starts on the host machine) offers several transparent features over the configuration previously described configuration.

The first of which is that the ACTG calculations are saved (perhaps to a scratch file) and can be shared among multiple application clients on the network. This avoids having to recalculate the same ACTG tables each time the algorithm is used. The ACTG Service is informed that the database has changed (and thus it is time to refresh its tables) via a Stored Procedure on the database server that is triggered whenever a new database dump is performed. The ACTG Service can run at idle priority and can perform its data mining activities when the server is not busy. If a client connection is made before a complete list of cross tabs is generated, then the priority of the service can be temporarily boosted to allow completion of its data mining.

ACTG Use Note

The dimension with more members should be placed on the row axis. The dimension with fewer members should be placed on the column axis.

Depth-First

The depth-first process involves building the cross-tab by generating the dimension/member combinations as a nested do loop where the inner loop represent on variable and its descendants and the outer loop represent the other variable an its descendants. Thus, the process produces a cross-tab of combinations M1–N1, M1–N2, . . . M1–Nn, M2–N1, M2, N2, . . . M2–Nn, . . . Mm–N1, . . . Mn–N1 M1 running through all member of one variable Calculate the score of Product and Education.

In other words, the process first goes down the first hierarchy and compare each level with the second hierarchy in turn. Each new variable adds another inner loop to the process.

Breadth-first

The breath-first process involves building the cross-tab by generating the dimension/member combinations at the highest level of each variable, followed by the next level and so on. This process is generally preferred because the more interesting cross-tab usually occur higher up in the variable hierarchies, but becomes particularly preferred when the sparsity cutoff is less than 100%. When the sparsity cutoff is set a some value say 20%, then as the process goes do the level of variable hierarchy analyzing the cross-tabs an each hierarchical level, when a cross-tab fails the sparsity test, then the entire branch can be ignored. Thus, significantly shortening computational time and resource costs.

PIVOT TREE CONSTRUCTS

The present invention also includes a decision tree generator where the number of dependent variables is greater than one. In a traditional decision tree, the top of the tree is a single dependent variable or decision and the resulting decision tree shows all independent variables and their values that relate to the dependent variable. However, traditional decision trees are not designed to handle more than one dependent variable. On the other hand, the decision tree generator of the present invention is specifically designed to handle two or more dependent variables and provide for efficient visualization of the multi-dependent decision trees using novel graphic constructs. While the decision tree can, consistent with all traditional decision tree generators, generate traditional decision trees, the present generator is unique in its ability to generate multi-dependent variable decision trees. The generator will of course behave differently depending on the number of dependent variables chosen/defined by the user from which the multi-dependent variable decision tree is generated or constructed.

If the user only selects a single dependent variable, i.e., the number of dependent variables is one, then the generator generates a classical "Machine Learning Decision Tree." The nodes in the tree look like the classical nodes and the classical decision tree construct is used to grow the tree. However, if the user selects two or more dependent variables, i.e., the number of dependent variables is greater then one, then the generator generates a construct sometimes referred to herein as a PivotTree or extended decision tree.

An extended decision tree is generated using the following process. First, the user selects one or more dependent variables and a plurality of independent variable from a list of dimensions and members associated with a multidimensional database (MDD). Next, if the user selects two or more dependent variables, then the generator constructs a new variable from the selected dependent variables, where the new variable has values equal to a product of the number of values of the selected dependent variables. For example, if two dependent variables are selected and each variable had two values, then the new variable has 2×2 or 4 values. Generalizing, if n dependent variables are selected and each dependent variable has m values, then the new variable will have k values given by formula shown below:

$$k = \prod_{i=1}^{n} m_i$$

Thus, the nodes of the pivot tree construct are cross-tabs instead of the classical decision tree single valued nodes. Moreover, the cross-tabs have a dimension equal to the number of dependent variables. Thus, a two dimensional cross-tab representing a new variable constructed from two dependent variables will appear as a matrix having sides corresponding to the number of values associated with each variable. A three dimensional cross-table representing a new variable constructed from three dependent variables will appear as a 3D matrix having sides corresponding to the number of values associated with each variable. A higher dimensional cross-tabs will appear as nD matrices.

Once the new variable is constructed, the generator generates a standard decision tree where each node is now occupied by an appropriately dimensioned cross-tab. With the tree generated, the generator then issues the necessary MDD commands to populate the cross-tabs with the data that the cross-tab represents. For example, if a cross-tab represents two variables having two values, then the cross-tab will have a total value representing the sum of all the values of the two variables and values representing the cross sums of the two variable taken together.

Figure 20:
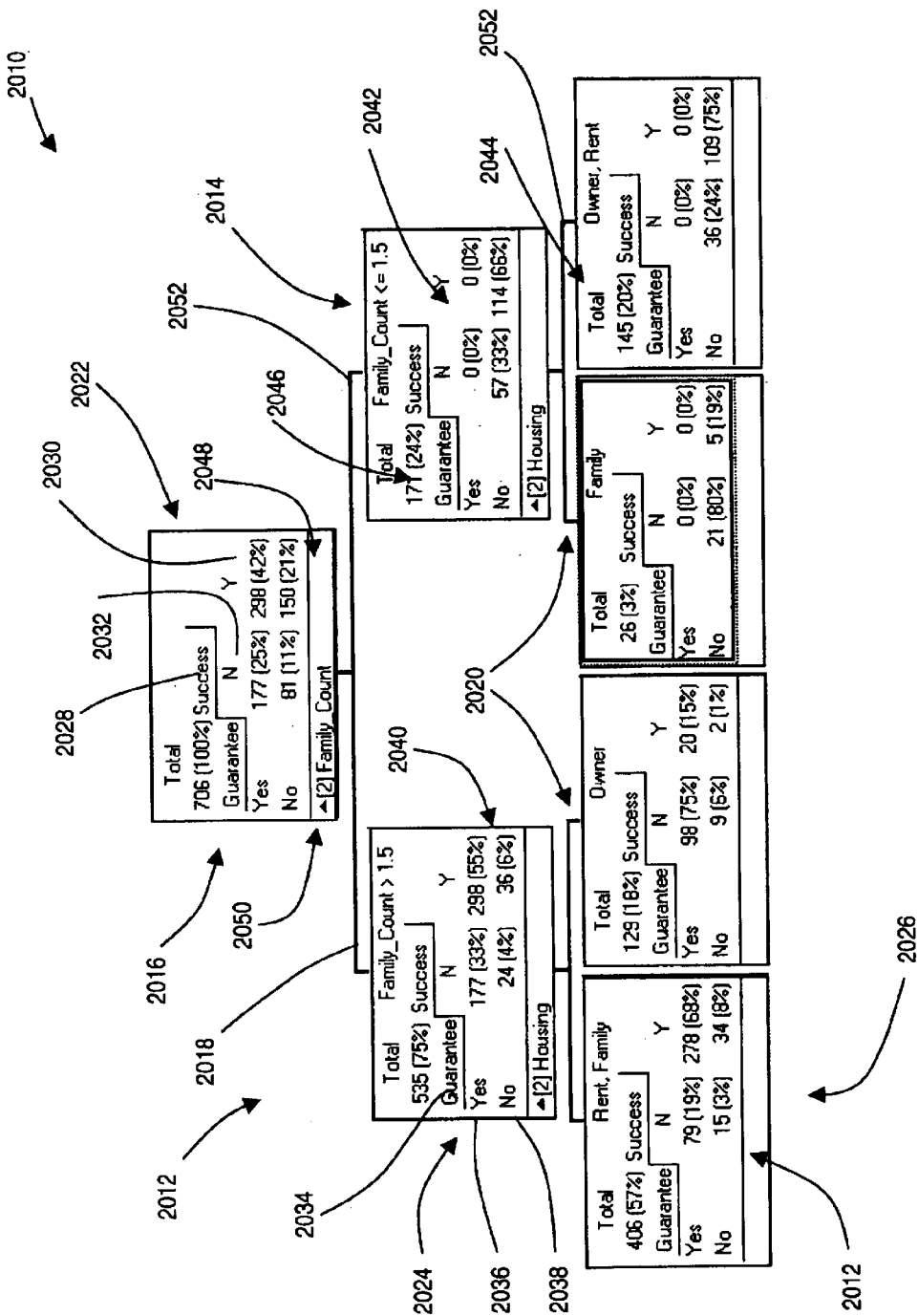
FIG. 20 depicts a pivot tree construct of the present invention.

Referring now to FIG. 20, a portion of a pivot tree construct 2010 of this invention is shown. The construct 2010 includes a background area 2012 and a pivot tree 2014 displayed within the area 2012. The tree 14 has three levels 2016, 2018, and 2020. The first level 2016 includes only a cross-tab base node 2022. The second level 2018 includes children cross-tab nodes 2024 of the base cross-tab node 2022. The third level 2020 includes grand-children (children of each child) cross-tabs nodes 2026. The cross-tabs 2022, 2024 or 2026 shown in this Figure includes a success dimension 2028 with having a YES member 2030 and an NO member 2032 and a guarantee dimension 2034 having a YES member 2036 and an NO member 2038. The cross-tabulated values are shown as numeric values and percentages 2040 in a 2×2 matrix 2042. Each cross-tab node 2022, 2024 or 2026 also includes a total labeled box 2044 with an associated numeric box 2046, which displays a total count or sum of all values in that cross-tab. Each cross-tab node 2022, 2024 or 2026 also includes a child count field 2048 indicating the number of children associated with each node and a hot area 2050 containing either an upwardly pointing triangle or a downward pointing triangle for rolling the tree up or down. The child-parent relationships are shown by lines 2052.

Figure 21:
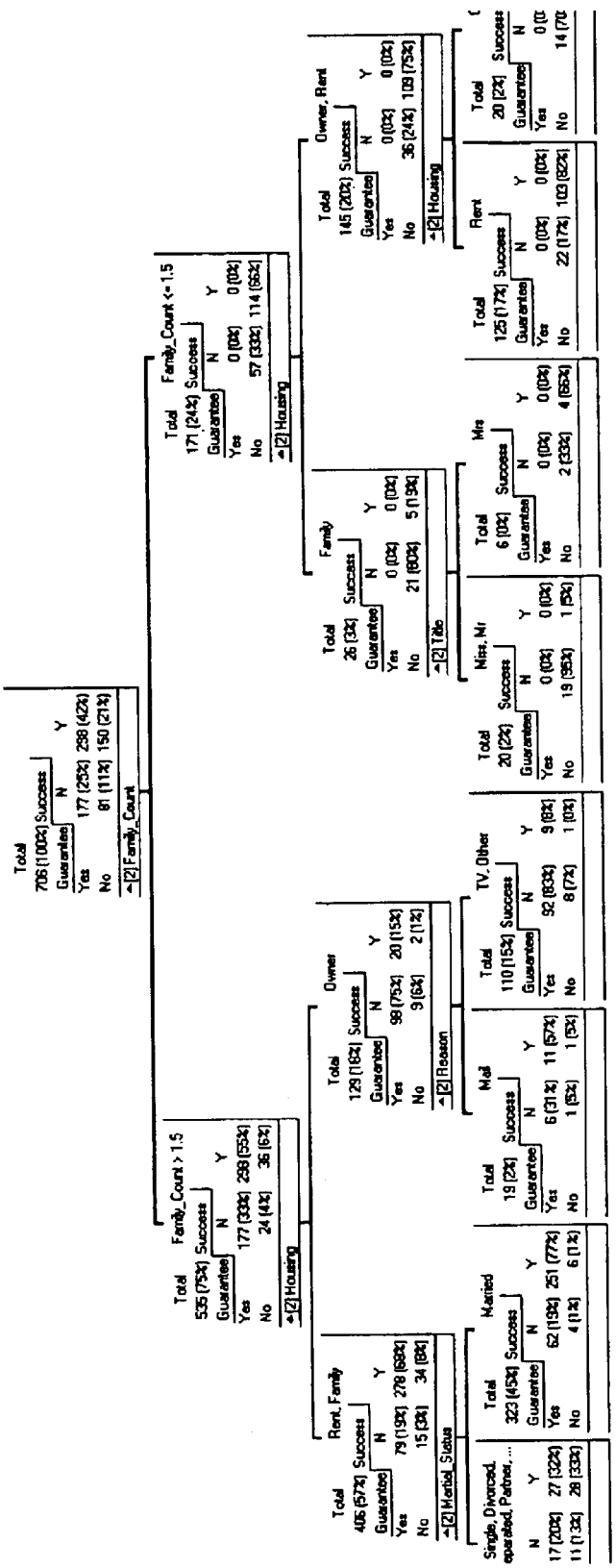
FIG. 21 depicts the pivot tree construct of FIG. 20 with one additional level split.

Referring now to FIG. 21, the pivot tree construct 2010 of FIG. 20 is shown with a forth split level 2054 and its associated cross-tab nodes 2056. Looking at the last split level of the expanded tree 2010, it is readily apparent that as the tree grows, displayability decreases.

Node Scroll-bar and Children Display

In a decision tree, it is possible for a node to have numerous children; thus it can become difficult to effectively display a tree because it can become too wide. One possible solution is to provide a slider at each node. The user can specify the maximum number of children to be displayed at each node, thus control the width of the tree. There will be a visual clue that some of the children have scrolled of the display. By using a scroll-bar the user can scroll through all of the children.

Figure 22:
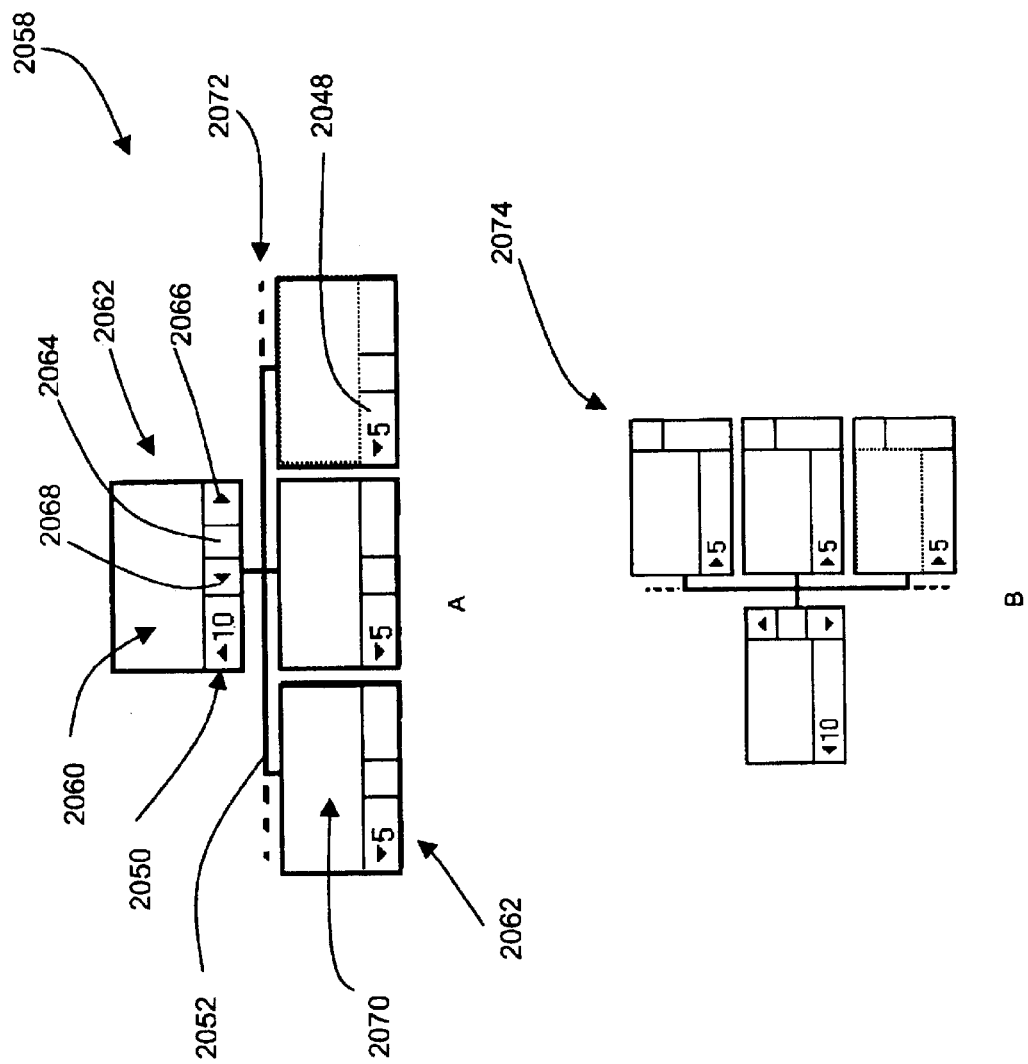
FIG. 22 depicts a control mechanism for view large pivot tree constructs.

To handle is displayability problem, the pivot tree generator supports a scrolling feature shown in FIGS. 22A–B. Looking at FIG. 22A, a horizontally configured model tree 2058 is shown to include a blank base node 2060 having the child count field and the roll up/down area 2050 and a scroll control 2062. The scroll control 2062 includes a scroll bar 2064, a right scroll button 2066 and a left scroll button 2068. Each child node 2070 also includes a scroll control 2062. The child-parent relationships are again shown by the lines 2052, but in addition, dashed lines 2072 extend to the right and left designating that only a portion of the children are being displayed. The reader will also note, that the children have five children as shown in their child count field 2048, but the tree is rolled up at these nodes. Looking at FIG. 22B, a vertically configure model tree 2074 is shown with the same layout as in FIG. 22A.

Another powerful feature of the cross-tab node based decision tree processing of this invention comes from the different types of variables represented in a data structures amenable to decision tree processing. In particular, the data structures being analyzed are generally hierarchical in nature. Thus, a given dependent variable in any given cross-tab node may be a hierarchical variable. Because a dependent variables may be hierarchical, the user can use standard hierarchical drill up and drill down functions on each node that includes a hierarchical variable. This function is invoked simply by selecting a node and then click or double clicking on the hierarchical variable. Preferably, hierarchical variables are indicated by color or marked in some other fashion or all hierarchical variables will have active drill up or drill down button associated therewith.

Moreover, in addition to decision tree statistics that can be performed on the cross-tab based decision tree, cross-tab statistics can also be performed on a node-by-node basis allowing for the extraction of additional information or meaningful data from the decision tree.

The present invention also provides a variety of visualization techniques for visualizing a cross-tab node. Thus, the user can use all cross-tab visualization formats or techniques for each node of a cross-tab based decision tree that are available for any cross-tab. These visualization techniques are available from cross-tab control visualization menus which can be invoked via user interaction with the GUI.

Data Mapping

Data mapping is a process by which two or more dependent variables are mapped (converted) into a single hybrid dependent variable. If any of the dependent variables are continuous, then the generator first converts the continuous variable into a discrete variable by discretizing or binning the variable. There are two different discretization processes, one is based on equal pieces or sizes; the other on piece of equal value. In equal size discretization, the continuous variable is divided into equal pieces, e.g., 1–10, 1 1–20, 21–30, etc. The value of each bin is the sum or integral of the values of the variable in each piece. Thus, the value in each piece can vary from the variable minimum value to its maximum value. In equal value discretization, the continuous variable is divided into piece that have equal value. Thus, the size of the piece varies so that the value of the pieces remain the same. Once all of the variable are discrete, the variable are combined into a hybrid variable as described above.

Data Synchronization Between Cross-tab and Decision Tree

The user creates a cross-tab using the cross-tab generator of this invention, the use then desires to convert or switch from a cross-tab representation to a decision tree representation. The conversion process transforms the cross-tab construct into an equivalent cross-tab decision tree construct, where the data values are conserved. That is, the data that was being used and shown in cross-tab construct must be used equivalently in populating the cross-tab decision tree. Likewise, when the user switches from a decision tree to cross-tab construct, the cross-tab conversion control must synchronize data so that the data is conserved in the cross-tab construct.

Data Sources for Decision Tree Generator

The pivot tree generator of this invention can use data from any other generator of this invention. For example, if the data comes from a cross-tab construct, then the transformation chooses as the dependent variable for the pivot tree, the inner most leaf of the cross-tab which may be a one dimensional or two dimensional cross-tab. The remaining variables are now all independent variables. The pivot tree is then constructed by displaying as the next split variable the most correlated remaining independent variable, until no more independent variables are left.

In going from a pivot tree construct to a cross-tab construct of this invention, the transform takes the root node and makes it the building block of the cross-tab construct, i.e., because the root node is a cross-tab, it comes over unchanged. Next, the first split variable is placed outwardly next to last dimension on either the column or row axis of the cross-tab. The alternation is used only to maintain a balance of the number of row and column dimensions. It should be recognized that if the user so chooses the cross-tab can be made unbalanced.

Of course, any generator can obtain the necessary data directly from the MDD via queries to the MWI.

How Pivot Tree Generator Works

Suppose, a user has created a 6-dimensional cross-tab (plus a measure dimension). Now he wants to create a decision tree to represent this data. The system can take the 2 (or more if desired) of the inner most dimensions and use them in the root node (2D cross-tab) as dependent variables, hence 4 dimensions are left. Now the system can determine, out of the 4 remaining dimensions, which dimension is most correlated with the 2 dimensions in the cross-tab. Once the system makes this determination, it can generate the first split. 3 dimension have been used so far. Using GAIN and other similar techniques, the system will grow the tree only from growable nodes that pass a qualification test.

Other Pivot Tree Attributes

The root node does not have to be a 2×2 cross-tab; it can be any size based on the number of members of the dimensions or members selected to comprise the base node, e.g., m×n cross-tab. The user can add dependent variables by grabbing a variable (dimension or member) from a list and drag-n-drop the new variable into the cross-tab wherever desire and the cross-tab control will add the dropped in variable to the cross-tab. The user can remove and dependent variable by simply grabbing the variable in a cross-tab and dropping outside the cross-tab.

Generally, all of the children nodes will represent the same cross-tab configuration as their parents and generally as the root node. However, the user can add or expand or subtract or reduce any node and any point in the tree construct. From that point onward, all children of the expanded or reduced node will look like that node.

The tree can be in manually or automatically grown. In manual growth mode, the user can drag-n-drop a dimension or member from a list onto a root cross-tab template. The user can now grow the tree by selecting an independent variable for a list and dropping it into the active construct template or with a mouse-right-click-shortcut-menu to selected a split variable.

A cross-tab is order independent, whereas in a decision tree, the ancestors of a node are ordered relative to some ranking process. For example, in a cross-tab, the user can place a variable either on the row hierarchy or column hierarchy, the result will be the same. In a decision tree, the split occur according to ranking criterion, i.e., each new level represents the most correlated of the remaining independent variables to the immediately preceding level.

Pruning a Pivot Tree

In Decision Tree algorithms there are basically two ways of producing simpler trees: decide not to generate some branches during the tree growing phase ("pre-pruning"), or removing retrospectively some of the structure already built up ("post-pruning" or simply "pruning").

The former approach (pre-pruning) has the attraction that no time is wasted in generating a useless tree structure that won't be used in the final simplified tree. Furthermore, if some attributes used for generating the tree contain noise, the generated tree won't be useful for classification and the branches generated from these attributes should be removed. Pre-pruning in pivot tree is accomplished using a Chi-Square test of statistical significance. If the branch has an absolute value of the deviation below some cutoff value, then no further growth down that branch will occur. While the present invention prefers pre-pruning with a Chi-Square test, any pruning criterion or test can be used as well—such tests are well known in the art.

In the second approach, post construct pruning, the generator is allowed to grow the tree without restrictions and the generated "over fitted" tree is then pruned based on a given criteria, usually a pessimistic classification error estimate. This approach has the disadvantages that the time invested in building parts of the tree that are later discarded can be substantial; however, the benefits in tree accuracy can be significant due to the extensive exploration of more possible partitions—growing a tree then pruning the resulting tree is slower time wise, but yields more reliable results.

Both methods make use of OLAP capabilities and preferably use 2D cross-tabs for evaluating the statistical dependencies (Chi-Square test) before generating the tree.

Pivot Tree in an OLAP Environment Using Middleware Architecture

Pivot tree (an enhanced decision tree) is a typical example of a machine learning algorithm that can effectively work within an OLAP environment. A classical decision tree generator builds a decision tree by individually analyzing all detail data records in a database. Entire database scan (read) operations are performed very frequently. Whereas, the pivot tree generator of this invention, takes advantage of statistical calculations that an OLAP engine performs at data load/refresh time. The pivot tree generator can extract all necessary information, to grow a tree, from an nD cross-tab (that can be queried from the OLAP database manager by using middleware). In pivot tree generation, detail data records are not processed at all. Thus, the processing time to create a pivot tree is drastically reduced.

In a similar way, other data mining algorithms such as feature selection, association rules, clustering etc. can utilize the OLAP environment and Middleware interface to speed up the processing.

Figure 23:
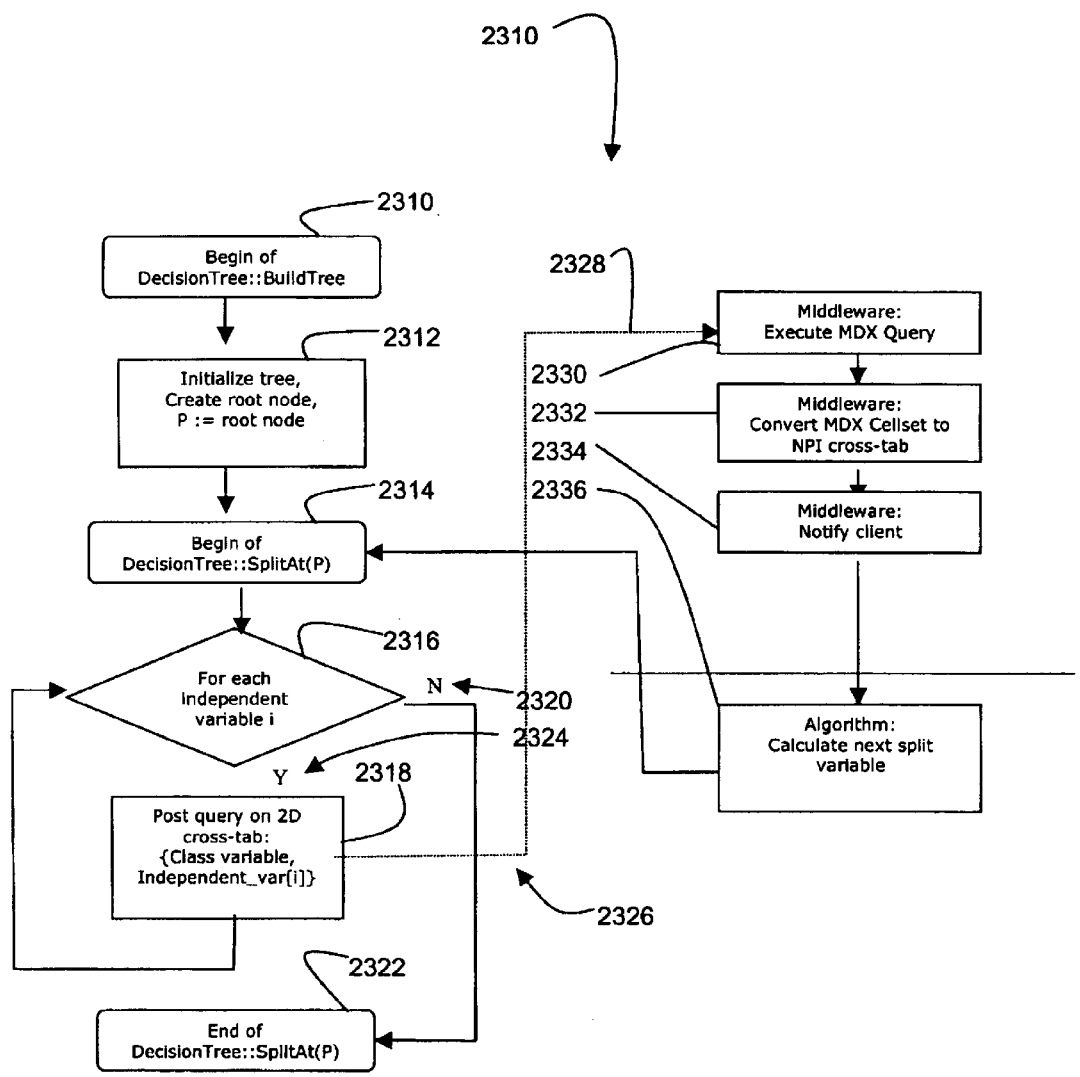
FIG. 23 depicts the control process for growing a pivot tree using the middleware interface of this invention.

Referring now to FIG. 23, a flow chart 2310 is shown that represents the construction of a pivot tree using the middleware interface of this invention. The chart 2310 includes a build tree step 2312 which initialized the build process in an initialize tree step 2314. Control is then transferred to a level split step 2316 and then to a independent variable test step 2318. The test step 2318 identified the independent candidate variables for the next split. If there are no more variable, then control is transferred along a NO branch 2320 to a end decision tree construction step 2322. If variable still exist, a variable name is passed along a YES branch 2324 to a post query step 2326 which posts an appropriate queries to the middleware interface. The query is posted asynchronously to the middleware interface along asynchronous path 2328 to an execute query step 2330. After posting the query to the MWI, control is transferred from the step 2326 back to the test step 2318 for continued independent variable processing and posting. When a query is posted to the MWI from step 2326, a pivot tree routine is notified of the posting and awaits a response to the query from the MWI.

In the mean time, the MWI parses and translates the query into database command syntax and send the commands to the database for execution in the execute query step 2330. When the database responds to the commands sent from the MWI in step 2330, the MWI conforms the data to the query in a convert data step 2332, which may require the MWI to do some amount of data pre-processing. Next, the MWI notifies the pivot tree routine awaiting the query results in a notify step 2334. The pivot tree client then calculates and selects the independent variable with the highest gain value for all the independent variables posted in the step 2326. Next, control is transferred back to the split step 2316.

How to Implement Decision Tree Algorithm in Olap Framework

There are two considerable differences from traditional way in which the decision tree algorithms were implemented earlier.

Algorithm retrieves necessary data by portions (cross-tabs). It posts a cross-tab request to the middleware.

The middleware asynchronously executes a dataset query and notifies an algorithm. So the algorithm processes the resulting cross-tabs in notification method:

```
void    OnQueryDatasetComplete(npiCrossTabTS&  crosstab,
void*  pParam, long lParam)
{
        npiEntropy Entropy;
        Entropy entropy.getEntropy(crosstab);
        float fRes = (float)entropy.Uxy();
        ...
}
```

For additional information on traditional decision tree construction, the inventor incorporates herein by reference C4.5: Programs for Machine Learning (Morgan Kaufrnann Series in Machine Learning) by J. Ross Quinlan, Sep. 1, 1997, Academic Press/Morgan Kaufiann; ISBN: 1558602380.

Poly3D Decision Tree Scatter Plot

Figure 24A:
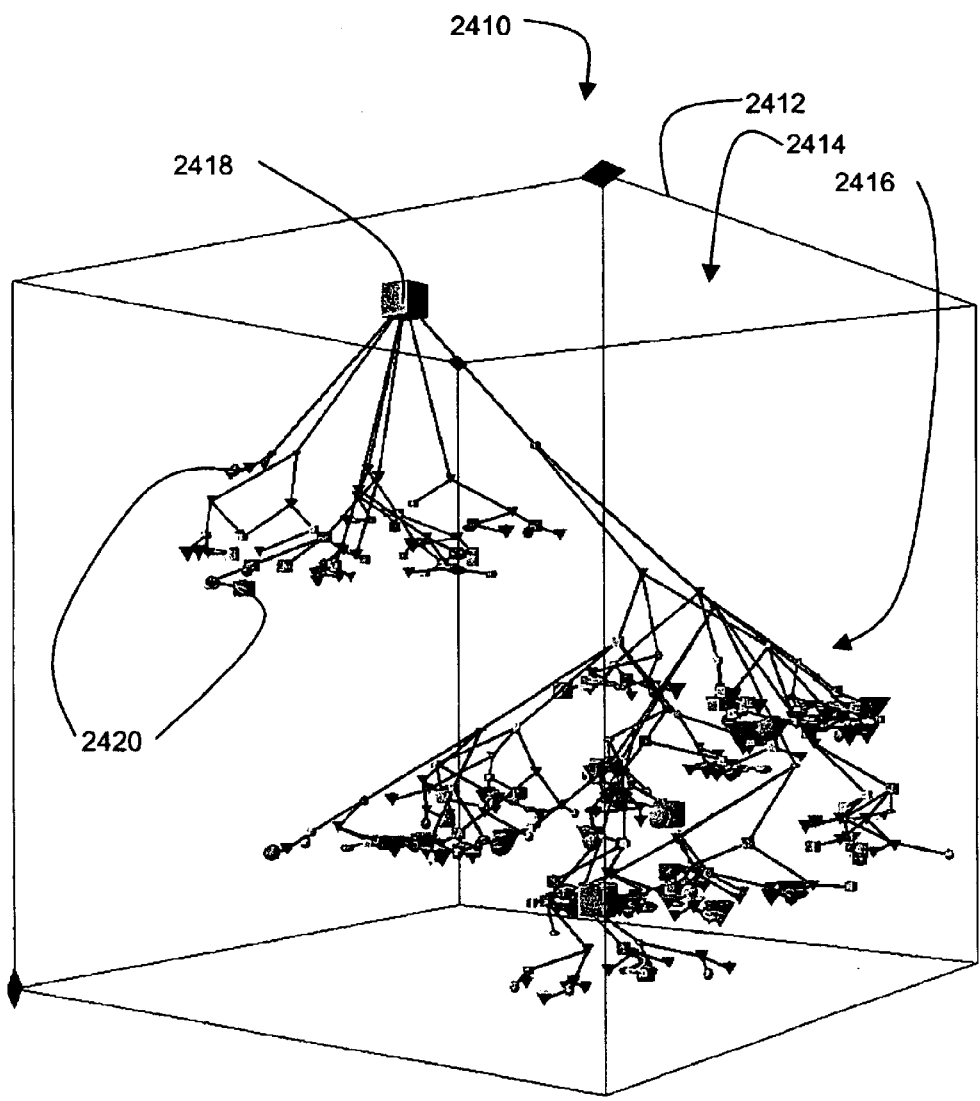
FIGS. 24A–C depict a 3D tree construct of this invention without and without cutting planes or surfaces.

An alternate display format any tree structure including a pivot tree construct or an MDTV construct involves presenting the tree in a 3D box where the children are distribute around their parents at equal angular spacings. Referring now to FIG. 24A, a 3D box 2410 outlined in a wire frame 2412 is shown containing in its interior 2414 a 3D tree construct 2416. The construct 2416 includes a root node 2418. Child nodes 2420 of the base node 2418 are distributed about the base node 2418 at equal angle relative to a z-axis (up direction in the figure). All other children nodes are added in an analogous fashion. The nodes can have different shapes and colors which can represent parameters of the tree such as :support, confidence; purity; etc.

In this 3D construct, node depth is on x-axis, the number of records is on the y-axis (expressed in logarithmic form), and the z-axis the user can make a selection from the available choices (support, confidence, purity, etc.).

Figure 24B:
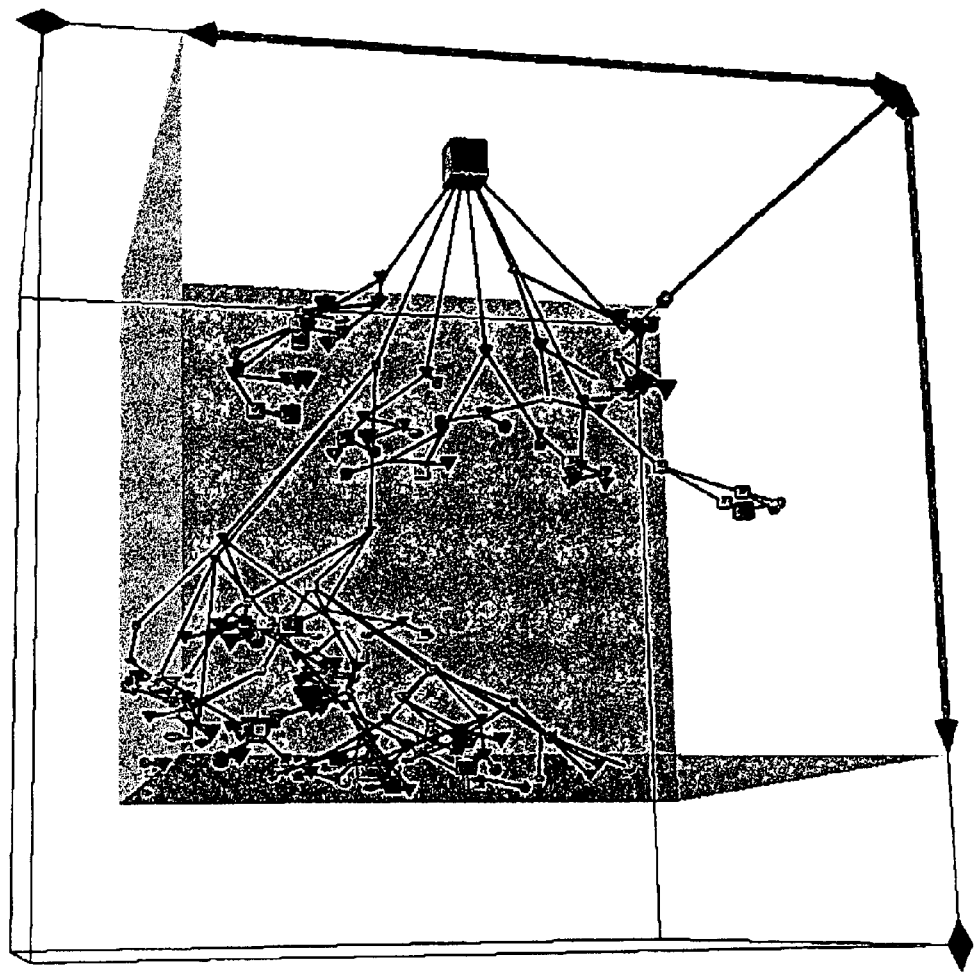
Figure 24C:
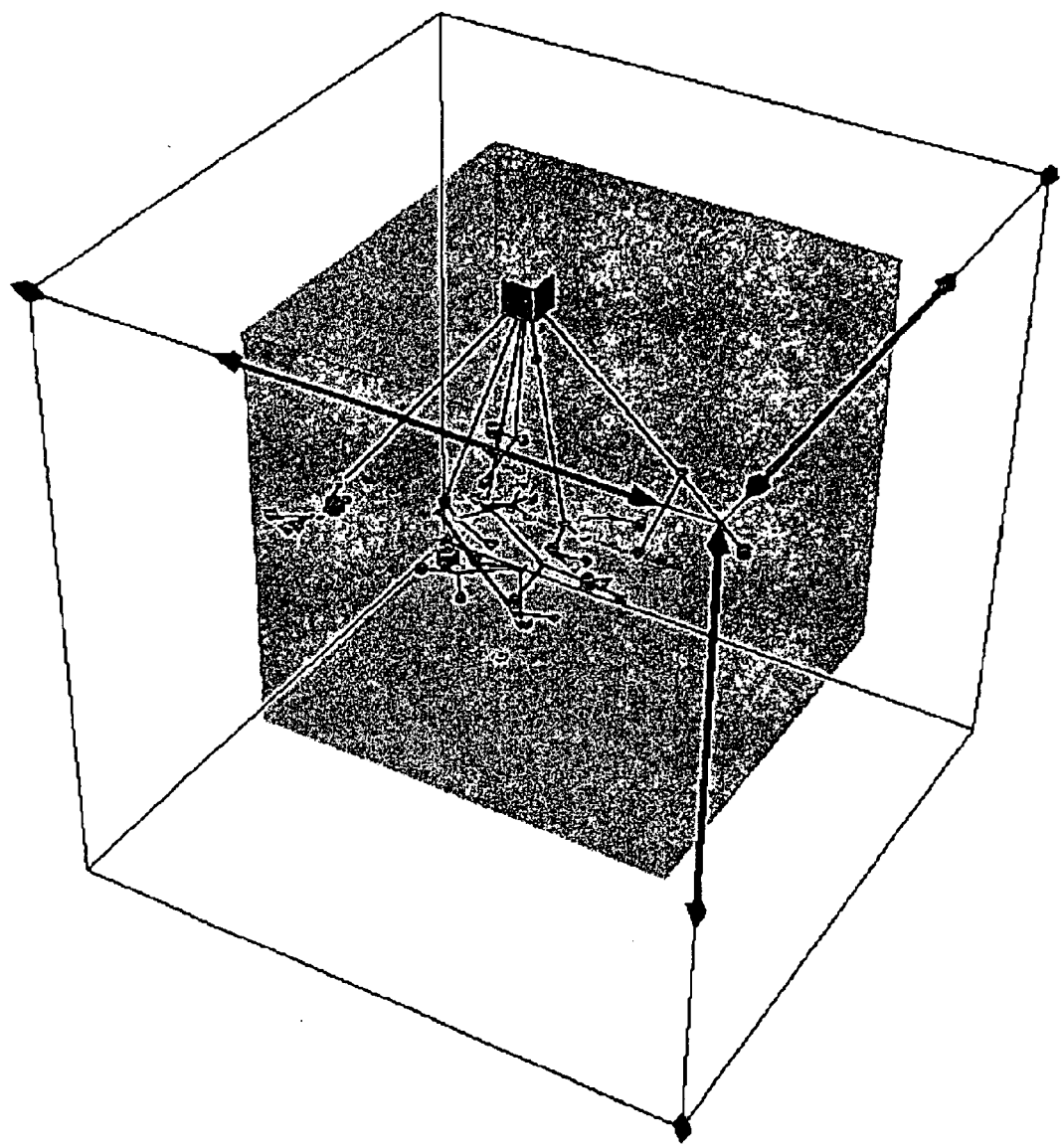

Thus, the result will be a cube with points (cube, sphere, tetrahedron, etc.) inside it. Here are some operations the user can do on this cube: (1) Each point in this construct is tied back to a node in the RealTree. When the user places a cursor over a point in this construct, the corresponding node in the RealTree will be highlighted, and vice versa; (2) Appropriate balloon text for any point will be shown; (3) When a mouse is placed over a point, the parents (if any) are connected with a line, and the children (if any) are connected with lines; (4) If possible, the decision tree operations to split, or grow a tree, should be available with a mouse-right-click-shortcut-menu; (5) Cutting surfaces can be added as shown in FIGS. 24B&C to cutoff parts of the tree based on x, y or z limits; (6) Slider control (like the one in MDTV) may be used.; (7) Hide/unhide hierarchy selection can be used; and (8) Etc.

Automated

The user begins by constructing a nD cross-tab. Then the user launches the decision tree algorithm by clicking an icon or through a menu selection. At which time, the decision tree algorithm will run in the background. The algorithm will use the variables in the cross-tab as dependent variables and the remaining variables will be used as independent variables. Once the decision tree algorithm has generated a complete tree, the result can be view as a list of "interesting" cross-tabs ranked on some criterion such as: deviation from the root node; deviation from the parent node; row percent; column percent; overall percent; purity; confidence; support; etc. These interesting cross-tabs are presented to the user in a list similar to the list used in ACTG routine described herein.

A node of a decision tree can be shown as a cross-tab composed of dependent variables, and the path to the node can be translated into filters placed on independent variables. The ranked cross-tabs can be shown in a list or a visualization, e.g. MDTV, PixelMap, etc. When the user selects an "interesting" cross-tab, the dependent variables will be placed in the cross-tab, and the independent variables will become filters on the data.

DATA MINING, MIDDLEWARE AND OLAP ENVIRONMENT

Aims and Scope

In order to efficiently use data-intensive operations that are common to classifiers, decision trees and other machine learning and pattern recognition algorithms or data mining techniques used in Data mining of data in a multidimensional database (MDD), the present invention introduces an interface between such application programs and an MDD called a Middleware interface (MWI) that allows efficient command sending and data receiving from an MDD using a Database Manager (such as MicroSoft on line analytical processing "OLAP" engine) of a MDD. For additional information on MicroSoft's OLAP databases, the reader is directed to www.microsoft.com and the section on OLAP databases.

In some data mining algorithms or techniques, direct access to the data is not absolutely necessary, and only some statistics about the data is required. Even in the cases where direct access to the data is needed, some information can be efficiently obtained using the Database manager directly. However, to improve flow of command and data to and from the MDD manager, the MWI of this invention is ideally suited.

The purpose of the MWI of this invention is to serve as an interface between the data mining algorithms or techniques (DMTs) and the MDD manager. The MWI includes all the functions needed to receiver queries from a plurality of DMTs, determine the MDD commands required to satisfy the request, schedule and batch submit the commands to the MDD manager and receive data from the MDD manager and match the data with the appropriate command and then forward the data to the requesting DMT in the form mandated by the query. The MWI, thus, is a staging platform between the DMTs and the MDD Manager to improve data retrieval from the MDD Manager. The MWI is asynchronous when interacting with DMTs and uses multiple threads when interacting with the MDD manager, allowing parallel processing, staging, to occur improving overall throughput of the volume of command/data exchanges.

The MWI of this invention interacts directly with the OLAP Data warehouses feature of the MDD Manager. The present invention includes a set of classification algorithms or DMTs associated with an NPI data mining library such as a C++ library which a user can invoke as data analysis tool for extracting information or meaningful data from a MDD. The Middleware interface of this invention acts as a layer between the DMTs and the MDD which allows for more abstract or complex data retrieval and storage services derived from queries from a data mining algorithm or DMT.

The Middleware Interface MWI includes:
a parser/translator to free DMTs from the logical and physical constraints of the internal MDD data structure and free the DMT from having to perform any data conversions; and
routines to handle data request scheduling, optimizing, and threading.

MWI Architecture

The MWI is an asynchronous interface with respect to the DMTs invokable by a user at the user's computer. The MWI receives queries from DMTs; queues batches of MDD commands or requests corresponding to the data needed by each query to the MDD Manager; receives data corresponding to the commands or requests from the MDD; pre-process the data if required by the query; forwards or posts the results for retrieval by the DMT. In this manner, the MWI allows the DMT and/or user to perform other tasks, while requested data, meaningful data or information is being processed by the MWI. Once the requested data, meaningful data or information has been received from the Middleware and the DMT can process it.

Figure 25:
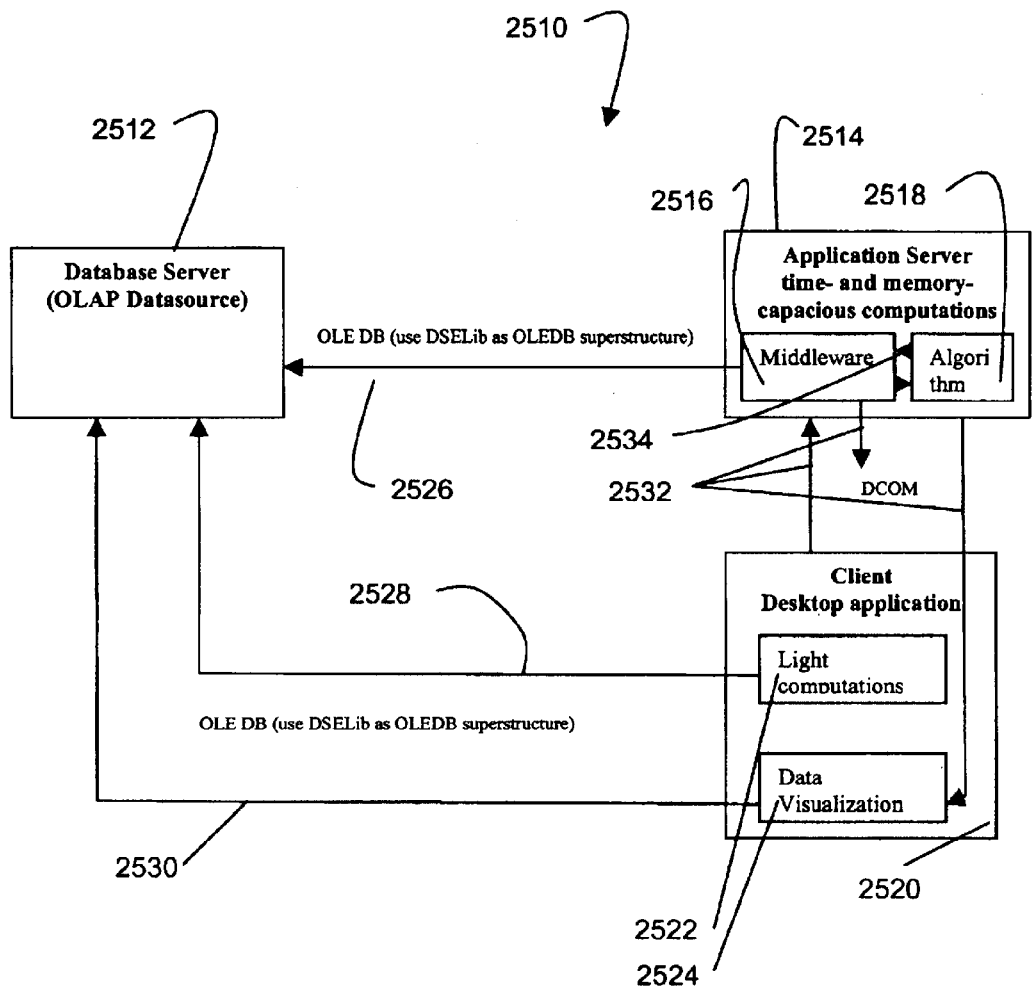
FIG. 25 depicts a block diagram of the MWI of the present invention operating in an OLAP environment.

Looking at FIG. 25, a pictorial representation of the MWI architecture 2510 is shown to include a MDD server or OLAP data source 2512, an application server 2514 including the MWI 2516 of this invention and a DMT 2518 and a user desktop application 2520 including a light computation interface 2522 and a GUI for data visualization 2524. The MDD server 2512 and the MWI 2516 interact via communications link 2526. The MDD server 2512 and the light interface 2522 interact via communications link 2528 and the MDD 2512 and the GUI 2524 interact via communications link 2530. And, the components of the application server 2514 and the client desktop 2520 interact via communications links 2532. The MWI 2516 and the DMT 2518 interact via communication links 2534.

In this architecture, the MDD, MWI and GUI can reside on a single digital processing unit or be distributed among number digital processing units in a distributed processing environment. In fact, the system of the present invention can be distributed on intranets or on intemets.

DMT or NPI Client and Middleware Interface Interaction

Using this approach, multiple queries can be received, processed and supported. The ability to handling many queries simultaneously allows DMTs having the ability to "predict" the need for several types of data in advance to send queries corresponding to the needed data to the MWI which executes the queries using multiple threads to the MDD and notifying the client DMT when results are ready.

The MWI of this invention is universal in construction and can interact with any machine learning algorithm or DMT. Of course, the algorithm or DMT may have to be altered slightly to support robust interaction with the MWI. Became the MWI supports standard query language constructs free of any constraints from a particular MDD, the MWI of this inventions offers programs a platform form which algorithms with standard query construction procedures can be used. Thus, the MWI of this invention is independent of the nature of its client algorithms or DMTs; provided that the algorithm or DMT sends queries in the MWI standard query language and can receive results from the MWI in standard forms.

Figure 26:
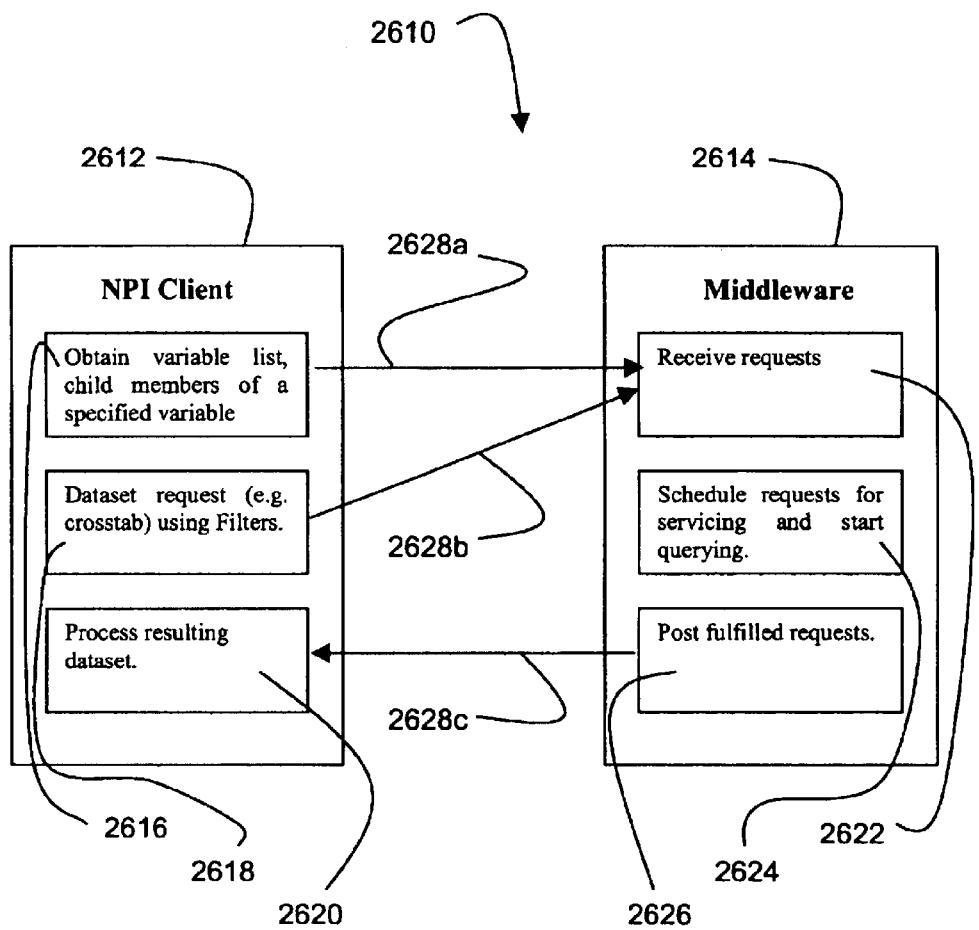
FIG. 26 depicts a block diagram of the MWI to DMT interface and interaction processing.

Referring now to FIG. 26, a pictorial representation of MWI-DMT interaction 2610 is shown to include a DMT or NPI client 2612 and an MWI of this invention 2614. The DMT 2612 includes a variable list requesting module 2616, a data request module 2618 and a results processing module 2620. The MWI 2614 include a query or DMT request receiver module 2622, a command or MDD request scheduler 2624, and a resulting posting or transfer module 2626. The DMT 2612 and MWI 2614 interact via communications links 2628a–c. The communication link 2628a operates between the DMT variable list requester 2616 and the MWI request receiver 2622; the communication link 2628b operates between the DMT data requester 2616 and the MWI request receiver 2622; and the communication link 2628c operates between the MWI posting and data transfer module 2626 and the DMT processing module 2620. This interaction structure allows DMTs to have standard query construction routines independent of the internal logical and physical structure of the MDD which normally support complex, non-standard internal structures. Thus, the MWI as a middle man between a group of buyers and a warehouse, where each buy needs a large number of different components in different formats some of which can be obtained directly from the warehouse and some that has to be assembled from base components obtained from the warehouse and the warehouse has a very particular way in which components are stored and received. The middleman handles all the peculiarities associated with the warehouse so that the buyers do not have to perform all the various tasks to obtain the components they desire.

Middleware Interface and an OLAP Environment

The MWI of this invention supports the following features when interacting or working with a MDD such as an OLAP data cubes: (1) consider the hierarchical structure of variables and their values in OLAP data cubes to provide access to the cube variables, e.g., dimensions and members; (2) accept queries including filters and variables from DMTs, formulate corresponding command or MDD requests such as MDX queries to MDD and convert or pre-process the data to appropriate format consistent with the DMT query; (3) supply required statistical values either via internal MWI calculations or directly from the MDD such pre-calculated statistical data or statistical data that is calculated via a direct MDD command. For example, MicroSoft's OLAP service supports a lot of pre-calculated statistical data such as Mean, Variance, Standard deviation, Correlation, Regression, etc.

Since different MDDs and datasets within an MDD are treated independently as are the algorithms or DMTs, the algorithms and DMTs are able to perform other tasks during query execution, where the MWI multi-threading computations and interactions with the MDD are transparent to all algorithms or DMTs.

Data Mining Middleware: OLAP Datasource and DMTs

Introduction

One aspect of the system of the present invention is the construction of an interface between data mining algorithms or DMTs and an multidimensional database (MDD) having a sophisticated OLAP type engine. The such an environment, DMTs have a greater flexibility in function if the can offload much of the MDD interaction to middle man that can take full advantage of the considerable functionality built in to an OLAP engine or other similar engines associated with MDDs such as their Data warehousing capabilities. The system of the present invention accomplishes this offloading via the middleware interface (MWD. Using the MWI, the system of this invention can run the DMTs as member of an NPI data mining C++ library as data analysis tools from a menu or set of icons on a GUI.

The MWI of this invention has at least the following features: (1) the MWI allows DMTs to be designed independent of the logical and physical data structure of any particular MDD; (2) the MWI performs all needed data conversions; (3) the MWI performs needed data pre-processing depending on the data, meaningful data or information requested by a particular DMT; (4) the MWI performs all data request scheduling; (5) the MWI performs all optimization of data request scheduling, converting and pre-processing; (6) the MWI establishes necessary multiple threads (multithreading) to satisfy the data, meaningful data or information requested by a particular DMT; and (7) the MWI is an asynchronous interface capable of simultaneously processing multiple DMTs queries.

The MWI of this invention can be structured in two ways. In one way, the MWI is universal for all possible classification algorithms or DMTs or any other routine that requires data from a MDD. With a universal MWI, each DMT should be modified to take full advantage of the functionality of the MWI. Such an MWI is not concerned with the peculiarities of a given DMT, but is designed to allow any DMT to utilize the MWI in MDD interactions. Second, but less preferred, is a MWI that includes a common or universal part and DMT specific parts. However, by designing the MWI properly so that the MWI common part can incorporate DMT specific parts as they are added on, the second structure will eventually lead to a universal MWI. Additionally, the second structure may work better in term conforming to the OOD protocols.

The MWI needs at least the following for a client DMT to work effectively with OLAP MDD or other MDD through the MWI: (1) the MWI has to consider the hierarchical structure of variables and their's values in OLAP MDD and provide access to the MDD variables: dimensions, members; (2) the MWI has to accept filters and variables, perform corresponding MDD commands, e.g., MDX queries in the case of a MicroSoft MDD, to database and convert data to an appropriate format for the DMT client; (3) the MWI has to supply requested statistics calculated for requested data—the MicroSoft OLAP service supports a lot of functions such as Mean, Variance, Standard deviation, Correlation, Regression, etc.; (4) the MWI has to support multiple DMT queries and treat them independently—asynchronously—so that the DMT are able to perform other tasks during query execution; and (5) the MWI has to make use multi-threading computations and make them transparent to the DMT clients.

Figure 27:
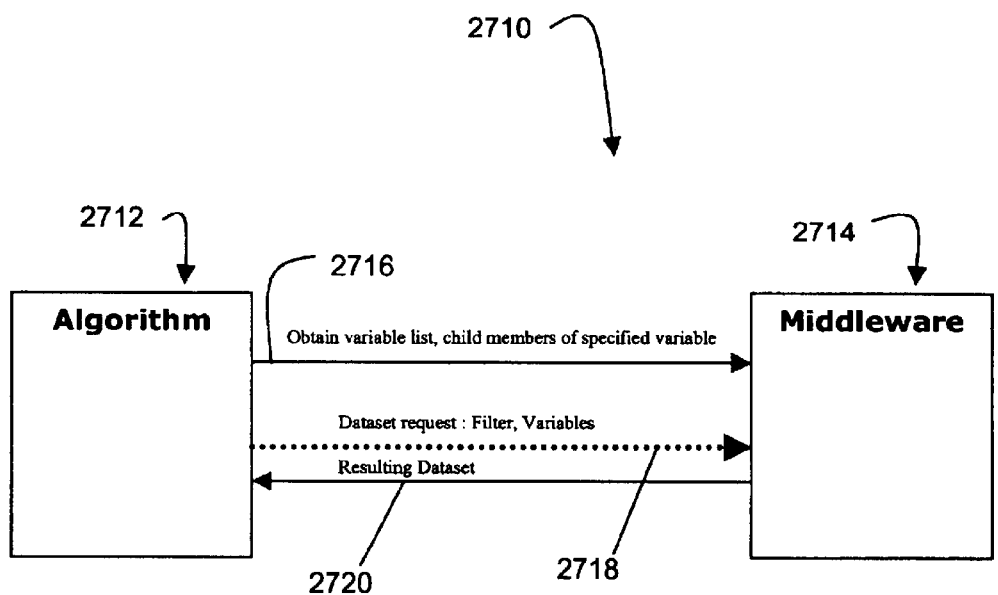
FIG. 27 depicts the communication processing between the MWI and a DMT.

Referring now to FIG. 27, a pictorial representation of MWI-DMT interaction 2710 is shown to include a DMT or NPI client 2712 and an MWI of this invention 2714. The DMT 2712 communicates with the MWI 2714 in two different formats: synchronous and asynchronous. When the DMT 2712 requests variable lists, a synchronous communication format 2716 is used. When the DMT 2712 is requesting data associated with variables using filter for cross-tab construction and population or other data intensive requests, an asynchronous communication format 2718 is used. When the MWI 2714 has accumulated all the requested data and performed any required or request data pre-processing, the MWI uses a synchronous communication format 2720 to send the data to the DMT. For house keeping purposes, DMT queries include identifiers so that the DMT can associate data with queries and the MWI can associate queries with DMTs. The DMT is responsible for generating the identifier, but the MWI can construct an identifier as well.

An Example of Middleware Interface

The following C++ code illustrates the MWI of this invention communicating with a DMT and a COM compliant module. COM stands for MicroSoft's Component Object Module communication framework and protocol. For additional information on MicroSoft's Component Object Module technology, the reader is directed to www.microsoft.com and the section on COM-based technologies. The code comprises:

```
//implement in MWI
class npiDSElement
{
public:
    const string& GetName();
    const string& GetUniqueName();
    const vector<npiDSElement*>& GetChildren() const;
    npiDSElement * GetParent();
}
//implemented by Middleware
template <class T>
class npiDSFilter<T>
{
public:
    const vector<T>& GetFilter() const;
    bool AddToFilter(T* _pItem);
    bool LookupInFilter(T* _pItem);
    bool   LookupInFilter(npiDSElement* _pElem, T*&
_pItem);
}
//implemented by Middleware
class npiMDDataSource
{
public:
    //Access to cube variables
    const  vector<npiDSElement*>& GetRootVariables()
const;
    const vector<npiDSElement*>&GetDependentVariables()
const;
    //Dataset
    bool  PostDatasetQuery(npiDSFilter& _Filter,
    vector<npiDSElement*>&_vecVariables, void*_pParam,
    long_lParam);
    //Statistics
    bool  PostStatisticsQuery(npiDSFilter&    _Filter,
    vector<npiDSElement*>&_vecVariables,
        STAT_FUNCTION _stat, void* pParam, long
_lParam);
        //STAT_FUNCTION values are as follows:
        //COUNT,AVG,MEDIAN,MIN,MAX,VAR,STDDEV,
RANK, . . . and other functions that are supported by OLAP
provider
}
//implemented by Algorithm
class npiMDDataSourceSite
{
public:
    void OnDatasetComplete(npiCrossTabTS&_CrossTab,
void* _pParam, long_lParam);
    void OnStatisticsComplete(npiCrossTabTS&_CrossTab,
    STAT_FUNCTION_stat,
        void*_pParam, long_lParam);
}
```

The C++ code above illustrates the mechanism of DMT interaction with the MWI. The interaction set forth in the C++ code is shown pictorially in FIG. 28. Looking at FIG. 28, a communication protocol 2810 is shown to include a:DMT 2812, an MWI of this invention 2814 and a COM connection component 2816 which is one half of the connection interface with another COM object such as a MDD. The DMT 2812 and the MWI 2814 communicate via communication links 2818 and the MWI 2814 communicates with the COM component 2816 via communcation link 2820.

Figure 28:
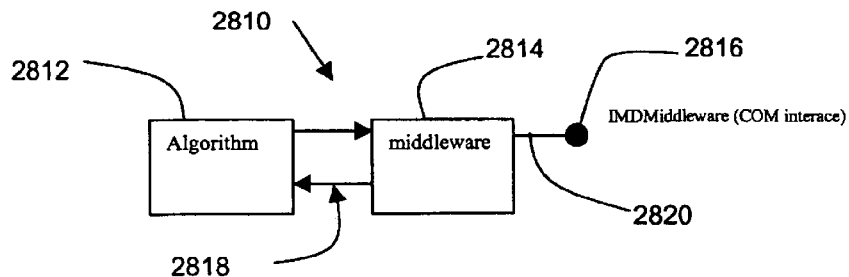
FIG. 28 depicts the communications between the DMT, MWI and COM component.

The COM component 2816 shown in FIG. 28 is a middleware control referred to herein as IMDMiddleware. The IMDMiddleware communication interface is designed to: specify a connection with a COM based MDD; specify an initial data filter; and define a set of independent/dependent variables. All these features are transparent to all DMTs.

Middleware Technical Notes

Introduction

This document presents a technical discussion of the Middleware major features. The Middleware provides Data Mining developers with an advanced data access application with analytical processing capabilities implemented as a COM-server.

Figure 29:
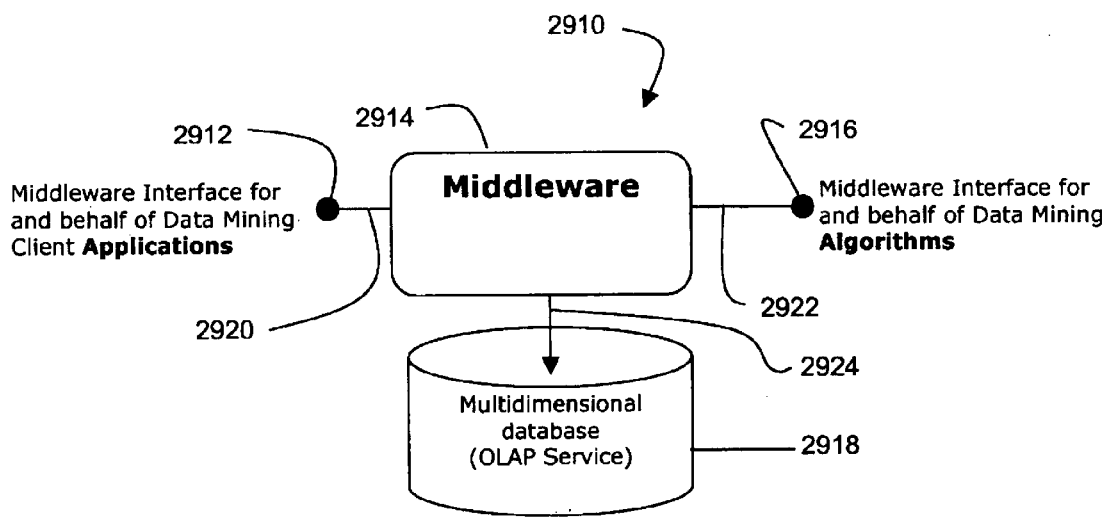
FIG. 29 depicts the COM protocol for the MWI in an OLAP environment.

Referring now to FIG. 29, a pictorial representation of this implementation 2910 is shown to include an client application MWI interface component 2912, a MWI 2914, a DMT MWI interface component 2916 and a MDD 2918. The MWI 2914 and the client application component 2912 are in communication via client application COM link 2920; the MWI 2914 and the DMT component 2916 are in communication via DMT COM link 2922; and the MWI 2914 and the MDD 18 are in communication via communication COM link 2924.

Purposes of Middleware Component

Since most DMTs require training sets, the MWI presents a unified interface between the DMT and training set source. The unified interface can utilize and preferably does utilize the well-known NPI C++ library objects that represents such a data source within an rational data base (RDB) Framework, namely, the npiVectorTS C++ class object.

Dealing with OLAP Databases, the training sets are not simple. In order to extract useful information (subsets of training data, statistical indices or the like) from a training set, the DMT has to perform data processing which is related to OLAP tasks. The middleware provides the DMT with a unified and efficient way to extract any data from multidimensional training set.

The MWI of this invention includes a OLAP component and of course also includes a RDB component. These components are interfaces between data sources and data mining algorithms. The RDB MWI executes an SQL-query by means of SQL RDBMS. Given the resulting record set, RDB MWI component calculates some statistics (frequency tables) that are useful for efficient data mining. With certain OLAP services, the OLAP MMI component does not process the data by itself. OLAP MWI component is a superstructure over the multidimensional data source and all the essential features of data processing are available for DMTs by means of the MWI. One important difference between the MWI of this invention and the standard DMT—MDD interaction process is that the data is presented in terms of variables (class or dependent variables and independent ones) and it's values. Thus, the MWI is useful in data mining and machine learning in an MDD environment.

Interface

The Middleware interface consists of three parts.

The Interface of Data Definition

The data definition part allows a DMT to define training set based on the OLAP Cube. In other words, the DMTs can specify variables of any kind and define of data subset (filters) by means of this interface.

Interface Control and Utilization

Figure 30:
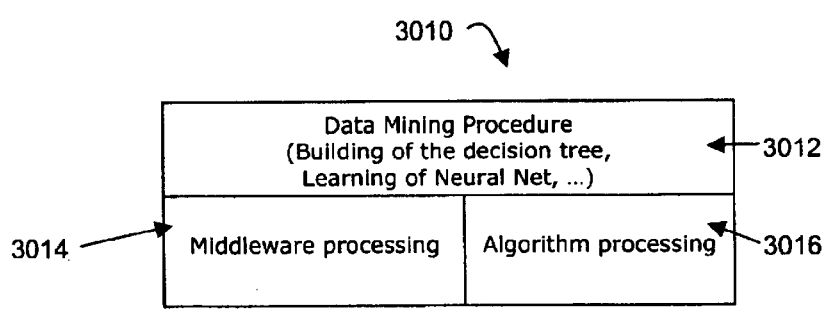
FIG. 30 depicts the computational cooperation between a DMT and the MWI.

Because the MWI supports a variety of pre-processing features, a DMT can incorporate the MWI features into its overall computational scheme or format. Thus, it is appropriate for the DMTs to control and utilize any middleware pre-processing feature within the entire DMT computation process. Using the MWI interface controls, a DMT can suspend/resume processing, change priorities, view processing statistics and so on. Referring now to FIG. 30, a pictorial representation of the MWI-DMT computational environment 3010 is shown to include a DMT procedure 3012, an MWI processing component 3014 and a DMT processing component 3016. The DMT takes advantage of MWI processing capabilities to distribute its computational load.

Dataset Access Interface

The MWI allows each client DMT to retrieve some part of needed data in an analyze form, where the analysis is performed at the MWI level prior to being forwarded to the DMT for final compilation and processing and ultimately to a visualizer for presentation and manipulation by the user. The MWI handles all necessary MDD commands and queries, while the DMT is free to perform other tasks. The MWI allows the DMT to construct queries at a higher level of abstraction than the MDD structural level generally supports, where the queries are defined in terms of variables (data mining native format). The MWI then posts the results when all data retrieval operations are completed. The dataset access component of the MWI is responsible for any data exchange with the DMT.

Figure 31:
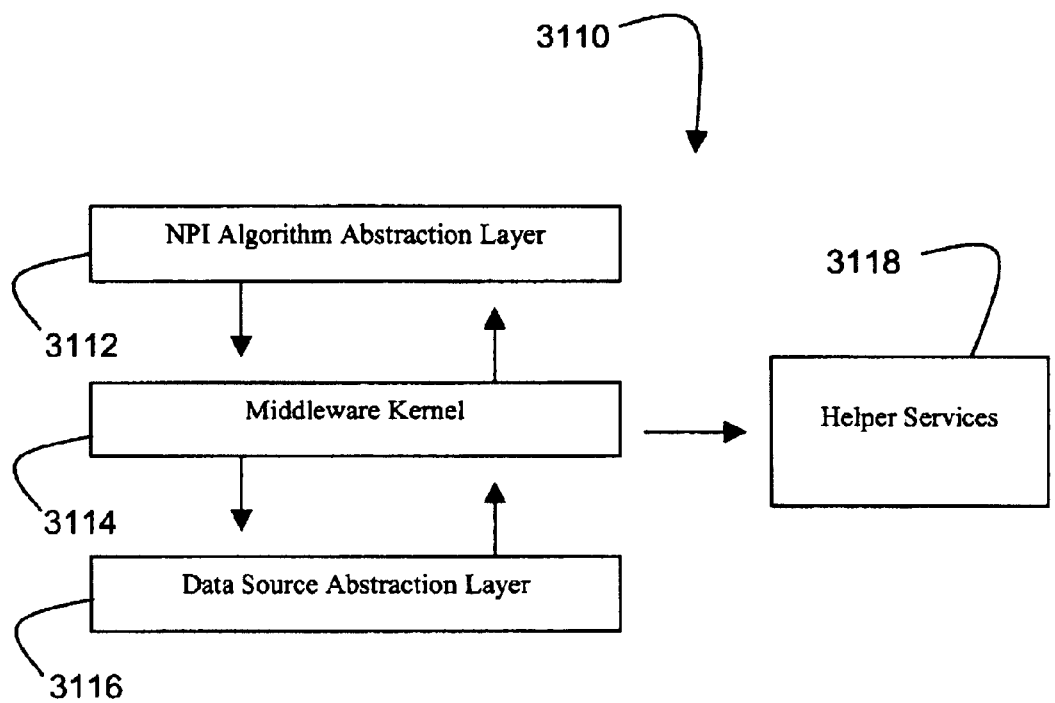
FIG. 31 depicts the data flow processing between a DMT and the MWI.

Referring now to FIG. 31, a pictorial representation of MWI data access component 3110 is shown to include a DMT abstraction layered component 3112 in two-way communication with an MWI kernel 3114, which is in two-way commination with a data source abstraction layer component 3116. The MWI kernel 3114 can utilize ahelper service 3118 to assist in the abstraction process.

Conceptual Scheme

Middleware Kernel

The MWI kernel is the main module that implements base operations and MWI controls. The DMT abstraction layer component supports all interacts with DMT clients and implements the Dataset Access Interface. The Data Source Abstraction Layer handles all MDD commands building such as MDX Query building, executing, converting and other related tasks and implements the Interface of data definition component of the MWI. While the Helper Services are MWI created internal shared APIs that can be used by other clients or objects in the system.

Implementation Details

First, the MWI of this invention is a COM-object in terms of MicroSoft OLE/ActiveX technology. It uses DSELib API to extract multidimensional data from OLAP databases. One important feature of the MWI of this invention is its support of parallel processing of data requests (multithreaded architecture). The multithreaded architecture is accomplished by a thread pool. The thread pool is a service that has control over multiple threads of execution. It distributes posted asynchronous procedures among several threads. The thread pool provides thread's synchronization as well. The thread pool of the MWI free DMT developer from having to address low-level programming of multiple threading, instead the developer can provide a logic of parallelism in algorithm implementation.

Figure 32:
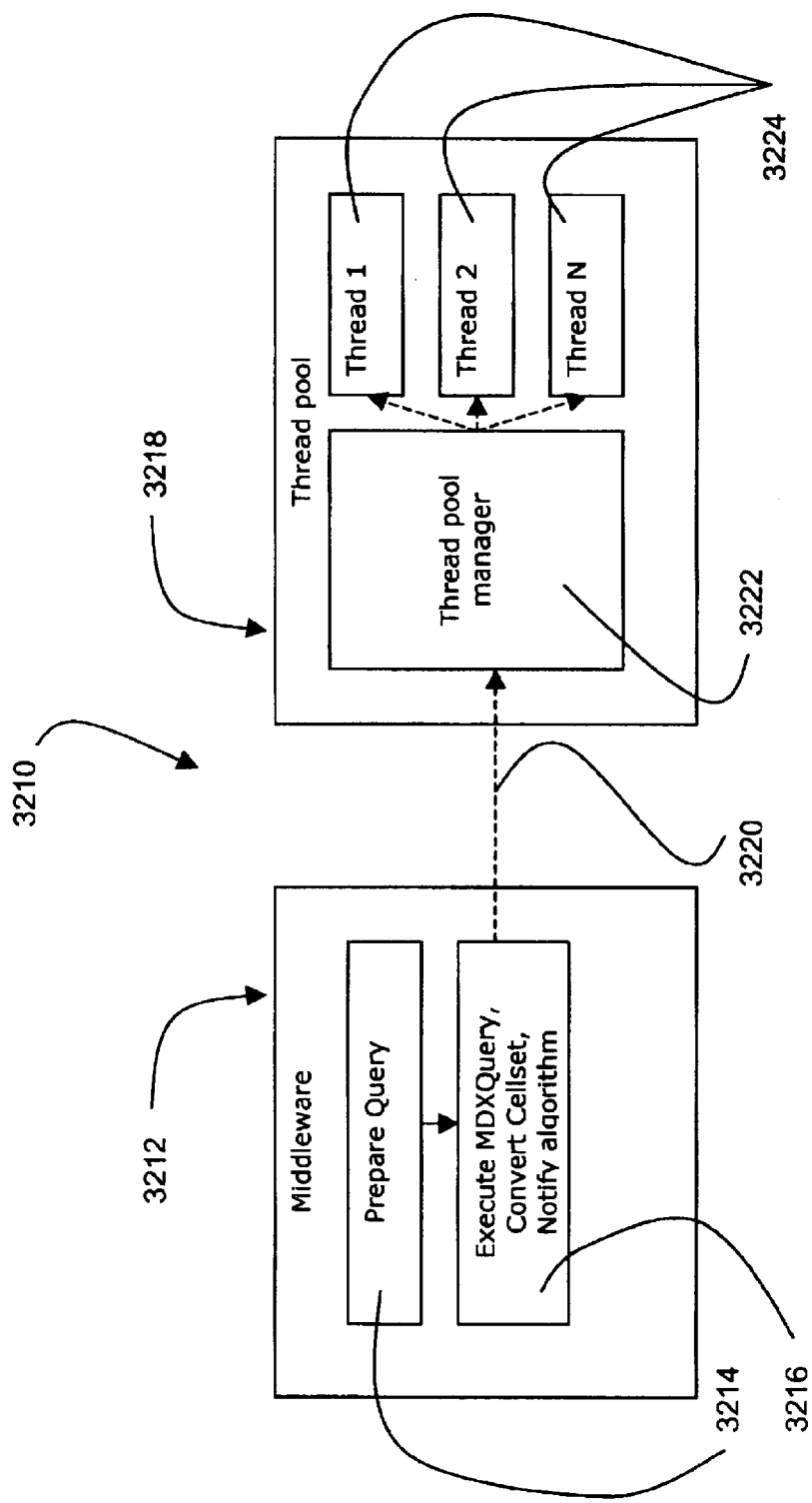
FIG. 32 depicts the thread pool of the MWI.

Referring now to FIG. 32, a pictorial representation of MWI query execution component and the thread pool 3210 is shown to include a MWI query component 3212 supporting a prepare query object 3214, which parses the query and transales the parsed query into MDD commands. The query component 3212 also supports an MDD command execution object 3216, which builds and schedules command batches, converts retrieved data and notifies a DMT when results are ready. The exeuction object 3216 communication with the thread pool 3218 asynchronously via communication link 3220. The thread pool 3218 includes a thread pool manager 3222 which establishes and monitories all threads needed 3224 to support all MDD commands sent from the execution object 3216.

Class Diagram

Figure 33:
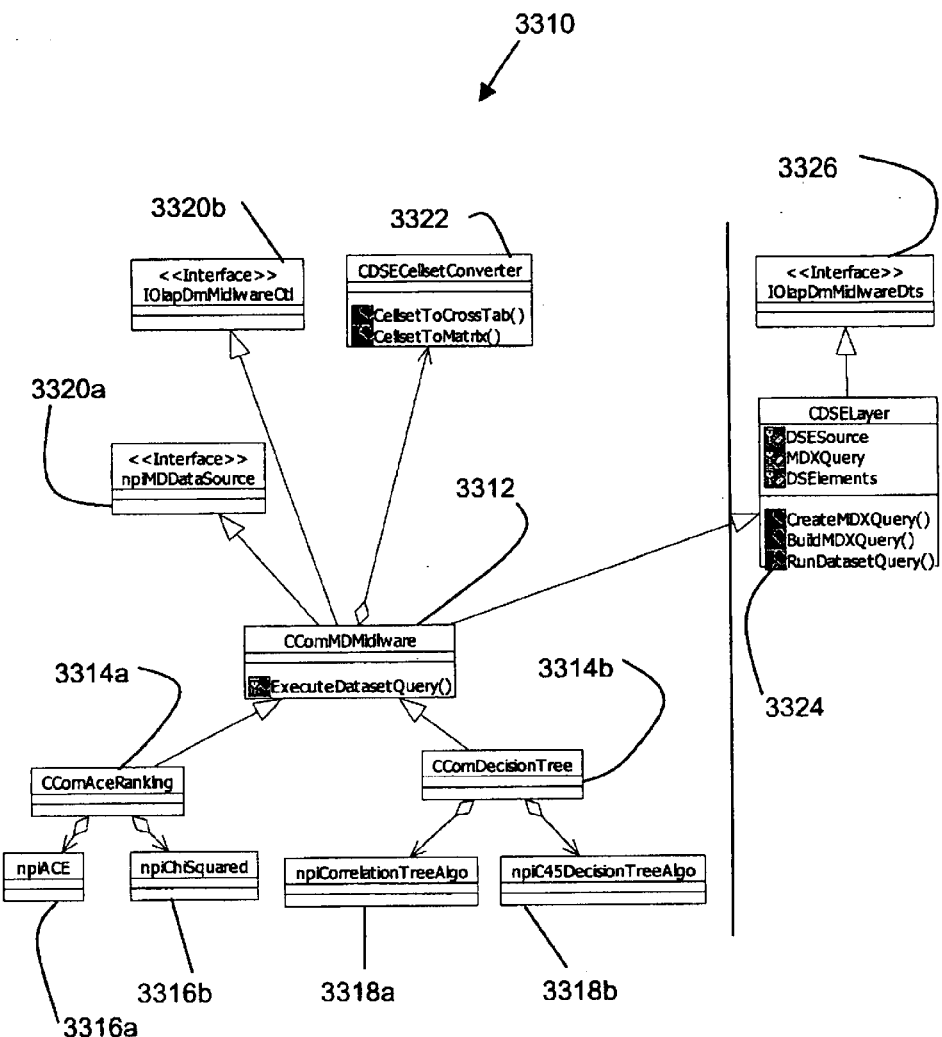
FIG. 33 depicts the COM model for the MWI-DMT-MDD interaction.

The MWI of this invention is divided into a number of classes of object that allow the MWI to act as an effective interface between DMT clients and a MDD. The object classes include global or universal MWI objects and DMT specific object. As stated before, the ultimate goal is the have a MWI that has only global objects. However, the MWI is designed to receive and support add-ons that extend the MWI functionality. As the MWI incorporates add-ons, the likelihood that a new DMT will need an unsupport MWI feature will decrease and the MWI becomes more universal in nature Referring now to FIG. 33, a pictorial representation of MWI class diagram 3310 is shown to include a central control object (kernel) 3312 which is in communication with DMT specific COM objects 3314a&b,where 3314a supports DMT ACE 3316a and ChiSquared 3316b, and 3314b supports DMT correlation 3318a and decision tree 3318b. These DMTs are just used to illustrate the class layout of the MWI. The control object 3312 is also in communication with two interface component 3320a&b, where 16a supports Client data source interfacing (i.e., handles posting and transferring data to and from DMTs) and 3316b supports MWI to MDD communications. The contorl object (kernel) 3312 is also in communicaton with a data converter 3322, which handles all necessary data conversions to respond to a given request. The control object 3312 is also in communication with a back-end interface component 3324, which parses and translates DMT queries into MDD commands, bundles and schedules and, utilizing the thread pool, establishes multiple threads to a MDD through a third interface component 3326. This third interface component 3326 controls all data communication interfacing with the MDD.

DMT Attributes for Effective MWI Interactions

Figure 34:
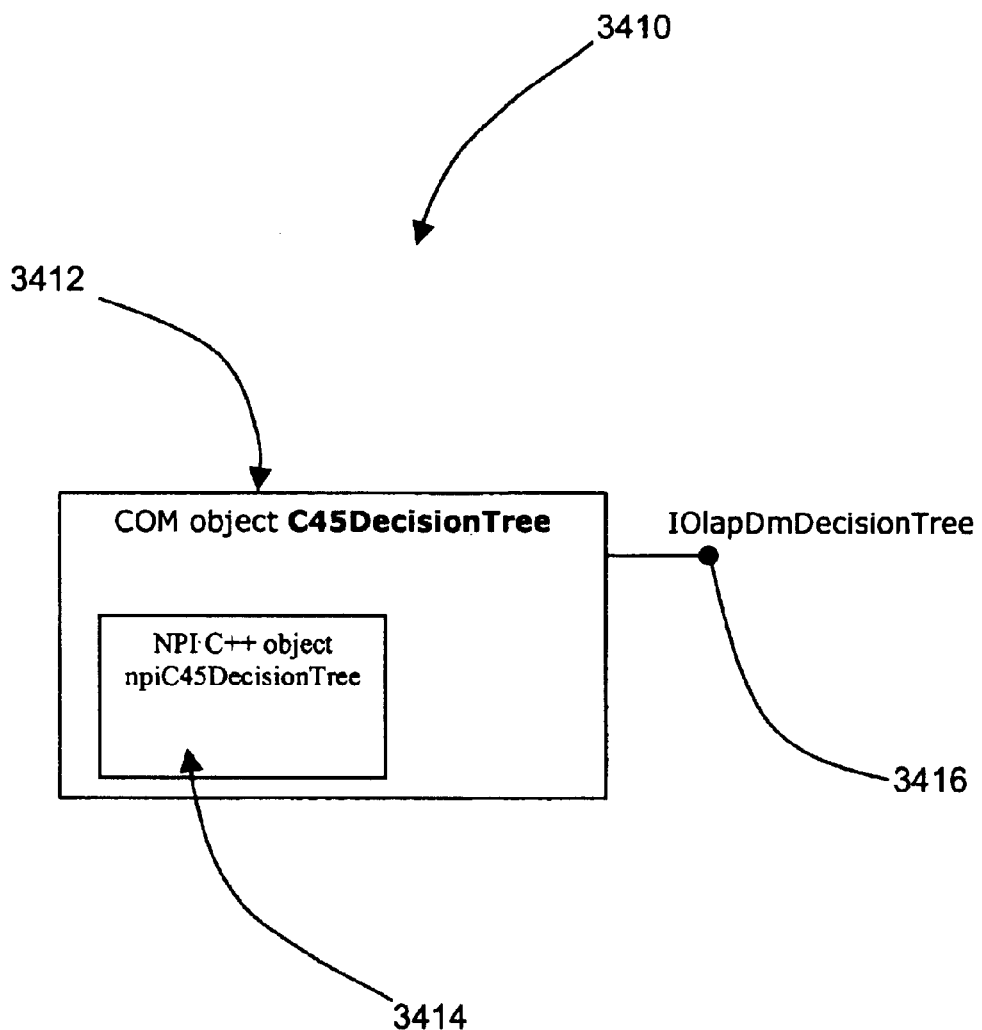
FIG. 34 depicts the component construction a DMT in the MWI environment of this invention.

All DMTs work in MicroSoft's Component Object Module (COM) framework. For additional information on MicroSoft's Component Object Module technology, the reader is directed to www.microsoft.com and the section on COM-based technologies. In other words, the DMT have two components dealing with the one data mining method. The first component is a NPI C++ object and the second component is a COM object. Referring now to FIG. 34, a pictorial representation of a DMT component structure for use with the MWI of this invention 3410 is shown to include a C++ or code object 3412 and a COM object 3414. The pictorial 3410 also shows an external connection to another object 3416.

C++ DMT COM Requirements

When a DMT developer implements corresponding COM object in a DMT, the developer needs to include the following classification template the allows the MWI to determine the type of queries constructs to expect from the DMT.

---

```
// C45DecisionTree.h - declarations of CC45DecisionTree class.
...
#include "Algo/npiC45DecisionTree.h"
class CC45DecisionTree : public CComCoClass<...>
{
    protected:
        npiC45    m_AlgC45;
}
```

---

All COM objects related to Data mining are expected to be located in an OlapDm.DLL, but NPI C++ classes may be used elsewhere.

PIXEL CONSTRUCT

Figure 35:
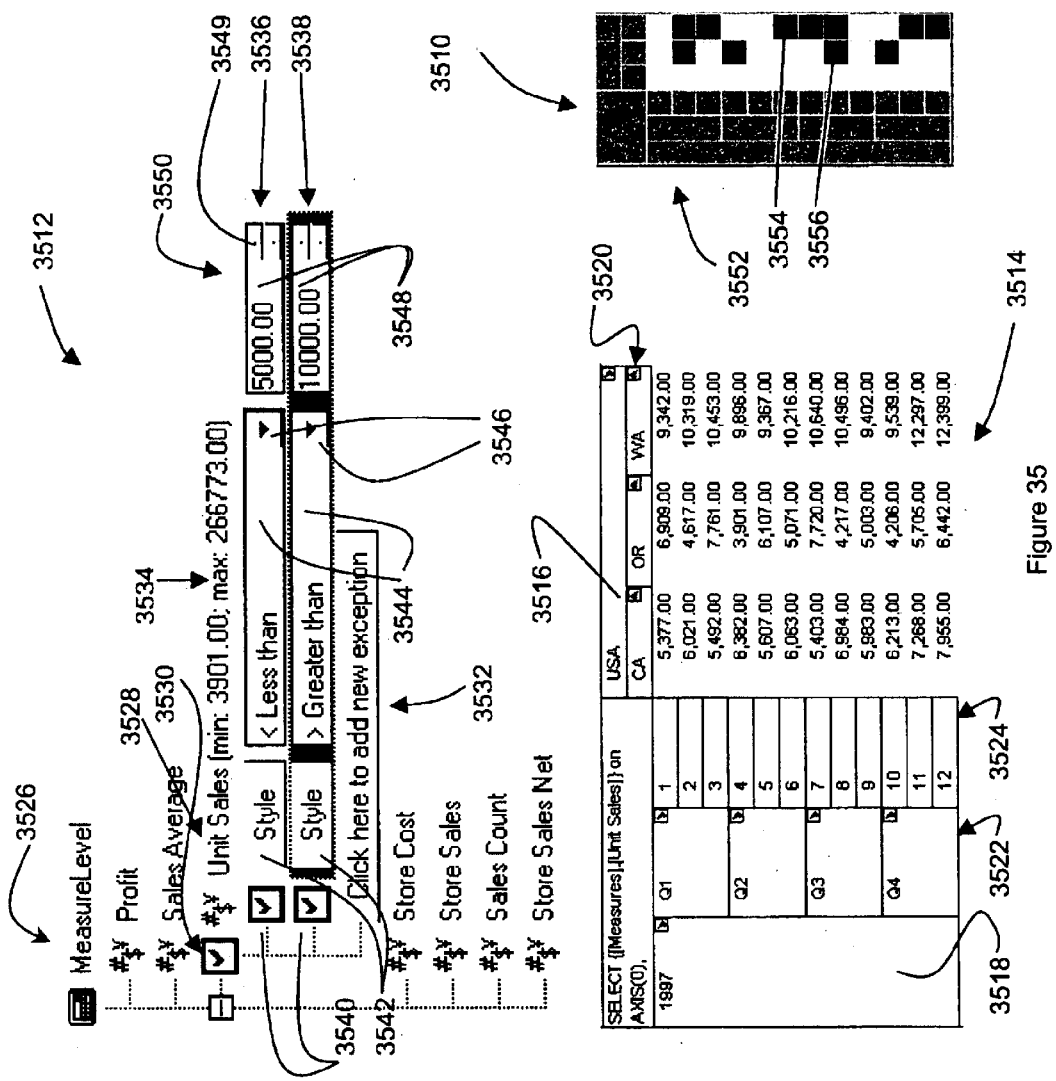
FIG. 35 depicts a pixel construct of this invention.

This graphics model allows selected cells of a cross-tab to be color coded and only the cross-tab cells having values within the range are displayed in the pixel map in their corresponding colors as set forth in FIG. 35. Looking at FIG. 35, a pixel construct 3510, its controls 3512 and its corresponding cross-tab 3514 are shown. The cross-tab 3514 includes two dimension USA 3516 and 1997 3518. The USA dimension 3516 includes three state members 3520 and CA, OR and WA. The 1997 dimension 3518 includes quarter members 3522 and month members 3524. The controls 3512 lists a set of measures 3526 one of which Unit Sales 3528 is activated. Activation is designated by a check box 3530. When activated by clicking on a given measure 3526, the pixel controls 3512 open a dialog box 3532 which allows the user to establish exceptions and limits. When a measure 3526 is selected, then the controls 3512 displays minimum and maximum values for the measure in a min/max box 3534. As shown here, the user has set two exceptions 3536 and 3538. The exceptions 3536 and 3538 include an on/off toggle 3540 and a style box 3542 which set the color to be associated with cells that satisfy the exception. The exceptions 3536 and 3538 also include a numeric operator field 3544 with an associated drop down selection button 3546 for standard numeric operations and a exception value field 3548 with spin controls 3549 for changing the exception. The order that the exceptions appears is hierarchical and the exceptions are applied to the data in the cross-tabs 3514 in that order. However, the user can change the order of exception application by changing the relative location of each exception in the exception list 3550. Once the exception list has been defined, the pixel construct generator generates a pixel construct 3510. The pixel construct 3510 shows an outline of the cross-tab 3552 and all cells 3554 that satisfy the exception 3536 are shown in the color designated in the style box 3542 associated with the exception 3536, and all cells 3556 that satisfy the exception 3538 are shown in the color designated in the style box 3542 associated with the exception 3538. All cells, of course, remain in their proper cross-tab position.

Because the user can establish a group of exceptions using a single numerical operation with narrower and narrower limits, the order of application will play a role in what information is being displayed. Generally, the most restrict exception should be first in the hierarchical list, but the user can move members of the list up or down using standard move up and down window commands.

CORRELATION DMT

Figure 36:
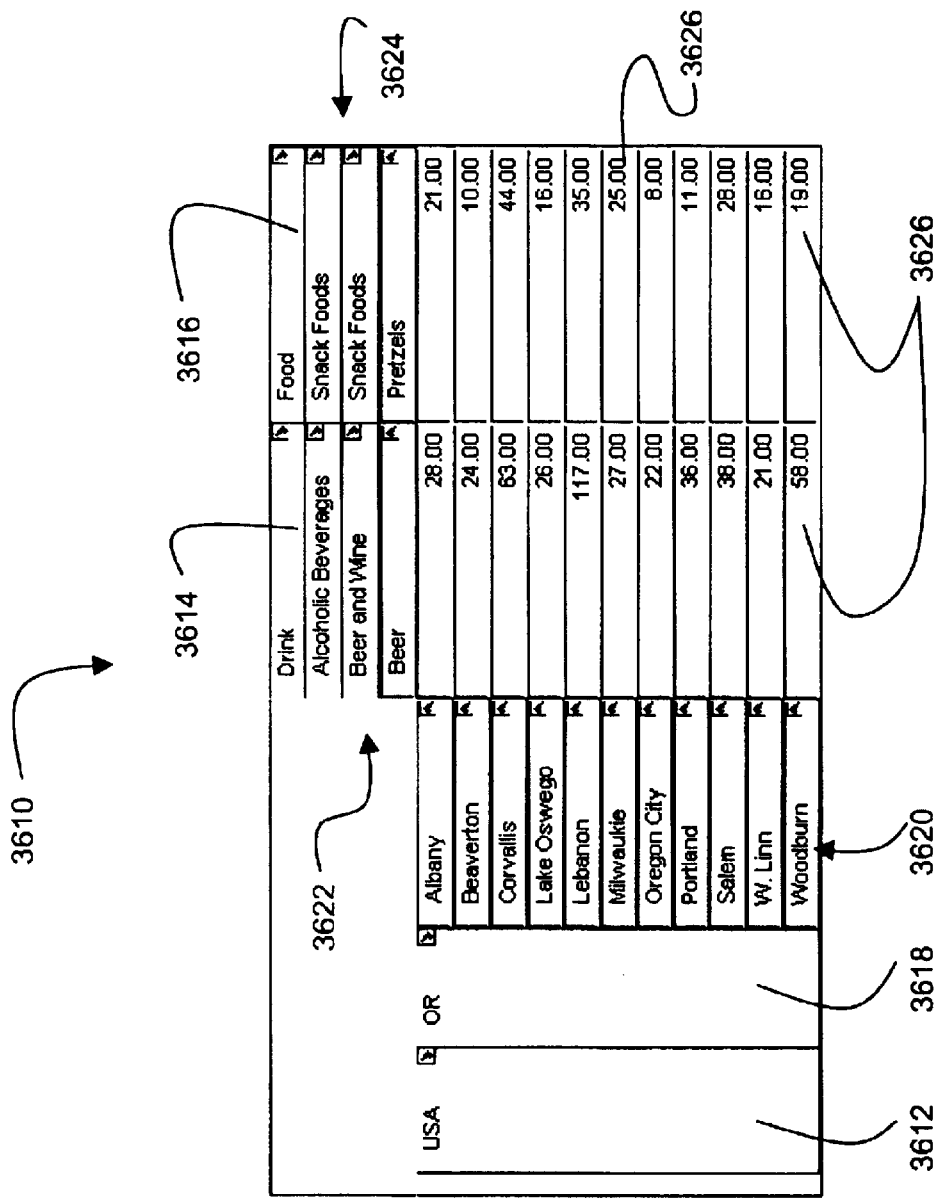
FIG. 36 depicts a correlated cross-tab produced using the Correlation DMT of this invention.

The correlation DMT is a DMT that takes specific advantage of the MicroSoft Analysis Services Correlation function invokable at the OLAP engine level. Using the Correlation DMT, a correlation scenario can defined by the user, sent to the MWI, process by the MWI as commands to the MDD to perform one or more MicroSoft correlation functions. For example, suppose the user has constructed the cross-tab shown in FIG. 36. Looking at FIG. 36, a cross-tab 3610 is shown having three dimension 3612, 3614 and 3616, USA, Drink and Food, respectively. The USA dimension 3612 includes one state member, OR, 3618 and the state member include a number of city member 3620. The Drink dimension 3614 includes a number of drink members 3622 and the Food dimension includes a number of food 3624. The cross-tab 3610 is populated with corresponding measure values 3626.

Now, the user wants to perform a set of correlation operations on the data in the cross-tab. The user would invoke the Correlation DMT commands. The user then selects a given dimension or member, e.g., beer, as the fixed variable. The user then selects one or more dimensions or members from a dimension/member list as the variables to be correlated with the fixed variable. The list selection procedure and windows are similar to the selections procedure and windows described in ACTG for selecting cross-tab variables (See FIGS. 18A–C).

Figure 37:
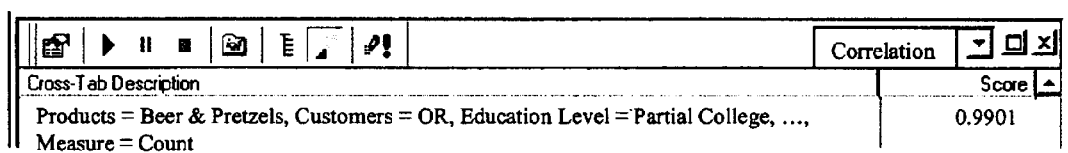
FIG. 37 depicts a list of correlation results from the Correlation DMT of this invention.

The Correlation DMT then outputs the data in a text form shown in FIG. 37 which is a form equivalent to the textual result list used in ACTG (see FIG. 16). As in ACTG, the can select one of the text entries and drop it into a cross-tab graphics window and the result will be shown as the corresponding filter cross-tab, an example of which is shown in FIG. 38.

After this correlation is calculated, the user can include additional variables, deselect variable, select hierarchies, or dimensions and the correlation DMT will obtain and display the results.

The user can also set correlation value ranges as cutoffs as in ACTG. The user can also save and report the maximum correlation, or just report the calculated correlations. The user-interface for Correlation component will be similar to ACTG. To run the Correlation DMT the user will have to: (1) Select a measure; (2) Select a Target dimension (i.e. Products dimension) to be placed on the column axis; and (3) Select one or more dimensions to be placed on the row axis.

Each additional dimension on the row-axis (other than the inner most dimension) is essentially a filter. When a tuple is dropped on the cross-tab, the 2 members from the Target dimension (used in the correlation calculation) should be shown on the column axis, and the dimension with the most members should be shown on the row axis. The other dimensions should be shown as filters in the dimension tree. Rules for calculation:

Target dimension: it does not make sense to choose 2 members that are siblings.

Inner most dimension: it does not make sense to expand this dimension all the way down to the leaf level. This dimension should only be expanded to leaf—1 level.

SURFACING GRAPHICS GENERATOR

Figure 39:
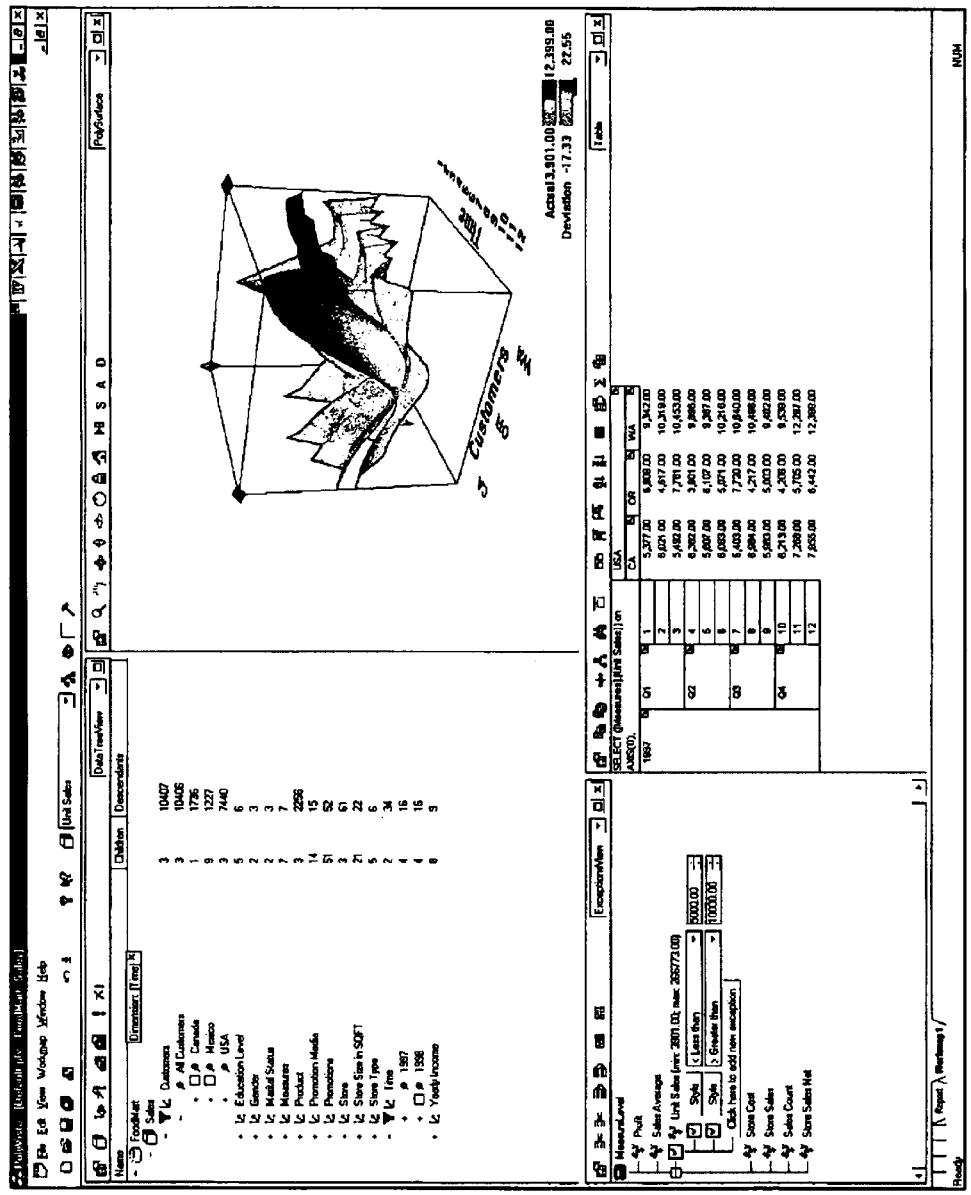
FIG. 39 depicts the surface generator window of the present invention with graphic window, cross-tab generating variable list window, DMT window and cross-tab window.
Figure 40:
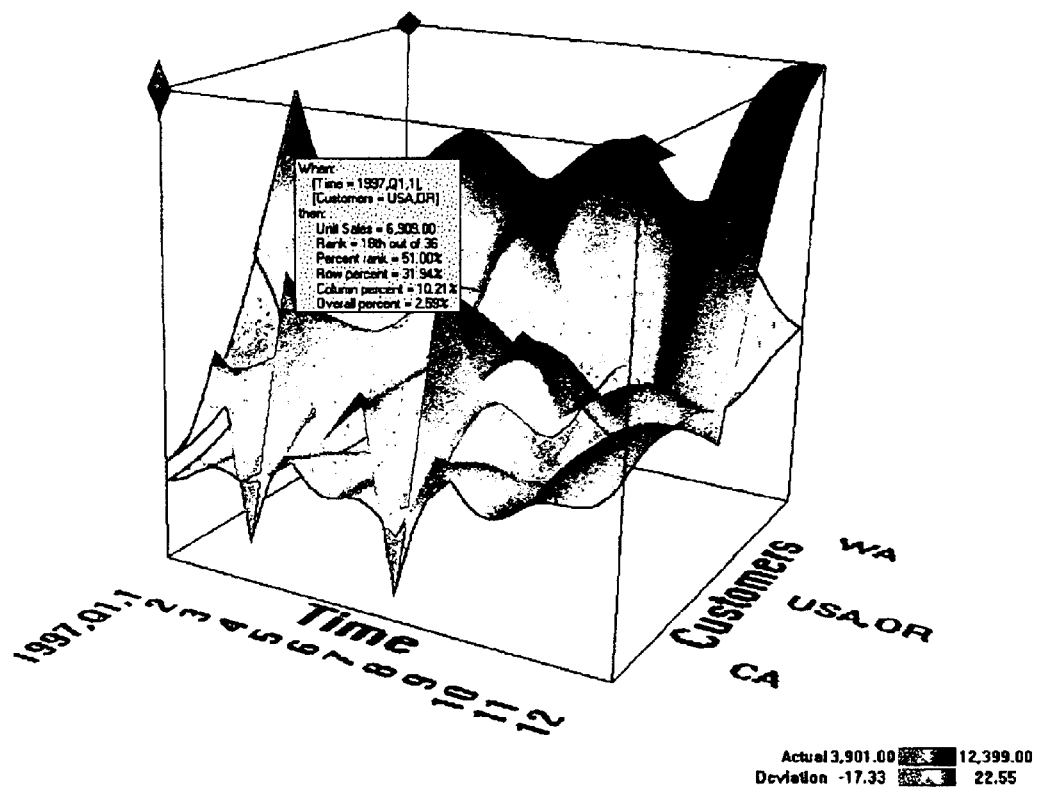
FIG. 40 depicts an enlarged view of a surface construct of shown in the graphics window of FIG. 39.

In this model, a 3D box is created and data associated with a cross-tab constructed from a list of variables is constructed as shown in FIG. 39. The cross-tab construct can come from any of the cross-tab DMTs including ACTG, Correlation or the like and the selection formats for cross-tab definition is as described previously. The 3D box has active handles for expanding the box along all three dimensions. The generator can also label the axis with the variables and members. Referring to FIG. 40, the surface construct of FIG. 39 is shown enlarged with a legend describing the that can be activated to describe the surfaces or parts of the surfaces.

Figure 41:
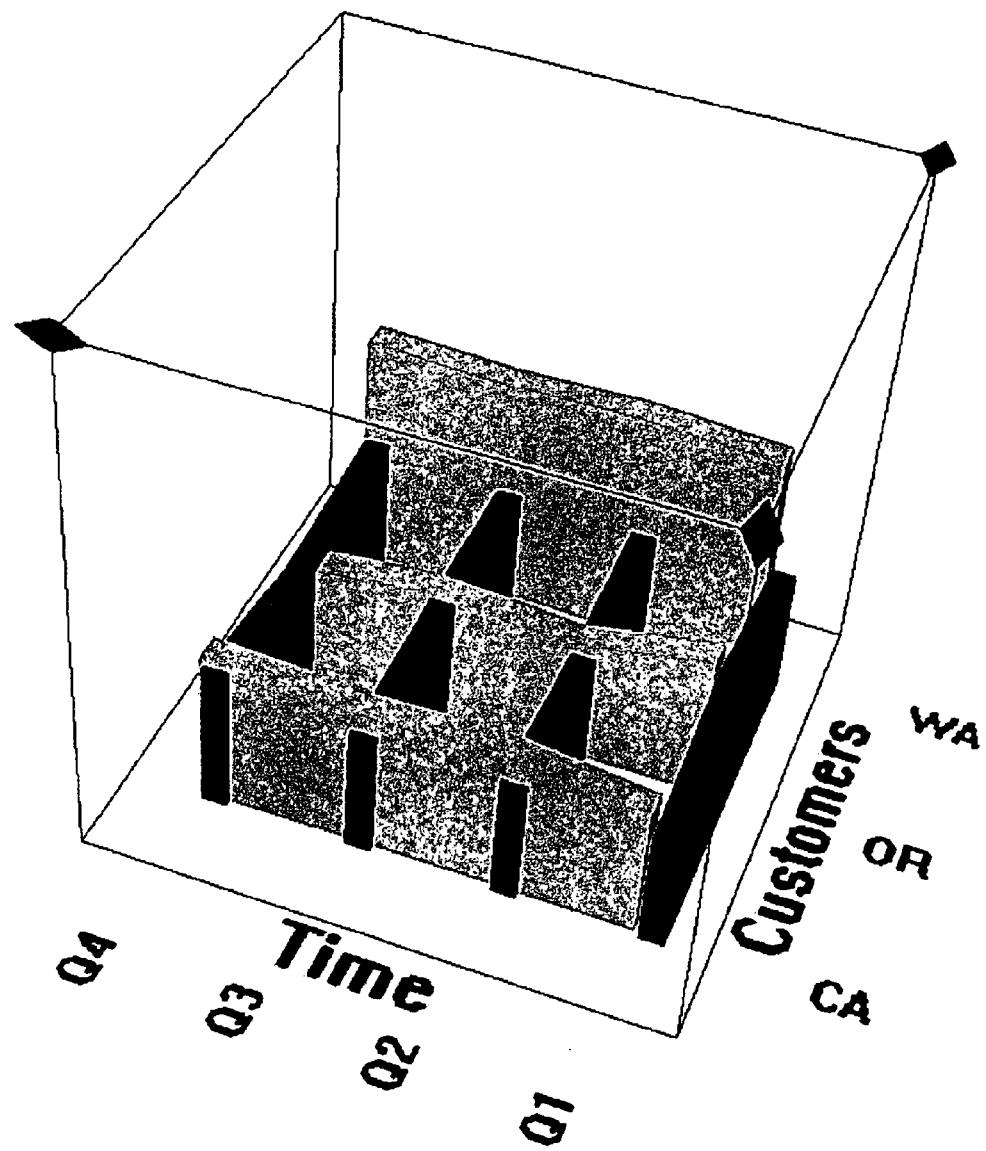
FIG. 41 depicts an alternate surface graphic construct for the graphics construct of FIG. 39.
Figure 42:
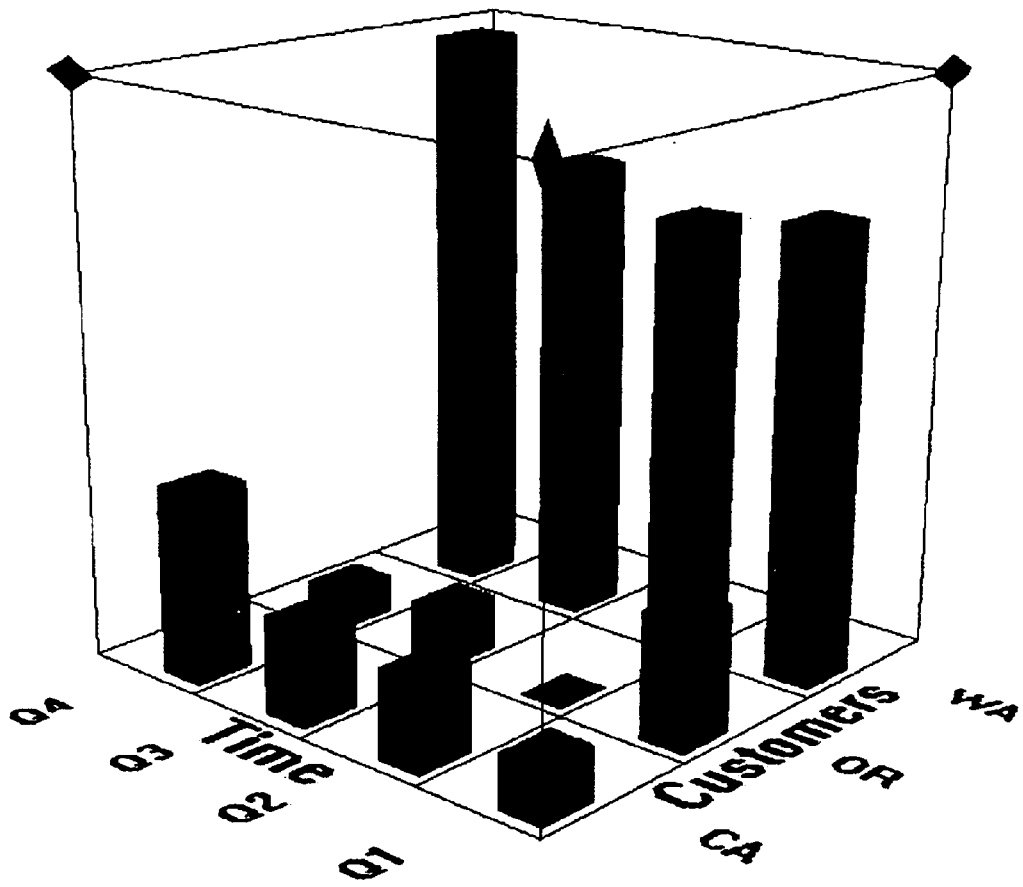
FIG. 42 depicts another alternate surface graphic construct for the graphics construct of FIG. 39.
Figure 43:
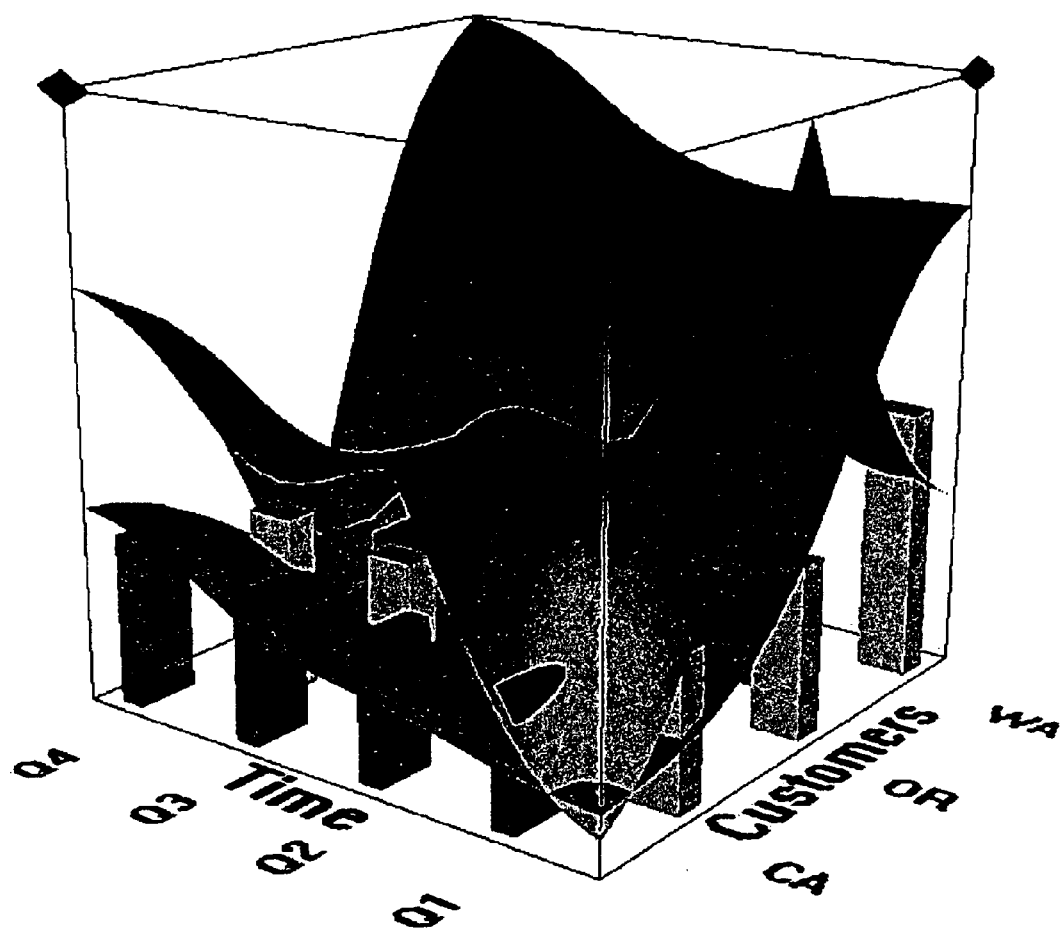
FIG. 43 depicts yet another alternate surface graphic construct for the graphics construct of FIG. 39.

An alternate construct is shown in FIG. 41, where the surface have been replace by criss-crossing bars showing the shape of the surface a spaced intervals. In yet another alternate construct shown in FIG. 42, one surface is simply represented by a set of regularly spaced bars having a height proportional to the value of the surface at that point. In yet a further construct, the surfaces representing actual measure values and their corresponding deviations are shown along with column and row deviation bars as shown in FIG. 43.

Figure 44A:
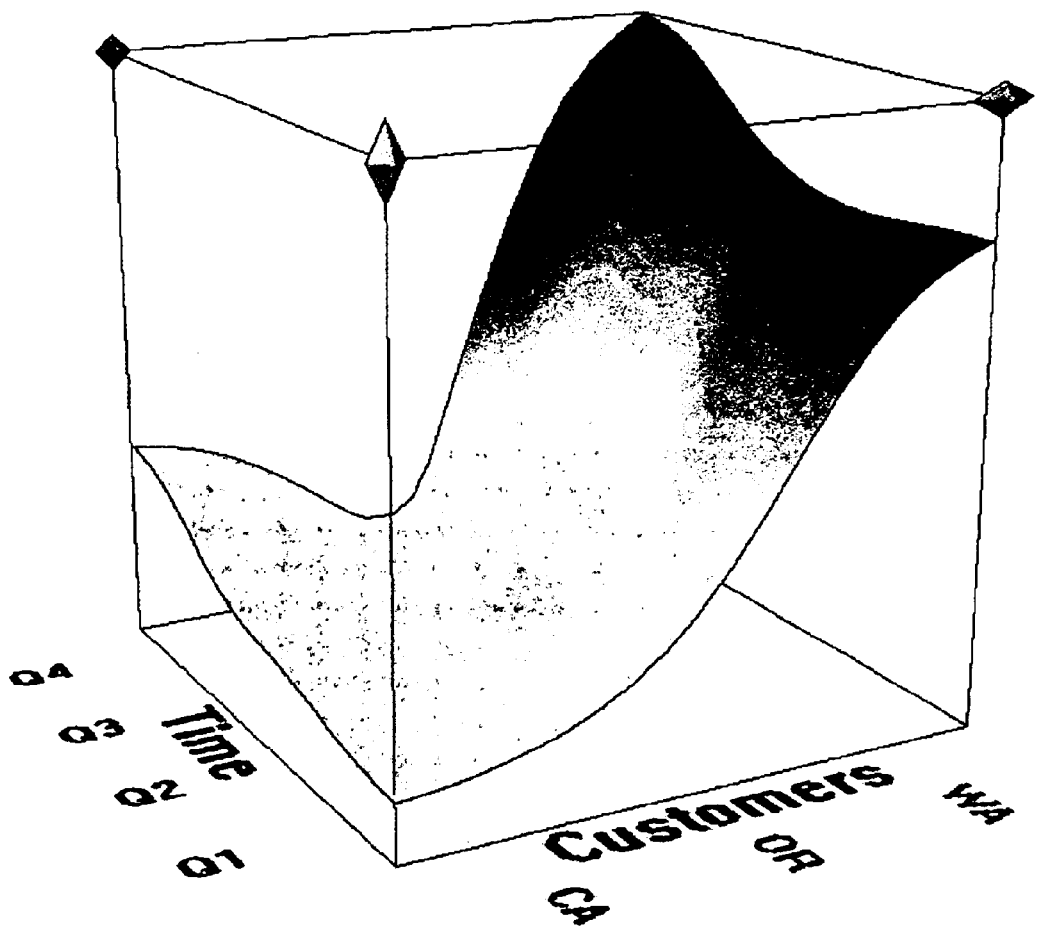
FIGS. 44A–C depict several surface construct features of the surface generator of this invention.
Figure 44B:
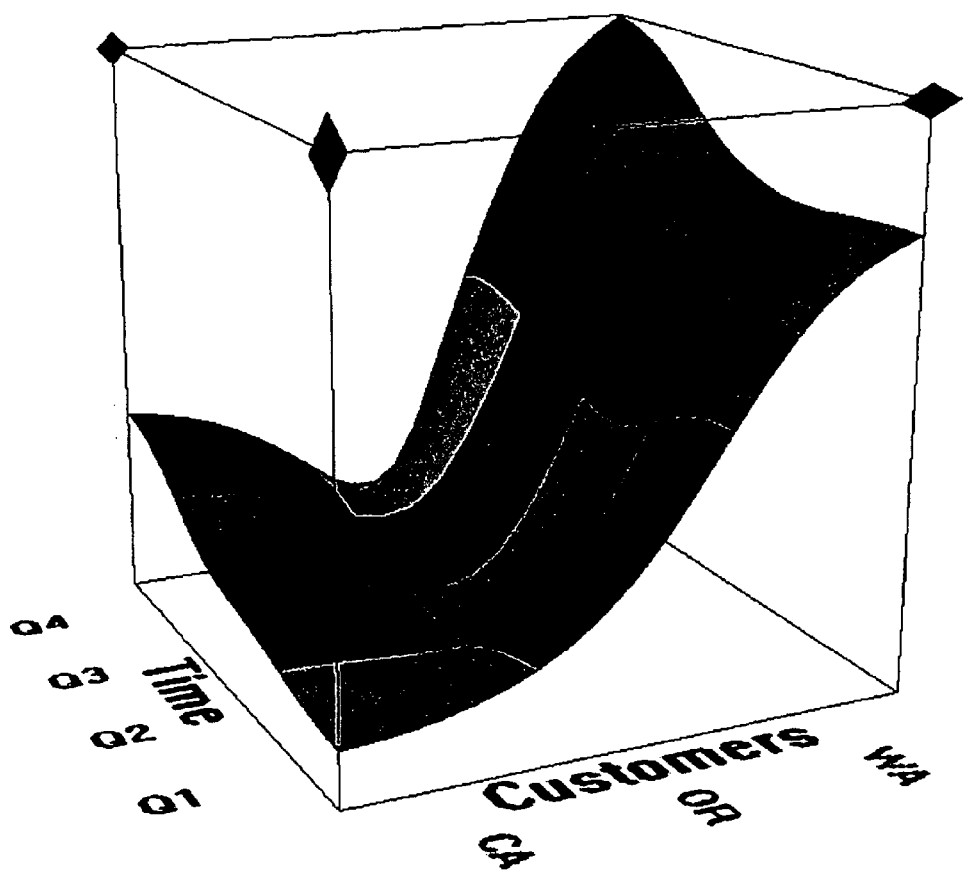
Figure 44C:
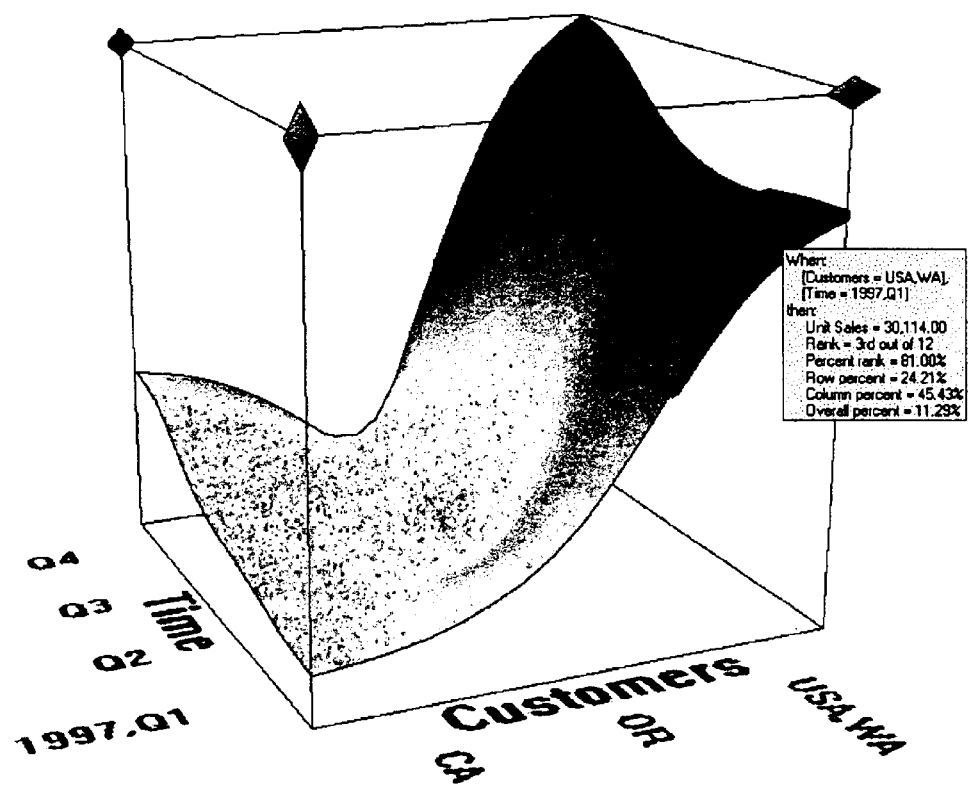

Referring now to FIGS. 44A–C, a surface construct is shown having a single surface which can represent the actual data or statistical property of the data. The surface can be shaded and contoured to show constant value lines as shown in FIG. 44A. Because the surfaces are generated from discrete data, the surface is actually made up of surface elements that can be color coded in a mosaic format to indicate a property of the change in the value being displayed as shown in FIG. 44B. Looking at FIG. 44C, the user can position the cursor on any patch and a legend will be generated with description of the data being plotted.

The plane in the center, "a slice" shows all the values of one record. For one record, the black jagged line connects the point on the line graph for all the variables. There can be other lines that represent statistics such as average, median, etc.

In this model we need a slider so that we can show animation, plus how the black jagged line changes its shape from record to record. We need to have the ability to turn on or of any object such as the line graph, or the black jagged line, or the 3D object.

When a variable slider is applied, one visualization would be to show the black jagged line in places where the slider set is true (as shown in the fig below). Another visualization would be to show all the line graphs with a thin line, but the places where the slider set is true could be shown with a thicker line.

The other ability is to generate a surface by joining all the line graphs with one another. Then to be able to observe this model either from the top or the bottom.

A nice to have feature would be to change the order of the variables simply by drag and drop. In other words move the yellow line between green and red line.

The surface generator allows a user to view a dataset in the same cube, in a variety of ways: surface; bars; area; lines; etc.

The datasets could be: Actual Values; Row %; Column %; Deviation; etc.

Surfaces will be provided in the form of "check-boxes" (see fig.), i.e. one or more dataset(s) can be selected at the same time to generate a surface. Additionally, it should also be possible to control the transparency of the surface(s) with only one slider.

Mosaic:

On a surface it should also be possible to show a 2nd dataset with the help of a "mosaic". The figure is an example of a mosaic surface. This is accomplished as follows:
plot the surface for the first dataset
now on this surface, draw the 2nd dataset in the form of a mosaic Mosaic will be provided in the form of "radio buttons", i.e. only one dataset can be used for mosaic. It is important to note that the color of the mosaic will cover the surface, i.e. the original color of the surface will not be visible.

Rules:

Rules can be constructed and shown in the form of ToolTips, attached file will show you how to do this.

The user will have a choice to specify what he wants to see in the rule: (1) Rule obtained from "Row %"; (2) Rule obtained from "Column %"; (3) Support of the rule in the dataset; (4) Confidence of the rule in the dataset; (5) Actual value in the cell; (6) Etc.

The surface generator will keep in sync with the dataset. The user should be able to click in a data cell and the appropriate place in the surface generator should be shown, likewise a selection in the surface generator should be shown in the data cell.

Selection:

When I place my mouse over a "cell" in the visualization, in addition to popping balloon text, I want these events to happen:

1. Highlight the "cell" by making a boundary.
2. Highlight the axis labels.
3. Send an event to cross-tab (pivot table) to highlight the corresponding cell in the grid (as shown below). Likewise, the user can click in the cross-tab grid cell. Cross-tab will/should send this message to surface generator, and surface generator should do step 1 and 2, i.e. highlight the cell and the axis labels, and show the balloon text. I guess balloon text is only when the visualization is not in motion.

The above description of surface generator can be better understood by reference to Although the invention has been disclosed with reference to its preferred embodiments, from reading this description those of skill in the art may appreciate changes and modification that may be made which do not depart from the scope and spirit of the invention as described above and claimed hereafter.

I claim:

1. A method implemented on a digital process unit for ranking cross-tabs containing data extracted from a multi-dimensional dataset comprising the steps of:

a. creating at least two cross-tabs including data values from the multi-dimensional dataset;

b. computing a deviance of the data values for each cell of each cross-tab using formula (1):

$$d(i_1, \cdots, i_d) = \frac{(n(i_1, \cdots, i_d) - e(i_1, \cdots, i_d))}{\sqrt{e(i_1, \cdots, i_d)}} \quad (1)$$

where:

$n(i_1, \ldots, i_d)$ is the actual value of the cell at location $(i_1, \ldots, i_d)$;

$$s_k(i_k) = \sum_{j=1}^{D_k} n(i_1, \cdots, i_j, \cdots, i_d)$$

is the sum of all cell values along the kth dimension;

$$S = \sum_{j_1=1}^{D_1} \cdots \sum_{j_k=1}^{D_k} \cdots \sum_{j_d=1}^{D_d} n(j_1, \cdots, j_d)$$

is the total sum of all cell values in the cross-tab;

$$e(i_1, \cdots, i_d) = \frac{\prod_{j=1}^{d} s_j(i_j)}{S^{d-1}}$$

is the estimated value for the cell at location $(i_1, \ldots, i_d)$;

d is the dimension of the cross-tab; and $D_k$ is the number of cells in the kth dimension; and c. ranking the deviances; and d. selecting the cross-tabs containing the cell having a deviance, the absolute value thereof being greater than a desired value.

2. The method of claim 1, further comprising the step of:

filtering or quafying the cross-tabs based on sparsity where sparsity is the number of cells that do not or cannot have a value.

3. The method of claim 1, further comprising the step of:
filtering cross-tabs k, where k is an integer having a value less than or equal to the dimension of the cross-tab.

4. The method of claim 1, further comprising the step of:
limiting the number of cross-tabs displayed.

5. A method implemented on a digital process unit for analyzing data in a multi-dimensional dataset comprising the steps of:
   a. selecting n variables from a multidimensional dataset, where n is an integer less than or equal to the dimensionality of the dataset;
   b. selecting a cross-tab dimension, m, where m is an integer having a value less than or equal to n or having a range of values between a lower limit greater than to equal to 1 and an upper limit less than or equal to n;
   c. constructing k cross-tabs of dimension m, where k is the number of combinational cross-tabs derived from n variable taken m at a time; and
   d. do ranking;
   e. displaying a list of the ranked cells with cross-tab identification information;
   f. selecting a desired cell from the list;
   g. display the corresponding cross-tab with highlight cell.

6. The method of claim 5, wherein list manipulation to display top x positive and negatives with middle hidden.

* * * * *